United States Patent
Jungck et al.

(10) Patent No.: US 8,576,881 B2
(45) Date of Patent: *Nov. 5, 2013

(54) TRANSPARENT PROVISIONING OF SERVICES OVER A NETWORK

(75) Inventors: Peder J. Jungck, San Carlos, CA (US); Matthew Donald Drown, Palo Alto, CA (US); Sean M. Goller, Mountain View, CA (US)

(73) Assignee: CloudShield Technologies, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/463,133

(22) Filed: May 3, 2012

(65) Prior Publication Data

US 2012/0218901 A1 Aug. 30, 2012

Related U.S. Application Data

(63) Continuation of application No. 12/493,312, filed on Jun. 29, 2009, now Pat. No. 8,204,082, which is a continuation-in-part of application No. 11/189,172, filed on Jul. 25, 2005, now Pat. No. 7,570,663, which is a continuation of application No. 09/858,309, filed on May 15, 2001, now Pat. No. 7,032,031, which is a continuation-in-part of application No. 09/602,129, filed on Jun. 23, 2000, now Pat. No. 6,829,654.

(51) Int. Cl.
*H04J 3/00* (2006.01)

(52) U.S. Cl.
USPC .......................................... 370/498; 370/230

(58) Field of Classification Search
USPC .......... 709/246, 228, 226; 370/498, 230, 466, 370/535, 212, 503, 468, 486, 412
See application file for complete search history.

(56) References Cited

U.S. PATENT DOCUMENTS

| | | |
|---|---|---|
| 4,692,918 A | 9/1987 | Elliott et al. |
| 5,179,556 A | 1/1993 | Turner |

(Continued)

FOREIGN PATENT DOCUMENTS

| | | |
|---|---|---|
| EP | 0 865 180 | 3/1998 |
| WO | WO 98/17039 | 4/1998 |

(Continued)

OTHER PUBLICATIONS

Rule-Based Filtering for Java Applets, Iglio et al., Computer Security Applications Conference, 1998, Proceedings, 14th Annual Dec. 7-11, 1998 pp. 112-119.

(Continued)

*Primary Examiner* — Chuong T Ho
(74) *Attorney, Agent, or Firm* — Lempia Summerfield Katz LLC

(57) ABSTRACT

An apparatus and method for enhancing the infrastructure of a network such as the Internet is disclosed. A packet interceptor/processor apparatus is coupled with the network so as to be able to intercept and process packets flowing over the network. Further, the apparatus provides external connectivity to other devices that wish to intercept packets as well. The apparatus applies one or more rules to the intercepted packets which execute one or more functions on a dynamically specified portion of the packet and take one or more actions with the packets. The apparatus is capable of analyzing any portion of the packet including the header and payload. Actions include releasing the packet unmodified, deleting the packet, modifying the packet, logging/storing information about the packet or forwarding the packet to an external device for subsequent processing. Further, the rules may be dynamically modified by the external devices.

20 Claims, 24 Drawing Sheets

(56) References Cited

U.S. PATENT DOCUMENTS

| | | | |
|---|---|---|---|
| 5,195,181 A | 3/1993 | Bryant et al. | |
| 5,566,170 A | 10/1996 | Bakke et al. | |
| 5,619,621 A | 4/1997 | Puckett | |
| 5,784,582 A | 7/1998 | Hughes | |
| 5,805,820 A | 9/1998 | Bellovin et al. | |
| 5,867,704 A | 2/1999 | Tanaka et al. | |
| 5,938,737 A | 8/1999 | Smallcomb et al. | |
| 5,953,503 A | 9/1999 | Mitzenmacher et al. | |
| 5,991,713 A | 11/1999 | Unger et al. | |
| 5,996,011 A | 11/1999 | Humes | |
| 6,006,264 A | 12/1999 | Colby et al. | |
| 6,014,660 A | 1/2000 | Lim et al. | |
| 6,016,512 A | 1/2000 | Huitema | |
| 6,029,175 A | 2/2000 | Chow et al. | |
| 6,038,233 A | 3/2000 | Hamamoto et al. | |
| 6,046,980 A | 4/2000 | Packer | |
| 6,052,718 A | 4/2000 | Gifford | |
| 6,064,676 A | 5/2000 | Slattery et al. | |
| 6,065,055 A | 5/2000 | Hughes et al. | |
| 6,070,191 A | 5/2000 | Narendran et al. | |
| 6,073,168 A | 6/2000 | Mighdoll et al. | |
| 6,084,878 A | 7/2000 | Crayford et al. | |
| 6,105,027 A | 8/2000 | Schneider et al. | |
| 6,108,703 A | 8/2000 | Leighton et al. | |
| 6,119,165 A | 9/2000 | Li et al. | |
| 6,148,336 A * | 11/2000 | Thomas et al. | 709/224 |
| 6,157,955 A | 12/2000 | Narad et al. | |
| 6,167,438 A | 12/2000 | Yates et al. | |
| 6,178,505 B1 | 1/2001 | Schneider et al. | |
| 6,182,148 B1 | 1/2001 | Tout | |
| 6,185,598 B1 | 2/2001 | Farber et al. | |
| 6,226,642 B1 | 5/2001 | Beranek et al. | |
| 6,247,059 B1 | 6/2001 | Johnson et al. | |
| 6,256,671 B1 | 7/2001 | Strentzsch et al. | |
| 6,285,679 B1 | 9/2001 | Dally et al. | |
| 6,308,148 B1 | 10/2001 | Bruins et al. | |
| 6,324,582 B1 | 11/2001 | Sridhar et al. | |
| 6,324,585 B1 | 11/2001 | Zhang et al. | |
| 6,330,561 B1 | 12/2001 | Cohen et al. | |
| 6,389,462 B1 | 5/2002 | Cohen et al. | |
| 6,389,468 B1 | 5/2002 | Muller et al. | |
| 6,393,026 B1 | 5/2002 | Irwin | |
| 6,397,259 B1 | 5/2002 | Lincke et al. | |
| 6,408,336 B1 | 6/2002 | Schneider et al. | |
| 6,424,658 B1 | 7/2002 | Mathur | |
| 6,425,003 B1 | 7/2002 | Herzog et al. | |
| 6,453,335 B1 | 9/2002 | Kaufmann | |
| 6,480,508 B1 | 11/2002 | Mwikalo et al. | |
| 6,502,135 B1 | 12/2002 | Munger et al. | |
| 6,526,426 B1 | 2/2003 | Lakritz | |
| 6,535,518 B1 | 3/2003 | Hu et al. | |
| 6,546,423 B1 | 4/2003 | Dutta et al. | |
| 6,560,227 B1 | 5/2003 | Bartoldus et al. | |
| 6,574,666 B1 | 6/2003 | Dutta et al. | |
| 6,578,073 B1 | 6/2003 | Starnes et al. | |
| 6,581,090 B1 | 6/2003 | Lindbo et al. | |
| 6,587,466 B1 | 7/2003 | Bhattacharya et al. | |
| 6,598,034 B1 | 7/2003 | Kloth | |
| 6,604,143 B1 | 8/2003 | Nagar et al. | |
| 6,606,710 B2 | 8/2003 | Krishnan et al. | |
| 6,611,875 B1 | 8/2003 | Chopra et al. | |
| 6,625,166 B2 | 9/2003 | Tsukamoto et al. | |
| 6,654,787 B1 | 11/2003 | Aronson et al. | |
| 6,662,213 B1 | 12/2003 | Xie et al. | |
| 6,691,124 B2 | 2/2004 | Gupta et al. | |
| 6,691,231 B1 | 2/2004 | Lloyd et al. | |
| 6,728,885 B1 | 4/2004 | Taylor et al. | |
| 6,768,992 B1 | 7/2004 | Jolitz | |
| 6,772,347 B1 | 8/2004 | Xie et al. | |
| 6,785,728 B1 | 8/2004 | Schneider et al. | |
| 6,826,694 B1 * | 11/2004 | Dutta et al. | 726/13 |
| 6,829,654 B1 | 12/2004 | Jungck | |
| 6,832,256 B1 | 12/2004 | Toga | |
| 6,847,989 B1 | 1/2005 | Chastain et al. | |
| 6,850,529 B1 | 2/2005 | Wong | |
| 6,854,063 B1 | 2/2005 | Qu et al. | |
| 6,950,947 B1 | 9/2005 | Purtell et al. | |
| 6,973,084 B1 | 12/2005 | Jha | |
| 7,020,700 B1 | 3/2006 | Bennett et al. | |
| 7,032,031 B2 | 4/2006 | Jungck et al. | |
| 7,069,249 B2 | 6/2006 | Stolfo et al. | |
| 7,114,008 B2 | 9/2006 | Jungck et al. | |
| 7,146,505 B1 | 12/2006 | Harada et al. | |
| 7,246,150 B1 | 7/2007 | Donoho et al. | |
| 7,330,908 B2 * | 2/2008 | Jungck | 709/246 |
| 7,346,649 B1 | 3/2008 | Wong | |
| 7,570,663 B2 * | 8/2009 | Jungck | 370/498 |
| 7,624,142 B2 * | 11/2009 | Jungck | 709/201 |
| 7,894,440 B2 | 2/2011 | Xu et al. | |
| 8,204,082 B2 * | 6/2012 | Jungck et al. | 370/498 |
| 2002/0009079 A1 * | 1/2002 | Jungck et al. | 370/389 |
| 2002/0065938 A1 * | 5/2002 | Jungck et al. | 709/246 |
| 2002/0112073 A1 | 8/2002 | MeLampy et al. | |
| 2002/0194291 A1 | 12/2002 | Jungck et al. | |
| 2003/0009651 A1 | 1/2003 | Najam et al. | |
| 2003/0018796 A1 | 1/2003 | Chou et al. | |
| 2003/0187992 A1 | 10/2003 | Steenfeld et al. | |
| 2006/0029038 A1 | 2/2006 | Jungck | |
| 2006/0029104 A1 * | 2/2006 | Jungck | 370/498 |
| 2010/0103837 A1 | 4/2010 | Jungck et al. | |

FOREIGN PATENT DOCUMENTS

| | | |
|---|---|---|
| WO | WO 99/05584 | 2/1999 |
| WO | WO 99/09725 | 2/1999 |
| WO | WO 99/27684 | 6/1999 |
| WO | WO 99/60459 | 11/1999 |
| WO | WO 00/14938 | 3/2000 |
| WO | WO 00/27092 | 5/2000 |
| WO | WO 00/28713 | 5/2000 |

OTHER PUBLICATIONS

A Common Multi-Agent Testbed for Diverse Seamless Personal Information Networking Applications, Abu-Hakima et al., Jul. 1998.

John Pescatore, Gartner Analyst, "Commentary: Digging into the DNS foundation," obtained at internet address, http://news.cnet.com/news/0-1005-202-2080091.html, Jun. 15, 2000.

Rainbow Technologies Products, "CryptoSwift eCommerce Accelerator," obtained at internet address, http://isg.rainbow.com/products/cs_1.html Aug. 5, 2000.

FlowWise Networks, Inc., "AutoRoute™ Automatic Configuration of Layer 3 Routing," www.flowwise.com.

FlowWise, "Router Accelerator—RA 7000 from FlowWise," obtained at internet address http://www.flowise.com/products/ra7000.htm.

Intel® IXP1200 Network Processor, obtained at internet address, http://developer.intel.com/design/network/ixp1200.htm.

Marshall Brain, How Stuff Works, "How Web Servers and the Internet Work," obtained at internet address http://www.howstuffworks.com/web-server.htm.

Marshall Brain, How Stuff Works, "How Domain Name Servers Work," obtained at internet address http://www.howstuffworks.com/dns.htm.

Curt Franklin, How Stuff Works, "How Routers Work," obtained at internet address http://www.howstuffworks.com/router.htm.

Microsoft Corporation, Sep. 1998 "Introduction to TCP/IP," obtained at internet address http://msdn.microsoft.com/library/backgrnd/html/tcpipintro.htm.

Robert Stone, "CenterTrack: An IP Overlay Network for Tracking DoS Floods," Article Oct. 1, 1999, pp. 1-9.

Chapter 1 TCP/IP Fundamentals, obtained at internet address http://webdocs.sequent.com/docs/tcpoac01/ch_1.htm, pp. 1-28.

Cheng Wu, "Web Switching: A New Generation of Networking," pp. 1-3.

ArrowPoint Communications™ Article, "A Comparative Analysis of Web Switching Architectures," pp. 1-11.

ArrowPoint Communications™, Brochure, "The Top 12 Benefits of Content Intelligence.".

(56) References Cited

OTHER PUBLICATIONS

L. Peter Deutsch, "DEFLATE Compressed Data Format Specification," May 1996.
Antaeus Feldspar, Article, "An Explanation of the Deflate Algorithm," Sep. 11, 1997.
ArrowPoint Communications™ CDDCenter Vendor Listing, "ArrowPoint CS-50 Highlights" obtained at internet address http://www.cddcenter.com/arrowpoint.htm, May 21, 2000.
Peter Christy, Analyst Commentary, "When to Distribute Content—The Peters' Principles," obtained at internet address http://www.cddcenter.com/index.html, May 21, 2000.
Content Delivery 101: An Introduction to Content Distribution & Delivery.
CDDCenter, "How Do Caching and Content Delivery Really Differ?" obtained at internet address http://www.cddcenter.com/cachingvcontent.htm, pp. 1-4, May 21, 2000.
Internet Research Group "Infrastructure Application Service Providers," Feb. 2000, pp. 1-7.
Peter Christy, Internet Research Group, "Content Delivery Architectures: Why Doesn't One Size Fit All?" pp. 1-12.
Steven Vonder Haar, inter@ctive Week, Feb. 14, 2000, "Content Delivery Shifts to Edge of Net," obtained at internet address http://www.zdnet.com/intweek/stories/news/0,4164,2436865.00.html, Dated May 22, 2000.
David Willis, Network Computing, "The Content-Delivery Edge," obtained at internet address http://www.networkcomputing.com/1103/1103colwillis.html, Dated May 22, 2000.
Phrack Magazine, "IP-spoofing Demystified (Trust-Relationship Exploitation)" Vol. Seven, Issue Forty-Eight, File 14 of 18. pp. 1-9, obtained at internet address http://www.fc.net/phrack/files/p48/p48-14.html, Dated Jun. 5, 2000.
Eddie Mission, "What is Eddie?", obtained at internet address http://www.eddieware.org/what.html, Dated Apr. 21, 2000.
Cisco Enterprise Solutions, "Quality of Service," obtained at internet address http://www.cisco.com/warp/public/779/largeent/learn/technologies/qos/.
Cisco White Paper, "Delivering End-to-End Security in Policy-Based Networks," obtained at internet address, http://www.cisco.com/warp/public/cc/pd/nemnsw/cap/tech/deesp_wp.htm.
Technology Packeteer, obtained at internet address, http://www.packeteer.com/technology/index.cfm.
Overview Cisco Content Networking, obtained at internet address http://www.cisco.com/warp/public/cc/so/neso/ienesv/cxne/ccnov_ov.htm.
Overview Cisco Secure Policy Manager 2.0, obtained at internet address http://www.cisco.com/warp/public/cc/pd/sqsw/sqppmn/prodlit/secmn_ov.htm.
Alteon Web Systems, White Paper "Optimizing ISP Networks and Services with DNS Redirection," Aug. 1999.
Alteon Web Systems, White Paper "Virtual Matrix Architecture Scaling Web Services for Performance and Capacity," Apr. 2000.
Alteon Web Systems, White Paper, Questions and Answers, pp. 1-3.
3Com Technical Papers, Layer 3 Switching, May 1998.
Web Cache Communication Protocol Version 2, pp. C-1 to C-54.
RFC2267 Working Group—Denial of Service Counter Measures, Tele-conference Meeting Aug. 25, 2000, Moderator, Henry Teng of eBay.
Track-back Architecture General Requirements Version 0.1, Initial Draft submitted to Counter-DoS Solutions Working Group, Jul. 31, 2000, Edited by Bob Geiger, Recourse Technologies.
SwitchOn Networks, Inc., ClassiPI™ At-a-Glance.
C-Port™ A Motorola Company, C-5™ Digital Communications Processor, Product Brief, pp. 1-8, May 4, 2000.
Peder Jungck, "Building a Faster Cache Server" A Theoretical Whitepaper, Silicon Valley Internet Capital, pp. 1-19.
IXF1002 Dual Port Gigabit Ethernet MAC, Product Brief, Level One™ an Intel Company.
NetLogic Microsystems Product Overview.
Agere, Inc. "The Challenge for Next Generation Network Processors", Sep. 10, 1999.
Philips "VMS747 Security Processor," Overview and Features, pp. 1-3, date of release Jan. 2000, ©Philips Electronics N.V. 1999.
Cisco Systems, Cisco 12000 Series GSR, "Performing Internet Routing and Switching at Gigabit Speeds," obtained at internet address, http://www.cisco.com/warp/public/cc/pd/rt/12000/.
Cisco Systems, "Cisco 10000 Edge Service Router," obtained at internet address, http://www.cisco.com/warp/public/cc/pd/rt/10000/.
Nortel Networks™ "Passport 8600 Routing Switch," obtained at internet address, http://www.nortelnetworks.com/products/01/passport/8600/index.html.
Lucent Technologies, "InterNetworking Systems," obtained at internet address, http://www.lucent.com/ins/products/grf/.
Lucent Technologies, "InterNetworking Systems," obtained at internet address, http://www.lucent.com/ins/products/grf/grf1600.html.
Juniper Networks, "M20 Internet Backbone Router," Datasheet, obtained at internet address, http://www.juniper.net/products/dsheet/100009.html.
Juniper Networks, "M40 Internet Backbone Router," Datasheet, obtained at internet address, http://www.juniper.net/products/dsheet100001.html.
Juniper Networks, Inc., "M160 Internet Backbone Router" Datasheet, obtained at internet address, http://www.juniper.net/products/dsheet/10012.
Rajeev Kumar, Intel Confidential, "IXP1200 Overview".
Intel "IXP1200 Network Processor," Datasheet, pp. 1-109 (out of 146 pages), May, 2000.
Cisco 7500 Series Routers, pp. 1-2, obtained at internet address http://www.cisco.com/warp/public/cc/pd/rt/7500/.
Philips Semiconductors—I2C-bus, News and Events, obtained at internet address, http://www.semiconductors.philips.comi2c/, Jul. 28, 2001.
Comnet Booth #4421 "VHB Technologies Introduces Breakthrough Appliance for High-Bandwidth Networks at Comnet" News Release, Jan. 29, 2001, VHB Technologies, Inc., Richardson, Texas.
VHB Technologies, Inc. presents "The VIPRE™ NPU.".
VHB Technologies News & Views, "Pioneering Gigabit-Speed Content-Intelligent Appliances".
VHB Technologies, A Security Technology Paper, Defending Against Denial-of-Service Attacks with the . . . . VHB-2000 Network Security Appliance.
Netlogic Microsystems™ Product Brief, obtained at internet address, http://www.netlogicmicro.com/html/datasheets/nse3128.html, pp. 1-2, May 11, 2001.
Switch On Networks, Inc. "ClassiPI" Content Co-Processor, general content and features brochure, pp. 1-5.
C-Port, "C-5™ Digital Communications Processor" Product Brief, pp. 1-8, © 1999-2000 C-Port Corporation, May 4, 2000.
NetLogic Microsystems™ "Policy Co-Processor™" applications and features sheet, p. 1.
NetLogic Microsystems™ "CIDR Co-Processor™" applications and features sheet, p. 1.
NetLogic Microsystems ™ "IPCAM® Ternary CAM" application and features sheets, pp. 1-2.
NetLogic Microsystems ™ "SynCAM® Binary CAM" application and features sheet, p. 1.
NetLogic Microsystems ™ "NCAM Binary CAM" application and features sheet, p. 1.
NetLogic Microsystems ™ product overview, pp. 1-2.
Level One™ an Intel Company "IXF1002 Dual Port Gigabit Ethernet MAC," product brief, pp. 1-2, Copyright ©2000 Level One Communications, Inc.
Agere, Inc., Agere White Paper, "Building Next Generation Network Processors," Sep. 10, 1999, pp. 1-8.
Eric J. Rothfus, Agere, Inc., Agere White Paper, "The Case for a Classification Language," Sep. 10, 1999, pp. 1-7.
Web Cache Communication Protocol Version 2, Appendix C, Cisco Cache Engine User Guide, Version 2.0.0, pp. C1-C54.
CloudShield Technologies, Inc., White Paper, "Security at Optical Speed," pp. 1-10, Jan. 21, 2001.

(56) References Cited

OTHER PUBLICATIONS

NetLogic Microsystems™ Product Brief "NSE3128 Network Search Engine," obtained at internet address http://209.10.226.214/html/datasheets/nse3128.html pp. 1-2, May 11, 2001.
Listing of Well Known Port Numbers assigned by the Internet Assigned Numbers Authority, obtained at the internet address , http://www,iana.org/assignments/port-numbers pp. 1-55, Aug. 5, 2000.
PM2329 PMC-Sierra, "ClassiPI™ Network Classification Processor," Overview and Features sheet pp. 1-2, 2001 Copyright PMC-Sierra, Inc. Jan. 2001.
3com Virtual Lan Tutorial, obtained from http://munshi.sonoma.edu/s97/bus420/vlan.html, Jul. 21, 2003, pp. 1-21.
Przygienda and Droz, Abstract "Proxy PNNI Augmented Routing (Proxy PAR)", pp. 371-377, ©1998 IEEE.
Stevenson and Julin, Abstract, "Client-Server Interactions in Multi-Server Operating," Sep. 1994, 16 pages.
JISC JTAP Report "Network Delivery of High Quality MPEG-2 Digital Video," Oct. 1998, 58 pages.
Integrating Java-based Mobile Agents into Web Servers under . . .—Fünfrocken (1998); www.isa.informatik.tu-darmstadt.de/VS/Publikationen/Fuenfrocken/papers/hicss98-wasp.ps.
Adaptive Scheduling with Client Resources to Improve WWW ..—Andresen, Yang (1996); www.cs.ucsb.edu/TRs/techreports/TRCS96-27.ps.
Enabling the Internet to Deliver Content-Oriented Services—Beck, Hofmann (2001); www.cs.bu.edu/techreports/2001-017-wcw01-proceedings/107_beck.pdf.
Corpus-Based Leaning of Compound Noun Indexing—Ung-Kwan Kwak Jee-Hyub (2000) www.ai.mit.edu/people/jimmylin/papers/Kwak00.pdf.
The Role of Test Cases in Automated Knowledge Refinement—Palmer, Craw (1996) www.scms.rgu.ac.uk/publications/96/96 4.ps.gz.
The Policy Obstacle Course: The Realisation of Low-Level..—Schema York Jul. www.cs.york.ac.uk/~jdm/pubs/polobstc.ps.Z.
Data Filter Architecture Pattern Robert Flanders and Eduardo..—Dept of Computer jerry.cs.uiuc.edu/~plop/plop99/proceedings/Fernandez5/Flanders 3.PDF.
System Design Issues for Internet Middleware Services: Deductions..—Gribble (1997) http.cs.berkeley.edu/~gribble/papers/msc_thesis.ps.gz.
Implementing a Secure rlogin Environment: A Case Study of..—Kim, Orman, O'Malley (1995) ftp.c.s.arizona.edu/xkernel/Papers/rlogin.ps.
A Hierarchical Mobility Management Scheme for Ipv6—Claude Castelluccia ballesta.inrialpes.fr/Infos/Personnes/Claude.Castelluccia/iscc98.ps.gz.

\* cited by examiner

TRANSPARENT PROVISIONING OF SERVICES OVER A NETWORK

RELATED APPLICATIONS

This application is a continuation under 37 C.F.R. §1.53(b) of U.S. patent application Ser. No. 12/493,312, filed Jun. 29, 2009, now U.S. Pat. No. 8,204,082, the entire disclosure of which is hereby incorporated by reference, which is a continuation-in-part under 37 C.F.R. §1.53(b) of U.S. patent application Ser. No. 11/189,172, filed Jul. 25, 2005, now U.S. Pat. No. 7,570,663, the entire disclosure of which is hereby incorporated by reference, which is a continuation under 37 C.F.R. §1.53(b) of U.S. patent application Ser. No. 09/858,309, filed May 15, 2001, now U.S. Pat. No. 7,032,031, the entire disclosure of which is hereby incorporated by reference, which is a continuation-in-part under 37 C.F.R. §1.53(b) of U.S. patent application Ser. No. 09/602,129, filed Jun. 23, 2000, now U.S. Pat. No. 6,829,654, the entire disclosure of which is hereby incorporated by reference.

BACKGROUND

The Internet is growing by leaps and bounds. Everyday, more and more users log on to the Internet for the first time and these, and existing users are finding more and more content being made available to them. The Internet has become a universal medium for communications, commerce and information gathering.

Unfortunately, the growing user base along with the growing content provider base is causing ever increasing congestion and strain on the Internet infrastructure, the network hardware and software plus the communications links that link it all together. While the acronym "WWW" is defined as "World Wide Web", many users of the Internet have come to refer to it as the "World Wide Wait."

These problems are not limited to the Internet either. Many companies provide internal networks, known as intranets, which are essentially private Internets for use by their employees. These intranets can become overloaded as well. Especially, when a company's intranet also provides connectivity to the Internet. In this situation, the intranet is not only carrying internally generated traffic but also Internet traffic generated by the employees.

The growth of the Internet has also resulted in more and more malicious programmer activity. These "hackers" spread virus programs or attempt to hack into Web sites in order to steal valuable information such as credit card numbers. Further, there have been an increasing number of "Denial of Service" attacks where a hacker infiltrates multiple innocent computers connected to the Internet and coordinates them, without their owners' knowledge, to bombard a particular Web site with an immense volume of traffic. This flood of traffic overwhelms the target's servers and literally shuts the Web site down.

Accordingly, there is a need for an enhanced Internet infrastructure to more efficiently deliver content from providers to users and provide additional network throughput, reliability, security and fault tolerance.

BRIEF DESCRIPTION OF THE DRAWINGS

FIG. 4A depicts a block diagram of the content delivery system of FIG. 4.

FIG. 5A depicts a block diagram of the content delivery system of FIG. 5.

FIG. 6A depicts a block diagram of the content delivery system of FIG. 6.

DETAILED DESCRIPTION OF THE PRESENTLY PREFERRED EMBODIMENTS

Figure 1:
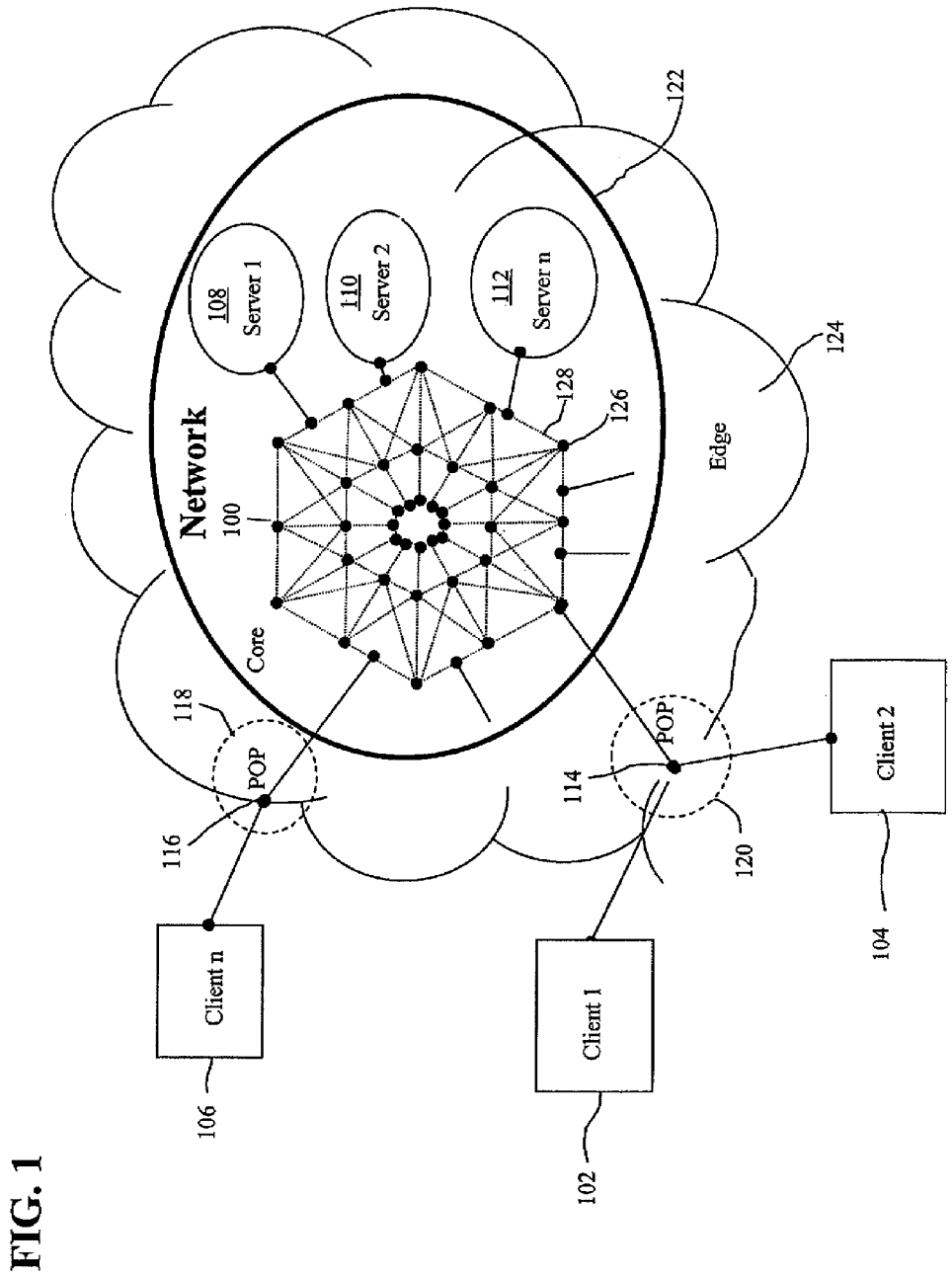
FIG. 1 depicts an exemplary network for use with the disclosed embodiments.

FIG. 1 shows an exemplary network 100 for use with the disclosed embodiments. In one embodiment, the network 100 is a publicly accessible network, and in particular, the Internet. While, for the purposes of this disclosure, the disclosed embodiments will be described in relation to the Internet, one of ordinary skill in the art will appreciate that the disclosed embodiments are not limited to the Internet and are applicable to other types of public networks as well as private networks, and combinations thereof, and all such networks are contemplated.

I. Introduction

As an introduction, a network interconnects one or more computers so that they may communicate with one another, whether they are in the same room or building (such as a Local Area Network or LAN) or across the country from each other (such as a Wide Area Network or WAN). A network is a series of points or nodes 126 interconnected by communications paths 128. Networks can interconnect with other networks and can contain sub-networks. A node 126 is a connection point, either a redistribution point or an end point, for data transmissions generated between the computers which are connected to the network. In general, a node 126 has a programmed or engineered capability to recognize and process or forward transmissions to other nodes 126. The nodes 126 can be computer workstations, servers, bridges or other devices but typically, these nodes 126 are routers or switches.

A router is a device or, in some cases, software in a computer, that determines the next network node 126 to which a piece of data (also referred to as a "packet" in the Internet context) should be forwarded toward its destination. The router is connected to at least two networks or sub-networks and decides which way to send each information packet based on its current understanding of the state of the networks to which it is connected. A router is located at any juncture of two networks, sub-networks or gateways, including each Internet point-of-presence (described in more detail below). A router is often included as part of a network switch. A router typically creates or maintains a table of the available routes and their conditions and uses this information along with distance and cost algorithms to determine the best route for a given packet. Typically, a packet may travel through a number of network points, each containing additional routers, before arriving at its destination.

The communications paths 128 of a network 100, such as the Internet, can be coaxial cable, fiber optic cable, telephone cable, leased telephone lines such as T1 lines, satellite links, microwave links or other communications technology as is known in the art. The hardware and software which allows the network to function is known as the "infrastructure." A network 100 can also be characterized by the type of data it carries (voice, data, or both) or by the network protocol used to facilitate communications over the network's 100 physical infrastructure.

The Internet, in particular, is a publicly accessible worldwide network 100 which primarily uses the Transport Control Protocol and Internet Protocol ("TCP/IP") to permit the exchange of information. At a higher level, the Internet supports several applications protocols including the Hypertext Transfer Protocol ("HTTP") for facilitating the exchange of HTML/World Wide Web ("WWW") content, File Transfer Protocol ("FTP") for the exchange of data files, electronic mail exchange protocols, Telnet for remote computer access and Usenet ("NNTP" or Network News Transfer Protocol) for the collaborative sharing and distribution of information. It will be appreciated that the disclosed embodiments are applicable to many different applications protocols both now and later developed.

Logically, the Internet can be thought of as a web of intermediate network nodes 126 and communications paths 128 interconnecting those network nodes 126 which provide multiple data transmission routes from any given point to any other given point on the network 100 (i.e. between any two computers connected to the network 100). Physically, the Internet can also be thought of as a collection of interconnected sub-networks wherein each sub-network contains a portion of the intermediate network nodes 126 and communications paths 128. The division of the Internet into sub-networks is typically geographically based, but can also be based on other factors such as resource limitations and resource demands. For example, a particular city may be serviced by one or more Internet sub-networks provided and maintained by competing Internet Service Providers ("ISPs") (discussed in more detail below) to support the service and bandwidth demands of the residents.

Contrasting the Internet with an intranet, an intranet is a private network contained within an enterprise, such as a corporation, which uses the TCP/IP and other Internet protocols, such as the World Wide Web, to facilitate communications and enhance the business concern. An intranet may contain its own Domain Name Server ("DNS") and may be connected to the Internet via a gateway, i.e., an intra-network connection, or gateway in combination with a proxy server or firewall, as are known in the art.

Referring back to FIG. 1, clients 102, 104, 106 and servers 108, 110, 112 are shown coupled with the network 100. Herein, the phrase "coupled with" is defined to mean directly connected to or indirectly connected with, through one or more intermediate components. Such intermediate components may include both hardware and software based components. The network 100 facilitates communications and interaction between one or more of the clients 102, 104, 106 and one or more of the servers 108, 110, 112 (described in more detail below). Alternatively, the network 100 also facilitates communications and interaction among one or more of the clients 102, 104, 106, e.g. between one client 102, 104, 106 and another client 102, 104, 106 or among one or more of the servers 108, 110, 112, e.g. between one server 108, 110, 112 and another server 108, 110, 112.

A client 102, 104, 106 may include a personal computer workstation, mobile or otherwise, wireless device such as a personal digital assistant or cellular telephone, an enterprise scale computing platform such as a mainframe computer or server or may include an entire intranet or other private network which is coupled with the network 100. Typically, a client 102, 104, 106 initiates data interchanges with other computers, such as servers 108, 110, 112 coupled with the network 100. These data interchanges most often involve the client requesting data or content from the other computer and the other computer providing that data or content in response to the request. Alternatively, the other computer coupled with the network can "push" data or content to the client 102, 104, 106 without it first being requested. For example, an electronic mail server 108, 110, 112 may automatically push newly received electronic mail over the network 100 to the client 102, 104, 106 as the new electronic mail arrives, alleviating the client 102, 104, 106 from first requesting that new mail be sent. It will be apparent to one of ordinary skill in the art that there can be many clients 102, 104, 106 coupled with the network 100.

A server 108, 110, 112 may include a personal computer workstation, an enterprise scale computing platform or other computer system as are known in the art. A server 108, 110, 112 typically responds to requests from clients 102, 104, 106 over the network 100. In response to the request, the server 108, 110, 112 provides the requested data or content to the client 102, 104, 106 which may or may not require some sort of processing by the server 108, 110, 112 or another computer to produce the requested response. It will be apparent to one of ordinary skill in the art that a client 102, 104, 106 may also be a server 108, 110, 112 and vice versa depending upon the nature of the data interchange taking place, e.g. peer-to-peer architectures. For purposes of this disclosure, during any given communication exchange, a client 102, 104, 106 requests or receives content and is separate from the server 108, 110, 112 which provides the content (whether requested or not, i.e. pushed). Servers 108, 110, 112 may be World Wide Web servers serving Web pages and/or Web content to the clients 102, 104, 106 (described in more detail below). It will be apparent to one of ordinary skill in the art that there can be many servers 108, 110, 112 coupled with the network 100.

Clients 102, 104, 106 are each coupled with the network 100 at a point of presence ("POP") 114, 116. The POP 114, 116 is the connecting point which separates the client 102, 104, 106 from the network 100. In a public network 100, such as the Internet, the POP 114, 116 is the logical (and possibly physical) point where the public network 100 ends, after which comes the private (leased or owned) hardware or private (leased or owned) network of the client 102, 104, 106. A POP 114, 116 is typically provided by a service provider 118, 120, such as an Internet Service Provider ("ISP") 118, 120, which provides connectivity to the network 100 on a fee for service basis. A POP 114, 116 may actually reside in rented space owned by telecommunications carrier such as AT&T or Sprint to which the ISP 118, 120 is connected. A POP 114, 116 may be coupled with routers, digital/analog call aggregators, servers 108, 110, 112, and frequently frame relay or A™ switches. As will be discussed below, a POP 114, 116 may also contain cache servers and other content delivery devices.

A typical ISP 118, 120 may provide multiple POP's 114, 116 to simultaneously support many different clients 102, 104, 106 connecting with the network 100 at any given time. A POP 114, 116 is typically implemented as a piece of hardware such as a modem or router but may also include software and/or other hardware such as computer hardware to couple the client 102, 104, 106 with the network 100 both physically/electrically and logically (as will be discussed below). The client 102, 104, 106 connects to the POP 114, 116 over a telephone line or other transient or dedicated connection. For example, where a client 102, 104, 106 is a personal computer workstation with a modem, the ISP 118, 120 provides a modem as the POP 114, 116 to which the client 102, 104, 106 can dial in and connect to via a standard telephone line. Where the client 102, 104, 106 is a private intranet, the POP 114, 116 may include a gateway router which is connected to an internal gateway router within the client 102, 104, 106 by a high speed dedicated communication link such as T1 line or a fiber optic cable.

A service provider 118, 120 will generally provide POP's 114, 116 which are geographically proximate to the clients 102, 104, 106 being serviced. For dial up clients 102, 104, 106, this means that the telephone calls can be local calls. For any client 102, 104, 106, a POP which is geographically proximate typically results in a faster and more reliable connection with the network 100. Servers 108, 110, 112 are also connected to the network 100 by POP's 114, 116. These POP's 114, 116 typically provide a dedicated, higher capacity and more reliable connection to facilitate the data transfer and availability needs of the server 108, 110, 112. Where a client 102, 104, 106 is a wireless device, the service provider 118, 120 may provide many geographically dispersed POP's 114, 116 to facilitate connecting with the network 100 from wherever the client 102, 104, 106 may roam or alternatively have agreements with other service providers 118, 120 to allow access by each other's customers. Each service provider 118, 120, along with its POP's 114, 116 and the clients 102, 104, 106 effectively forms a sub-network of the network 100.

Note that there may be other service providers 118, 120 "upstream" which provide network 100 connectivity to the service providers 118, 120 which provide the POP's 114, 116. Each upstream service provider 118, 120 along with its downstream service providers 118, 120 again forms a sub-network of the network 100. Peering is the term used to describe the arrangement of traffic exchange between Internet service providers (ISPs) 118, 120. Generally, peering is the agreement to interconnect and exchange routing information. More specifically, larger ISP's 118, 120 with their own backbone networks (high speed, high capacity network connections which interconnect sub-networks located in disparate geographic regions) agree to allow traffic from other large ISP's 118, 120 in exchange for traffic on their backbones. They also exchange traffic with smaller service providers 118, 120 so that they can reach regional end points where the POP's 114, 116 are located. Essentially, this is how a number of individual sub-network owners compose the Internet. To do this, network owners and service providers 118, 120, work out agreements to carry each other's network traffic. Peering requires the exchange and updating of router information between the peered ISP's 118, 120, typically using the Border Gateway Protocol (BGP). Peering parties interconnect at network focal points such as the network access points (NAPs) in the United States and at regional switching points. Private peering is peering between parties that are bypassing part of the publicly accessible backbone network through which most Internet traffic passes. In a regional area, some service providers 118, 120 have local peering arrangements instead of, or in addition to, peering with a backbone service provider 118, 120.

A network access point (NAP) is one of several major Internet interconnection points that serve to tie all of the service providers 118, 120 together so that, for example, an AT&T user in Portland, Oreg. can reach the Web site of a Bell South customer in Miami, Fla. The NAPs provide major switching facilities that serve the public in general. Service providers 118, 120 apply to use the NAP facilities and make their own inter-company peering arrangements. Much Internet traffic is handled without involving NAPs, using peering arrangements and interconnections within geographic regions.

For purposes of later discussions, the network 100 can be further logically described to comprise a core 122 and an edge 124. The core 122 of the network 100 includes the servers 108, 110, 112 and the bulk of the network 100 infrastructure, as described above, including larger upstream service providers 118, 120, and backbone communications links, etc. Effectively, the core 122 includes everything within the network 100 up to the POP's 114, 116. The POP's 114, 116 and their associated hardware lie at the edge 124 of the network 100. The edge 124 of the network 100 is the point where clients 102, 104, 106, whether single devices, computer workstations or entire corporate internal networks, couple with the network 100. As defined herein, the edge 124 of the network 100 may include additional hardware and software such as Domain Name Servers, cache servers, proxy servers and reverse proxy servers as will be described in more detail below. Typically, as the network 100 spreads out from the core 122 to the edge 124, the total available bandwidth of the network 100 is diluted over more and more lower cost and lower bandwidth communications paths. At the core 122, bandwidth over the higher capacity backbone interconnections tends to be more costly than bandwidth at the edge 124 of the network 100. As with all economies of scale, high bandwidth interconnections are more difficult to implement and therefore rarer and more expensive than low bandwidth connections. It will be appreciated, that even as technology progresses, newer and higher bandwidth technologies will remain more costly than lower bandwidth technologies.

II. The World Wide Web

As was discussed above, clients 102, 104, 106 engage in data interchanges with servers 108, 110, 112. On the Internet, these data exchanges typically involve the World Wide Web ("WWW"). Relative to the TCP/IP suite of protocols (which are the basis for information exchange on the Internet), HTTP is an application protocol. A technical definition of the World Wide Web is all the resources and users on the Internet that are using the Hypertext Transfer Protocol ("HTTP"). HTTP is the set of rules for exchanging data in the form of files (text, graphic images, audio, video, and other multimedia files, such as streaming media and instant messaging), also known as Web content, between clients 102, 104, 106 and servers 108, 110, 112. Servers 108, 110, 112 which serve Web content are also known as Web servers 108, 110, 112.

Essential concepts that are part of HTTP include (as its name implies) the idea that files/content can contain references to other files/content whose selection will elicit additional transfer requests. Any Web server 108, 110, 112 contains, in addition to the files it can serve, an HTTP daemon, a program that is designed to wait for HTTP requests and handle them when they arrive. A personal computer Web browser program, such as Microsoft™ Internet Explorer, is an HTTP client program (a program which runs on the client 102, 104, 106), sending requests to Web servers 108, 110, 112. When the browser user enters file requests by either "opening" a Web file (typing in a Uniform Resource Locator or URL) or clicking on a hypertext link, the browser builds an HTTP request and sends it to the Web server 108, 110, 112 indicated by the URL. The HTTP daemon in the destination server 108, 110, 112 receives the request and, after any necessary processing, returns the requested file to the client 102, 104, 106.

The Web content which a Web server typically serves is in the form of Web pages which consist primarily of Hypertext Markup Language. Hypertext Markup Language ("HTML") is the set of "markup" symbols or codes inserted in a file usually containing text intended for display on a World Wide Web browser. The markup tells the Web browser how to display a Web page's content for the user. The individual markup codes are referred to as elements or tags. Web pages can further include references to other files which are stored separately from the HTML code, such as image or other multimedia files to be presented in conjunction with the text Web content.

A Web site is a related collection of Web files/pages that includes a beginning HTML file called a home page. A company or an individual tells someone how to get to their Web site by giving that person the address or domain name of their home page (the addressing scheme of the Internet and the TCP/IP protocol is described in more detail below). From the home page, links are typically provided, either directly or through intermediate pages, to all the other pages (HTML files) located on their site. For example, the Web site for IBM™ has the home page address of http://www.ibm.com. Alternatively, the home page address may include a specific file name like index.html but, as in IBM's case, when a standard default name is set up, users don't have to enter the file name. IBM's home page address leads to thousands of pages, but a Web site may also consist of just a few pages.

Since site implies a geographic place, a Web site can be confused with a Web server 108, 110, 112. As was discussed above, a server 108, 110, 112 is a computer that holds and serves the HTML files, images and other data for one or more Web sites. A very large Web site may be spread over a number of servers 108, 110, 112 in different geographic locations or one server 108, 110, 112 may support many Web sites. For example, a Web hosting company may provide server 108, 110, 112 facilities to a number of Web sites for a fee. Web sites can also contain links to pages or files on other Web sites.

III. The Domain Name System

As was described above, the network 100 facilitates communications between clients 102, 104, 106 and servers 108, 110, 112. More specifically, the network 100 facilitates the transmission of HTTP requests from a client 102, 104, 106 to a server 108, 110, 112 and the transmission of the server's 108, 110, 112, response to that request, the requested content, back to the client 102, 104, 106. In order to accomplish this, each device coupled with the network 100, whether it be a client 102, 104, 106 or a server 108, 110, 112 must provide a unique identifier so that communications can be routed to the correct destination. On the Internet, these unique identifiers comprise domain names (which generally will include World Wide Web Uniform Resource Locators or "URL's") and Internet Protocol addresses or "IP" addresses. Every client 102, 104, 106 and every server 108, 110, 112 must have a unique IP address so that the network 100 can reliably route communications to it. Additionally, clients 102, 104, 106 and servers 108, 110, 112 can be coupled with proxy servers (forward, reverse or transparent), discussed in more detail below, which allow multiple clients 102, 104, 106 or multiple servers 108, 110, 112 to be associated with a single domain name or a single IP address. In addition, a particular server 108, 110, 112 may be associated with multiple domain names and/or IP addresses for more efficient handling of requests or to handle multiple content providers, e.g. multiple Web sites, on the same server 108, 110, 112. Further, as was discussed above, since a POP 114, 116 provides the connecting point for any particular client 102, 104, 106 to connect to the network 100, it is often satisfactory to provide each POP 114, 116 with a single unique domain name and IP address since the POP 114, 116 will reliably deliver any communications received by it to its connected client 102, 104, 106. Where the client 102, 104, 106 is a private network, it may have its own internal hardware, software and addressing scheme (which may also include domain names and IP addresses) to reliably deliver data received from the POP 114, 116 to the ultimate destination within the private network client 102, 104, 106.

As was discussed, the Internet is a collection of interconnected sub-networks whose users communicate with each other. Each communication carries the address of the source and destination sub-networks and the particular machine within the sub-network associated with the user or host computer at each end. This address is called the IP address (Internet Protocol address). In the current implementation of the Internet, the IP address is a 32 bit binary number divided into four 8 bit octets. This 32-bit IP address has two parts: one part identifies the source or destination sub-network (with the network number) and the other part identifies the specific machine or host within the source or destination sub-network (with the host number). An organization can use some of the bits in the machine or host part of the address to identify a specific sub-network within the sub-network. Effectively, the IP address then contains three parts: the sub-network number, an additional sub-network number, and the machine number.

One problem with IP addresses is that they have very little meaning to ordinary users/human beings. In order to provide an easier to use, more user friendly network 100, a symbolic addressing scheme operates in parallel with the IP addressing scheme. Under this symbolic addressing scheme, each client 102, 104, 106 and server 108, 110, 112 is also given a "domain name" and further, individual resources, content or data are given a Uniform Resource Locator ("URL") based on the domain name of the server 108, 110, 112 on which it is stored. Domain names and URL's are human comprehensible text and/or numeric strings which have symbolic meaning to the user. For example, a company may have a domain name for its servers 108, 110, 112 which is the company name, i.e., IBM Corporation's domain name is ibm.com. The portion of the domain name immediately following the period or "dot" is used to identify the type of organization to which the domain name belongs. These are called "top-level" domain names and include coin, edu, org, mil, gov, etc. Com indicates a corporate entity, edu indicates an educational institution, mil indicates a military entity, and gov indicates a government entity. It will be apparent to one of ordinary skill in the art that the text strings which make up domain names may be arbitrary and that they are designed to have relevant symbolic meaning to the users of the network 100. A URL typically includes the domain name of the provider of the identified resource, an indicator of the type of resource and an identifier of the resource itself. For example, for the URL "http://www.ibm.com/index.html", http identifies this resource as a hypertext transfer protocol compatible resource, www.ibm.com is the domain name (again, the www is arbitrary and typically is added to indicate to a user that the server 108, 110, 112, associated with this domain name is a world wide Web server), and index.html identifies a hypertext markup language file named "index.html" which is stored on the identified server 108, 110, 112.

Domain names make the network 100 easier for human beings to utilize it, however the network infrastructure ultimately uses IP addresses, and not domain names, to route data to the correct destination. Therefore, a translation system is provided by the network 100 to translate the symbolic human comprehensible domain names into IP addresses which can then be used to route the communications. The Domain Name System ("DNS") is the way that Internet domain names are located and translated into IP addresses. The DNS is a distributed translation system of address translators whose primary function is to translate domain names into IP addresses and vice versa. Due to the ever expanding number of potential clients 102, 104, 106 and servers 108, 110, 112 coupled with the network 100 (currently numbering in the millions), maintaining a single central list of domain name/IP address correspondences would be impractical. Therefore, the lists of domain names and corresponding IP addresses are distributed throughout the Internet in a hierarchy of authority. A DNS server, typically located within close geographic proximity to a service provider 118, 120 (and likely provided by that service provider 118, 120), handles requests to translate the domain names serviced by that service provider 118, 120 or forwards those requests to other DNS servers coupled with the Internet for translation.

DNS translations (also known as "lookups" or "resolutions") can be forward or reverse. Forward DNS translation uses an Internet domain name to find an IP address. Reverse DNS translation uses an Internet IP address to find a domain name. When a user enters the address or URL for a Web site or other resource into their browser program, the address is transmitted to a nearby router which does a forward DNS translation in a routing table to locate the IP address. Forward DNS translations are the more common translation since most users think in terms of domain names rather than IP addresses. However, occasionally a user may see a Web page with a URL in which the domain name part is expressed as an IP address (sometimes called a dot address) and wants to be able to see its domain name, to for example, attempt to figure out the identity of who is providing the particular resource. To accomplish this, the user would perform a reverse DNS translation.

The DNS translation servers provided on the Internet form a hierarchy through which any domain name can be "resolved" into an IP address. If a particular DNS translation server does not "know" the corresponding IP address of a given domain name, it "knows" other DNS translation servers it can "ask" to get that translation. This hierarchy includes "top-level" DNS translation servers which "know" which resources (clients 102, 104, 106 or servers 108, 110, 112) have a particular top level domain identifier, i.e. corn, gov, edu, etc. as described above. This hierarchy further continues all the way up to the actual resource (client 102, 104, 106 or server 108, 110, 112) which is typically affiliated with a DNS translation server which "knows" about it and its IP address. A particular DNS translation server "knows" of a translation when it exists in its table of translations and has not expired. Any particular translation will typically be associated with a Time to Live ("TTL") which specifies a duration, time or date after which the translation expires. As discussed, for a given translation, if a DNS translation server does not know the translation, because it is not in its routing table or it has expired, that DNS translation server will have to inquire up the hierarchical chain of DNS translation servers in order to make the translation. In this way, new domain name and IP address translations can be propagated through the DNS translation server hierarchy as new resources are added and old resources are assigned new addresses.

Figure 2:
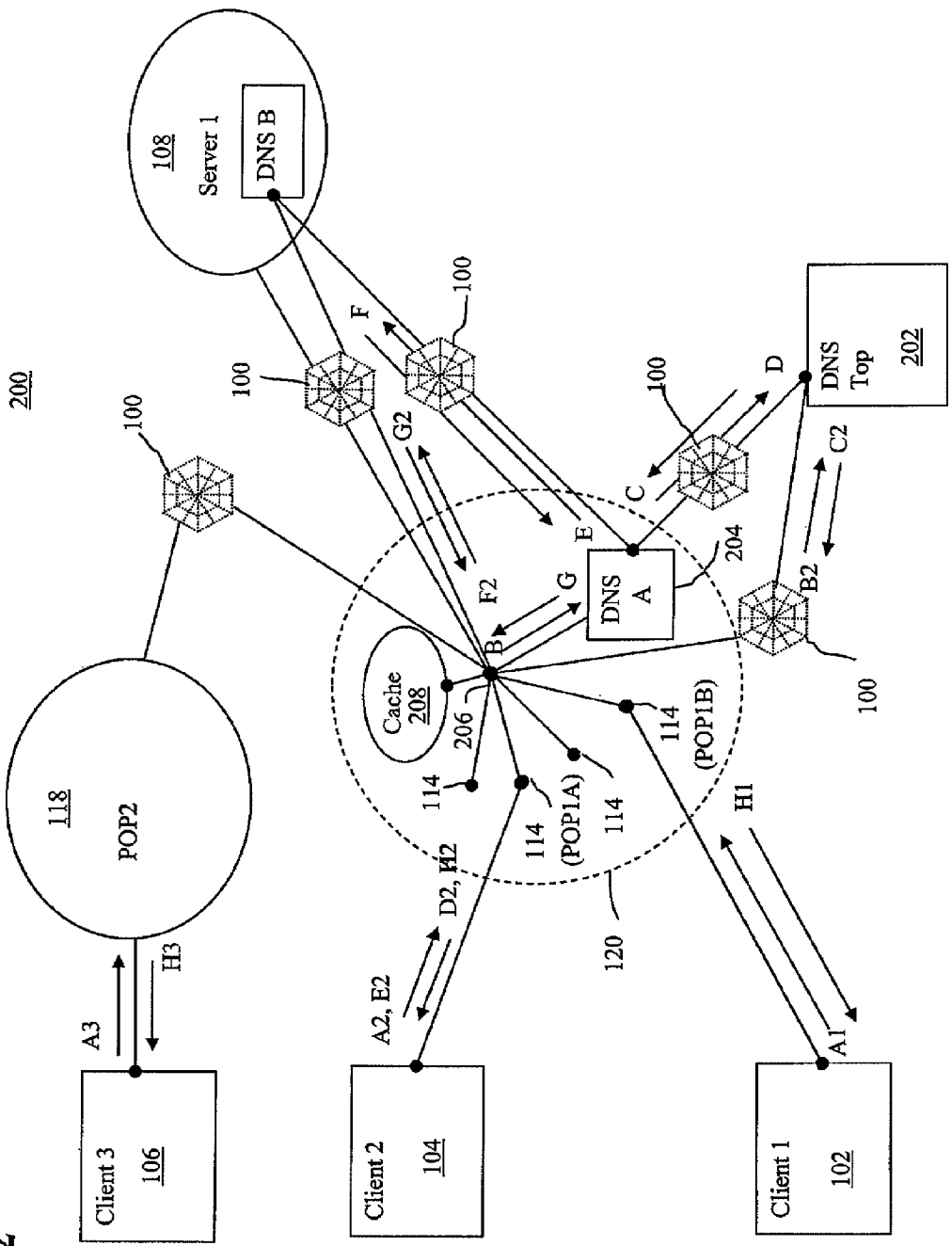
FIG. 2 depicts the operations of the Domain Name System of the exemplary network of FIG. 1.

Referring now to FIG. 2, there is shown a diagram illustrating the basic operation of the Domain Name System 200. Depicted in the figure are clients 102, 104, 106, labeled "Client 1", "Client 2" and "Client 3." Clients 1 and 2 are coupled with POP's 114 provided by service provider 120, labeled "POP1A" and "POP1B." Client 3 is coupled with a POP (not shown) provided by service provider 118, labeled "POP2." In addition, service providers 118, 120 may provide additional POP's 114 for other clients 102, 104, 106 as described above. Service provider 120 is shown further coupled with service provider 118, a server 108, labeled "Server 1", which may be a Web server and or an entire Web site which may comprise multiple sub-servers (not shown) as discussed above, and a top-level DNS translation server 202, labeled "DNS Top", all via the network 100 which may be the Internet. Furthermore, service provider 120 further includes a DNS translation server 204, labeled "DNS A" and routing and interconnection hardware 206, as described above, to electrically and logically couple the POP's 114 with the network 100. Optionally, the service provider 120 may also include a cache server 208 or proxy server (not shown) to enhance content delivery as described below.

In order for a client 102, 104, 106 to generate a request for content to a particular server 108, the client 102, 104, 106 first determines the IP address of the server 108 so that it can properly address its request. Referring to Client 1 102, an exemplary DNS translation transaction where the client 102, 104, 106 is a single workstation computer is depicted. A user of Client 1 enters a URL or domain name of the Server 1 108 and specific resource contained within Server 1, such as a sub-server, into their browser program in order to make a request for content. The browser program typically handles negotiating the DNS translation transaction and typically has been pre-programmed ("bound") with the IP address of a particular DNS translation server to go to first in order to translate a given domain name. Typically, this bound DNS translation server will be DNS A 204 provided by the service provider 120. Alternatively, where the client 102, 104, 106 is not bound to a particular DNS translation server, the service provider 120 can automatically route translation requests received by its POP's 114 to its DNS translation server, DNS A 202. The process by which a domain name is translated is often referred to as the "slow start" DNS translation protocol.

This is in contrast to what is known as the "slow start HTTP" protocol which will be discussed below in more detail in relation to content delivery.

Client 1 102 then sends its translation request, labeled as "A1", to its POP 114, POP1A. The request, A1, is addressed with a return address of Client 1 and with the IP address of the bound DNS A 204 therefore the service provider's 120 routing equipment 206 automatically routes the request to DNS A 204, labeled as "B." Assuming DNS A 204 does not know how to translate the given domain name in the request or the translation in its routing table has expired, it must go up the DNS hierarchy to complete the translation. DNS A 204 will then forward a request, labeled "C", upstream to the top-level DNS translation server 202 associated with the top-level domain in the domain address, i.e. corn, gov, edu etc. DNS A 204 has been pre-programmed with the IP addresses of the various hierarchical servers that it may need to talk to in order to complete a translation. DNS A 204 addresses request C with the IP address of the top-level DNS server 202 and also includes its own return address. DNA then transmits the request over the network 100 which routes the request to the top level DNS server 202. The top-level DNS server 202 will then translate and return the IP address corresponding to Server 1 108 back to DNS A 204 via the network 100, labeled "D."

As was discussed above, a particular domain name may be associated with multiple IP addresses of multiple sub-servers 108, 110, 112, as in the case of a Web site which, due to its size, must be stored across multiple sub-servers 108, 110, 112. Therefore, in order to identify the exact sub-server which can satisfy the request of the Client 1 102, DNS A 204 must further translate the domain address into the specific sub-server 108. In order to accomplish this, Server 1 108 provides its own DNS translation server 210 which knows about the various sub-servers and other resources contained within Server 1 108. DNS A 204, now knowing the IP address of Server 1 108, e.g. the Web site generally, can create a request, labeled "E", to translate the domain name/URL provided by Client 1 102 into the exact sub-server/resource on Server 1 108. DNS B 210 returns the translation, labeled "F", to DNS A 204 which then returns it to Client 1 102 via the service provider's routing equipment 206, labeled "G", which routes the response through POP1A 114 to the Client 1, labeled "H1." Client 1 102 now has the IP address it needs to formulate its content requests to Server 1 108.

FIG. 2, further depicts an exemplary DNS translation transaction wherein the client 102, 104, 106 is a private network such as an intranet. For example, client 2 104 may comprise its own network of computer systems. Further more, client 2 104 may provide its own DNS translation server (not shown) to handle internal routing of data as well as the routing of data over the network 100 generally for the computer systems coupled with this private network. In this case, the internal DNS translation server will either be programmed to send its unknown translations to DNS A (labeled as "A2", "B", "C", "D", "E", "F", "G", "H2") or may be programmed to use the DNS hierarchy itself, i.e. communicate directly with the upstream DNS Top 202 and DNS B 210 (labeled as "A2", "B2", "C2", "D2", "E2", "F2", "G2", "H2"). In these cases, the internal DNS translation server simply adds another layer to the DNS hierarchy as a whole, but the system continues to function similarly as described above.

In addition, FIG. 2, further depicts an exemplary DNS translation transaction wherein the client 102, 104, 106 is coupled with a POP 114 that is not associated with its bound DNS translation server 204. For example, Client 3 106 is depicted as being coupled with POP2 provided by service provider 118. In the exemplary situation, Client 3 106 is bound with DNS A 204 provided by service provider 120. This situation can occur in the wireless environment, where a particular wireless client 102, 104, 106 couples with whatever POP 114, 116 is available in its geographic proximity (e.g. when roaming) and is affiliated, e.g. has access sharing agreements, with the service provider 120 who generally provides connectivity services for the client 102, 104, 106. In this case, client 3 106 will perform its translation requests as described above, and will address these requests to its bound DNS Server, in this case DNS A 204. The service provider 118 will see the address of the DNS A 204 in client 3's 106 translation requests and appropriately route the translation request over the network 100 to service provider 120 and ultimately on to DNS A 204. DNS A 204 will appropriately handle the request and return it via the network 100 accordingly (labeled as "A3", "B", "C", "D", "E", "F", "G", "H3").

It will be appreciated that in each of the examples given above, if a particular DNS translation server already "knows" the requested translation, the DNS translation server does not have to go up the hierarchy and can immediately return the translation to the requester, either the client 102, 104, 106 or downstream DNS translation server.

It should be noted, that because a given server 108, 110, 112 may comprise multiple IP addresses, the DNS translation servers may be programmed to return a list of IP addresses in response to a given domain name translation request. Typically, this list will be ordered from the most optimal IP address to the least optimal IP address. The browser program can then pick one of the IP addresses to send content requests to and automatically switch to another IP address should the first requests fail to reach the destination server 108, 110, 112 due to a hardware failure or network 100 congestion. It will further be appreciated that the operations and structure of the existing DNS system are known to those of ordinary skill in the art.

IV. Content Delivery

As mentioned above, once the DNS translation is complete, the client 102, 104, 106 can initiate its requests for content from the server 108. Typically, the requests for content will be in the form of HTTP requests for Web content as described above. In order to alleviate server 108 overload, the HTTP protocol provides a "slow start" mechanism. As was described above, a Web page consists of HTML code plus images, multimedia or other separately stored content. Typically, the amount of HTML code contained within a Web page is very small compared to the amount of image and/or multimedia data. When a client requests a Web page from the server 108, the server 108 must serve the HTML code and the associated image/multimedia data to the client 102, 104, 106. However, the client 102, 104, 106, upon receipt of the HTML code, may be unwilling or unable, for whatever reason, to receive the associated image/multimedia data. To prevent the server 108 from wasting processing and bandwidth resources unnecessarily by sending unwanted data, the HTTP slow start protocol forces the client 102, 104, 106 to first request the HTML code and then subsequent to receipt of that HTML code, request any associated separately stored content. In this way, if after the initial request, the client 102, 104, 106 disconnects or otherwise switches to making requests of another server 108, the initial server 108 is not burdened with serving the unwanted or unnecessary content.

In addition, it important to note that clients 102, 104, 106 may be located very far from each other, either geographically or even logically in consideration of the network topology. For example, a client 102, 104, 106 may be located in Chicago, Ill. while the server 108 from which it is requesting content is located in Paris, France. Alternatively, client 102, 104, 106 may be located in the same city as server 108 but, due to the topology of the network 100, there may be multiple nodes 126 and interconnecting communications paths 128 between the client 102, 104, 106 and the server 108 necessitating a lengthy route for any data transmitted between the two. Either scenario can significantly impact the response time of a server 108 to a given request from a client 102, 104, 106. Adding in the fact that the network 100 may be servicing millions of clients 102, 104, 106 and servers 108 at any given time, the response time may be further impacted by reduced bandwidth and capacity caused by network congestion at the server 108 or at one or more intermediate network nodes 126.

Servers 108 and service providers 118, 120 may attempt to alleviate this problem by increasing the speed and bandwidth capacity of the network 100 interconnections. Further, servers 108 may attempt to alleviate slow request response times by providing multiple sub-servers which can handle the volume of requests received with minimal latency. These sub-servers can be provided behind a reverse proxy server which, as described above, is "tightly coupled" with the Web site and can route content requests directed to a single IP address, to any of the multiple sub-servers. This reduces the number of individual translations that have to be made available to the DNS translation system and kept up to date for all of the sub-servers. The reverse proxy server can also attempt to balance the load across multiple sub-servers by allocating incoming requests using, for example, a round-robin routine. Reverse proxy servers can further include a cache server as described below to further enhance the Server's 108 ability to handle a high volume of requests or the serving of large volumes of data in response to any given request. It will be appreciated that reverse proxy servers and load balancing techniques are generally known to those of ordinary skill in the art.

Clients 102, 104, 106 and service providers 118, 120 (and, as described above, servers 108) may attempt to alleviate this problem by including a cache or cache server 208. A cache server 208 is a server computer (or alternatively implemented in software directly on the client 102, 104, 106 or another computer coupled with the client 102, 104, 106 such as at the POP 114) located, both logically and geographically, relatively close to the client 102, 104, 106. The cache server 208 saves/caches Web pages and other content that clients 102, 104, 106, who share the cache server, have requested in the past. Successive requests for the same content can then be satisfied by the cache server 208 itself without the need to contact the source of the content. A cache server 208 reduces the latency of fulfilling requests and also reduces the load on the content source. Further, a cache server 208 at the edge 124 of the Internet reduces the consumption of bandwidth at the core 122 of the Internet where it is more expensive. The cache server 208 may be a part of a proxy server or may be provided by a service provider 118, 120.

Cache servers 208 invisibly intercept requests for content and attempt to provide the requested content from the cache (also known as a "hit"). Note that a cache server 208 is not necessarily invisible, especially when coupled with a proxy server. In this case, the client 102, 104, 106 may need to be specially programmed to communicate its content requests to the proxy server in order to utilize the cache server. Cache servers 208, as referred to in this disclosure then, may include these visible cache servers as well as invisible cache servers which transparently intercept and attempt to service content requests. Where the requested content is not in the cache (also known as a "miss"), the cache forwards the request onto the content source. When the source responds to the request by sending the content to the client 102, 104, 106, the cache server 208 saves a copy of the content in its cache for later requests. In the case where a cache server is part of a proxy server, the cache/proxy server makes the request to the source on behalf of the client 102, 104, 106. The source then provides the content to the cache/proxy server which caches the content and also forwards the requested content to the client 102, 104, 106. An exemplary software based cache server is provided by SQUID, a program that caches Web and other Internet content in a UNIX-based proxy server closer to the user than the content-originating site. SQUID is provided as open source software and can be used under the GNU license for free software, as is known in the art.

Caches operate on two principles, temporal locality and spatial locality. Temporal locality is a theory of cache operation which holds that data recently requested will most likely be requested again. This theory dictates that a cache should store only the most recent data that has been requested and older data can be eliminated from the cache. Spatial Locality is a theory of cache operation which holds that data located near requested data (e.g. logically or sequentially) will be likely to be requested next. This theory dictates that a cache should fetch and store data in and around the requested data in addition to the requested data. In practice, this means that when a HTML Web page is requested, the cache should go ahead and request the separately stored content, i.e. begin the slow start process because more likely than not, the client 102, 104, 106 will request this data upon receipt of the HTML code.

While cache servers 208 alleviate some of the problems with net congestion and request response times, they do not provide a total solution. In particular, they do not provide a viable solution for dynamic content (content which continually changes, such as news, as opposed to static or fixed content). This type of content cannot be cached otherwise the requesting client 102, 104, 106 will receive stale data. Furthermore, cache servers 208 often cannot support the bandwidth and processing requirements of streaming media, such as video or audio, and must defer these content requests to the server 108 which are the source of the content. Cache servers 208, in general, further lack the capability to service a large volume of requests from a large volume of clients 102, 104, 106 due to the immense capacity requirements. Typically, then general cache servers 208, such as those provided by a service provider 118, 120 will have high miss rates and low hit rates. This translates into a minimal impact on server 108 load, request response times and network 100 bandwidth. Moreover, as will be discussed below, by simply passing on requests which miss in the cache to the server 108 to handle, the server 108 is further subjected to increased security risks from the entrusted network 100 traffic which may comprise, for example, a denial of service attack or an attempt by a hacker to gain unauthorized access.

Figure 3:
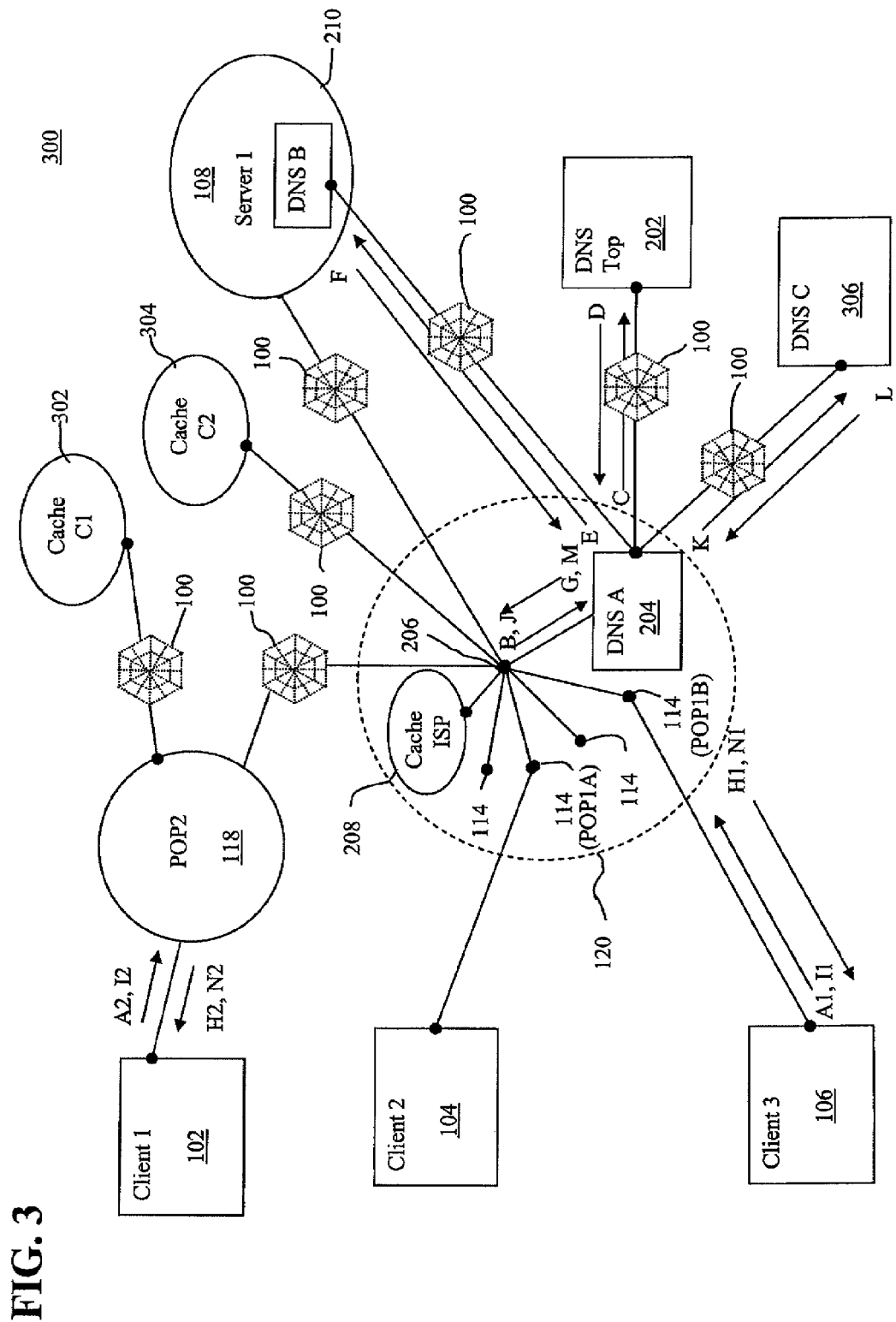
FIG. 3 depicts an exemplary content delivery system for use with the exemplary network of FIG. 1.

Referring now to FIG. 3, there is depicted an enhanced content delivery system 300 which provides optimized caching of content from the server 108 to the client 102, 104, 106 utilizing the HTTP slow start protocol. The system 300 is typically provided as a pay-for service by a content delivery service to which particular servers 108 subscribe to in order to enhance requests made by clients 102, 104, 106 for their specific content. FIG. 3 depicts the identical DNS system of FIG. 2 but adds cache servers 302 and 304, labeled "Cache C1" and "Cache C2" plus a special DNS translation server 306, labeled "DNS C" affiliated with the content delivery service.

The depicted system 300 implements one known method of "Content Delivery." Content delivery is the service of copying the pages of a Web site to geographically dispersed cache servers 302, 304 and, when a page is requested, dynamically identifying and serving the page from the closest cache server 302, 304 to the requesting client 102, 104, 106, enabling faster delivery. Typically, high-traffic Web site owners and service providers 118, 120 subscribe to the services of the company that provides content delivery. A common content delivery approach involves the placement of cache servers 302, 304 at major Internet access points around the world and the use of a special routing code embedded in the HTML Web pages that redirects a Web page request (technically, a Hypertext Transfer Protocol—HTTP—request) to the closest cache server 302, 304. When a client 102, 104, 106 requests the separately stored content of a Web site/server 108 that is "content-delivery enabled," the content delivery network redirects that client 102, 104, 106 to makes its request, not from the site's originating server 108, but to a cache server 302, 304 closer to the user. The cache server 302, 304 determines what content in the request exists in the cache, serves that content to the requesting client 102, 104, 106, and retrieves any non-cached content from the originating server 108. Any new content is also cached locally. Other than faster loading times, the process is generally transparent to the user, except that the URL ultimately served back to the client 102, 104, 106 may be different than the one initially requested. Content delivery is similar to but more selective and dynamic than the simple copying or mirroring of a Web site to one or several geographically dispersed servers. It will further be appreciated that geographic dispersion of cache servers is generally known to those of ordinary skill in the art.

FIG. 3 further details a known method of re-directing the requests generated by the client 102, 104, 106 to a nearby cache server 302, 304. This method utilizes the HTTP slow start protocol described above. When a client 102, 104, 106 wishes to request content from a particular server 108, it will obtain the IP address of the server 108, as described above, using the normal DNS translation system. Once the server's 108 IP address is obtained, the client 102, 104, 106 will make its first request for the HTML code file which comprises the desired Web page. As given by the HTTP slow start protocol, the server 108 will serve the HTML code file to the client 102, 104, 106 and then wait for the client 102, 104, 106 to request the separately stored files, e.g., the image and multimedia files, etc. Normally, these requests are made in the same way that the initial content request was made, by reading each URL from the HTML code file which identifies the separately stored content and formulating a request for that URL. If the domain name for the URL of the separately stored content is the same as the domain name for the initially received HTML code file, then no further translations are necessary and the client 102, 104, 106 can immediately formulate a request for that separately stored content because it already has the IP address. However, if the URL of the separately stored content comprises a different domain name, then the client 102, 104, 106 must go through the DNS translation process again to translate the new domain name into an IP address and then formulate its requests with the appropriate IP address. The exemplary content delivery service takes advantage of this HTTP slow start protocol characteristic.

The exemplary content delivery service partners with the subscribing Web server 108 and modifies the URL's of the separately stored content within the HTML code file for the particular Web page. The modified URL's include data which will direct their translation requests to a specific DNS translation server 306, DNS C provided by the content delivery service. DNS C is an intelligent translation server which attempts to figure out where the client 102, 104, 106 is geographically located and translate the URL to point to a cache server 302, 304 which is geographically proximate to the client 102, 104, 106. DNS C performs this analysis by knowing the IP address of the downstream DNS server 204, DNS A which it assumes is located near the client 102, 104, 106. By using this IP address and combining it with internal knowledge of the network 100 topology and assignment of IP addresses, DNS C 306 can determine the geographically optimal cache server 302, 304 to serve the requested content to the client 102, 104, 106.

An exemplary transaction is further depicted by FIG. 3. In this exemplary transaction, Client 3 106 wishes to request content from Server 1 108. Client 3 106 will establish the IP address of the source of the desired content using the standard DNS translation system described above, labeled "A1", "B", "C", "D", "E", "F", "G", "H1." Once Client 3 106 has the IP address of Server 1 108, it will generate a request for the initial HTML code file of the desired Web page and Server 1 108 will respond with the data. Client 3 106 will then request a particular separately stored file associated with the Web page by reading the URL from the HTML code file and translating the domain name contained therein. As noted above, this URL comprises the domain name of the content delivery service as well as an identifier which identifies the content being requested (since the content delivery service typically handles many different servers 108). Client 3 106 will generate another translation request to DNS A 204, labeled "I1" and "J." DNS A 204 will attempt to translate the given domain name but will fail because the content delivery service has set all of its translations to have a TTL=0. Therefore, DNS A 204 will be required to contact DNS C 306 which is provided by the content delivery service, labeled "K" and "L." Note that DNS A 204 may be required to contact DNS top 202 in order to locate the IP address of DNS C 306. DNS C 306 receives the translation request and knows the IP address of DNS A 204, which was given as the return address for the translation. Using the IP address of DNS A 204, DNS C 306 figures out which cache server 302, 304 is geographically proximate to Client 3 106, in this case, Cache C2 304. An appropriate IP address is then returned to by DNS C 306 to DNS A 204 and subsequently returned to Client 3 106. Client 3 106 then formulates its request for the separately stored data but, unwittingly, uses the IP address of the cache server C2 304. Cache server C2 304 receives the request and serves the desired content as described above.

FIG. 3 further illustrates a second exemplary transaction sequence which discloses a flaw in the depicted content delivery method. In this example, Client 1 102 wishes to request content from Server 1 108. Client 1 102 is a wireless or mobile client which is coupled with service provide 118 at POP2 but is bound to DNS A 204 provided by service provider 120. In this example, all of the translation and request transactions occur as in the above example for Client 3 106. The translation request to identify the IP address of the separately stored content will be handled by DNS A 204 which will then hand it off to DNS C 306 as described above. However, DNS C 306 will then attempt to identify a geographically proximate cache server 302, 304 based on the IP address of DNS A 204 which is not located near Client 1 102 in this example. Therefore DNS C 306 will return a translation directing Client 1 102 to cache server C2 304 when in fact, the optimal cache server would have been cache server C1 302. With more and more wireless and mobile user utilizing the Internet, mis-optimized re-direction of content delivery will happen more frequently. Furthermore, there may be cases where the Client 102, 104, 106 is dynamically bound to a DNS translator associated with whatever POP 114, 116 they are connecting to. While this may appear to solve the problem, the content delivery service is still basing its redirection determination on an indirect indicator of the location of the client 102, 104, 106. However, the IP address of the DNS translator may still fail to indicate the correct geographic location or the correct logical location (based on the topology of the network 100) of the client 102, 104, 106 in relation to the DNS translator. A more accurate indicator of the client's 102, 104, 106 physical geographic location and/or network logical location is needed in order to make an accurate decision on which cache server 302, 304 to redirect that client 102, 104, 106 to.

V. The First Embodiment

Figure 4:
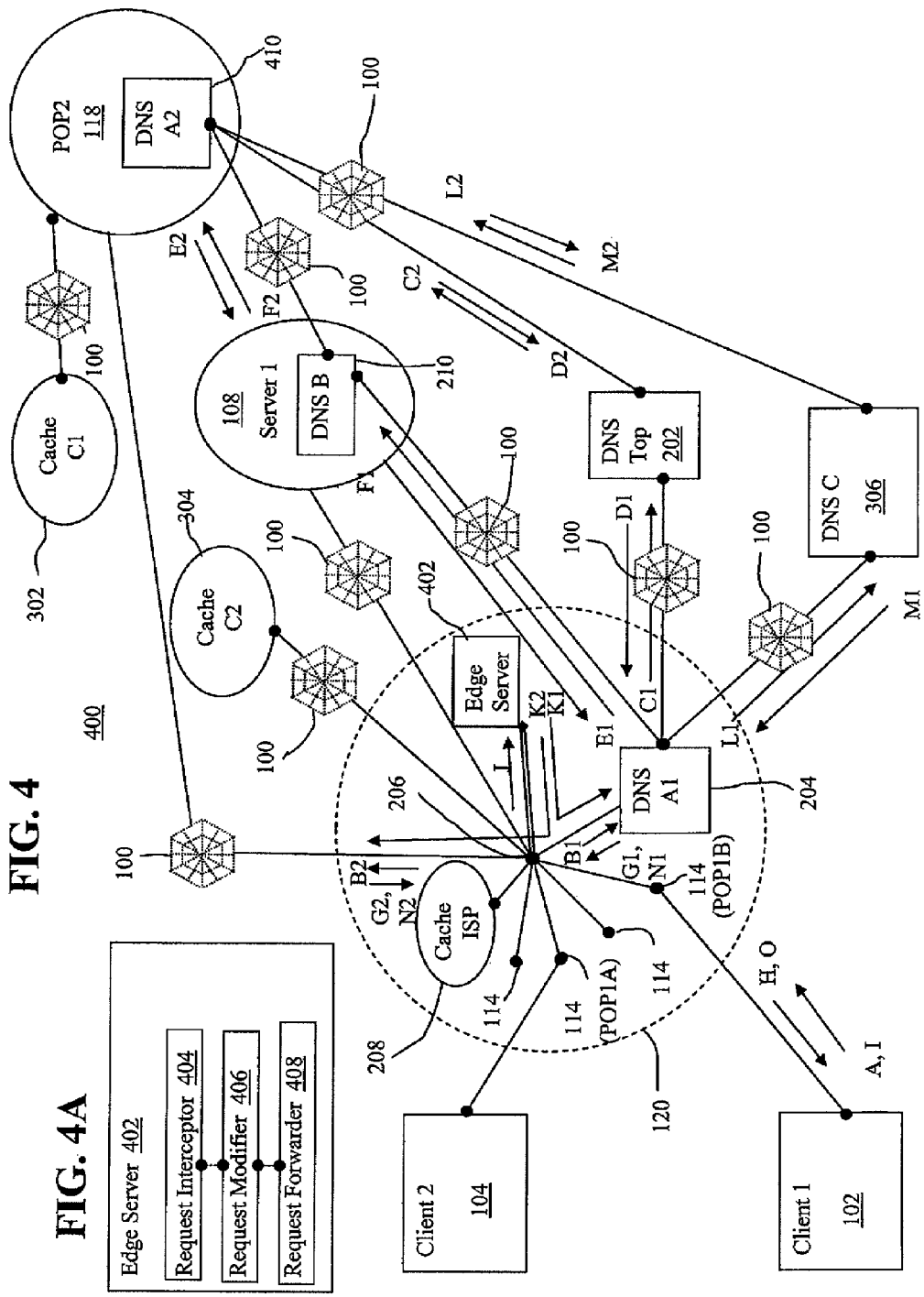
FIG. 4 depicts a content delivery system for use with the network of FIG. 1 according to a first embodiment.

Referring now to FIG. 4, there is depicted a first embodiment of an enhanced DNS system to facilitate the operation of content delivery services by eliminating the dependency on the geographic location of the downstream DNS server. In addition to what is shown in FIG. 3, the embodiment shown in FIG. 4 further adds an edge server 402 coupled with the routing equipment 206 and POP's 114 of an affiliated service provider 120 which may be located within the affiliated server provider's 120 facilities. In one alternative embodiment, the edge server 402 is integrated with a router. In another alternative embodiment, the edge server is integrated with a generally accessible DNS translation server such as DNS A1 204. The edge server 402 is capable of monitoring the network traffic stream passing between the POP's 114 and the network 100, including the service provider's 120 hardware, such as the cache 208 and the DNS translation server 204, DNS A. The edge server 402 is further capable of selectively intercepting that traffic and preventing it from reaching its intended destination, modifying the intercepted traffic and reinserting the modified traffic back into the general network traffic stream. In one embodiment, the facilities and capabilities of the edge server 402 are provided to content delivery services and or Web servers 108 on a fee for services basis as will be described below. Further, an edge server 402 may be provided at every major service provider 118, 120 so as to be able to selectively intercept network traffic at all possible POP's 114, 116 of the network 100.

Referring to FIG. 4A, the edge server 402 includes a request interceptor 404, a request modifier 406, and a request forwarder 408. The edge server 402 may include one or more processors, a memory coupled with the processors and one or more network interfaces or other interfaces, also coupled with the processors and operative to couple or integrate the edge server 402 with the routing equipment of the service provider 120. Optionally, the edge server 402 may include secondary storage including a second memory such as a cache memory, hard disk or other storage medium. Further, the processors of the edge server 402 may be dedicated processors to perform the various specific functions described below. The edge server 402 may further include software and/or firmware provided in a read only memory or in a secondary storage which can be loaded into memory for execution or, alternatively, executed from the secondary storage by the processors, to implement the various functions as detailed below. To further improve performance, such software functionality may also be provided by application specific integrated circuits ("ASICs"). For example, an edge server 402 can comprise a Compaq TaskSmart™ Server manufactured by Compaq Corporation, located in Austin, Tex. The TaskSmart™ Server can include an Intel IXA1000 Packet Processor manufactured by Intel Corporation, located in Santa Clara, Calif. to perform the traffic monitoring and port specific traffic interception functions as well as the security applications as detailed below. The TaskSmart™ Server can further include a PAX.port 1100™ classification adapter manufactured by Solidum Corporation, located in Scotts Valley, Calif., which can receive intercepted DNS translation requests from the packet processor and, utilizing a look up table (which may be stored in a memory providing high speed access), determine whether or not the request is associated with a subscribing server 108, as described below. The classification adapter can attempt to resolve the DNS request or hand it off to a general processor such as an Intel Pentium III™ or other general purpose processor for further operations as detailed below. An exemplary edge server 402 may have six 9.1 GB hot pluggable hard drives possibly in a RAID or other redundant configuration, two redundant hot pluggable power supplies, five 10/100 Ethernet ports and 1 GB of main memory and capable of handling in excess of 1250 requests per second.

The request interceptor 404 listens to the network traffic passing between the POP's 114 of the affiliated service provider 120 and the network 100 and selectively intercepts DNS translation requests generated by any of the clients 102, 104 coupled with the particular affiliated service provider 120. Such interception may be accomplished by identifying the destination "port" of any given data packet generated by a client 102, 104, alternatively other methods of identifying a packet type may be used such as by matching the destination address with a list of known DNS translation server addresses. A port in programming is a "logical connection place" and specifically, within the context of the Internet's communications protocol, TCP/IP, a port is the way a client program specifies a particular applications program on a computer in a network to receive its requests. Higher-level applications that use the TCP/IP protocol such as HTTP, or the DNS translation protocol, have ports with pre-assigned numbers. These are known as "well-known ports" and have been assigned by the Internet Assigned Numbers Authority (IANA). Other application processes are given port numbers dynamically for each connection. When a service (server program) initially is started, it is said to bind to its designated port number. As any client program wants to use that server, it also must request to bind to the designated port number. Port numbers are from 0 to 65536. Ports 0 to 1024 are reserved for use by certain privileged services. For the HTTP service, port 80 is defined as a default and it does not have to be specified in the Uniform Resource Locator (URL). In an alternative embodiment, the routing equipment 206 of the service provider 120 is programmed to forward all DNS translation requests to the edge server 402. The request interceptor 404 can then choose which DNS translation requests to intercept as described below. This alternative routing scheme may implemented through a traffic routing protocol such as a Domain Name System Translation Protocol ("DNSTP"). This protocol is implemented in similar fashion to the Web Cache Control Protocol ("WCCP") which is used to redirect HTTP requests to proxy cache servers based on the specified port in the packet.

DNS translation requests are identified by the port number 53. The request interceptor 404 monitors for all data traffic with the specified port number for a DNS translation request. It then is capable of intercepting DNS translation requests generated by clients 102, 104 such as computer workstations, wireless devices or internal DNS translators on a private network. The request interceptor 404 is aware of which content delivery services subscribe to the edge server 402 service and is operative to selectively intercept DNS translation requests associated with the subscribing content delivery service, i.e. contain translations intended to be translated by the DNS translator of the content delivery service or server 108. The request interceptor 404 may provide a table or database stored in memory or other storage device where it can look up the service subscribers to determine whether the particular DNS translation request should be intercepted. The request interceptor 404 may make this determination at "wire speed", i.e. at a speed fast enough so as not to impact the bandwidth and throughput of the network traffic it is monitoring.

When a DNS translation request is generated by a client 102, 104 to translate a domain name associated with the content delivery service, as described above for the modified HTTP slow start protocol, to retrieve the separately stored Web page content, that DNS translation request will be selectively intercepted by the request interceptor 404 of the edge server 402. The interception will occur before it reaches the bound/destination DNS translation server bound to or specified by the client 102, 104. The request interceptor 404 will then pass the intercepted DNS translation request to the request modifier 406.

The request modifier 406 modifies the DNS translation request to include additional information or indicia related to the client 102, 104 so that the intelligent DNS translation server of the content delivery service or server 108 can make a more optimized decision on which of the geographically dispersed cache servers 302, 304 would be optimal to serve the requests of the client 102, 104. This additional information can include the geographic location of the POP 114 or the characteristics of the downstream network infrastructure, such as whether the client 102, 104 is connecting to the POP 114 via a modem connection or a broadband connection or whether the client 102, 104 is a wired or wireless client, etc. It will be appreciated that there may be other information or indicia that the edge server 402 can provide to enhance the DNS translation request and this may depend on the capabilities of the subscribing content delivery services, and all such additional indicia are contemplated. The subscribing content service providers may be familiar with the indicia data types, content and possible encoding schemes which the edge server 402 can provide so as to establish a protocol by which the data is transferred to the subscribing content delivery service. Such information is then recognized and used by the content delivery service to enhance their redirection. For example, by knowing the geographic location of the POP 114 as provided by the edge server 402, the content delivery service does not need to rely on the IP address of the bound DNS server from which it receives the translation request (described in more detail below) and therefore will make a more accurate determination of which cache server 302, 304 to choose. Similarly, by knowing the capabilities of the downstream network infrastructure from the POP 114 to the client 102, 104 as provided by the edge server 402, the content delivery service can redirect content requests by the client 102, 104 to a cache server 302, 304 with capabilities which match. For example, where the POP 114 to client 102, 104 connection is a broadband connection, the client 102, 104 can be directed to make its requests to a cache server 302, 304 capable of utilizing the available bandwidth to the client 102, 104. In contrast, where the client 102, 104 connects to the POP 114 via a modem/standard telephone line connection, the content delivery service can direct that client 102, 104 to make its requests to an appropriate low speed cache server 302, 304 so as not to waste the resources of high bandwidth cache servers 302, 304.

Once the DNS translation request has been modified, the request modifier 406 passes the DNS translation request to the request forwarder 408. The request forwarder places the modified DNS translation request back into the general stream of network traffic where it can be routed to its originally intended destination, i.e. the bound or specified DNS translation server 204, 410 bound to or specified by the originating client. The DNS translation server 204, 410 will translate the request as described above, by contacting the DNS translation server 306, DNS C associated with the content delivery service. As described above, the intelligent DNS translation server 306 of the content delivery service will see the modified request and utilize the information/indicia included by the edge server 402 to make a more optimal translation and cache server 302, 304 assignment.

FIG. 4 depicts an exemplary content delivery transaction between Client 1 102 and Server 1 108. For the purposes of this example transaction, Client 1 102 is bound to DNS translation server 204, labeled "DNS A1." Client 1 102 initiates the HTTP slow start protocol as described above by making its initial request for an HTML Web page from Server 1 108. This initiation may require making several DNS translations as described above, labeled as "A", "B1", "C1", "D1", "E1", "F1", "G1", "H." Once the HTML Web page has been received by Client 1 102, it will begin to request the separately stored content associated with the Web page. As was discussed above, where Server 1 108 has been "content enabled" and subscribes to the content delivery service, the URL's of the separately stored content will comprise the domain name of the content delivery service. As well, as discussed above, these domain names will require complete DNS translation all the way back to the DNS translation server 306, DNS C of the content delivery service because the content delivery service ensures that all of its translations have TTL=0 and therefore cannot be stored in any given downstream DNS translation server. Therefore, Client 1 102 will initiate a DNS translation for the URL of the separately stored content, labeled "I." This DNS translation request will go through the POP 114 and to the routing equipment 206 of the service provider 120. The edge server 402 will see this DNS translation request and identify the domain name of the content service provider as a subscriber to its service. The request interceptor 404 will then intercept the DNS translation request, labeled as "J." The request interceptor 404 will pass the intercepted DNS translation request to the request modifier 406 which will append a geographic indication representing the physical geographic location of the edge server 402 or alternatively, other downstream network characteristics. Given that the edge server 402 is located geographically proximate to the POP's 114, this information will more accurately represent the location of Client 1 102. Alternatively, while the edge server 402 may not be geographically proximate to the POP's 114, it may be network proximate to the POP's 114, i.e. there may be a minimal of network infrastructure between the POP's 114 and the edge server 402. In some instances, while one device on a network may sit physically right next to another device on the network, the network topology may dictate that data flowing between those devices flow over a circuitous route to get from one device to the other. In this case, while the devices are physically close to one another, they are not logically close to one another. The edge server 402 may be familiar, not only with its geographic location within the context of the network 100 as a whole, but also its logical location. Using this information, the edge server 402 can further include information as to this logical location so as to enable, not only a geographically optimal redirection of Client 1's 102 requests but also a network topology based optimized redirection.

The request modifier 406 will then pass the modified DNS translation request to the request forwarder 408 which will place the request back into the general traffic stream, and in this case, on its way to the original intended recipient, Client 1's 102 bound DNS translation server 204, DNS A1, labeled as "K1." DNS A1 204 will then translate the modified DNS translation request as described above and return the translation to Client 1 102, labeled as "L1", "M1", "N1", "O." DNS C 306, using the additional data provided by the edge server 402, will supply a DNS translation redirecting Client 1's 102 requests to Cache C2 304 which is the optimal cache server.

FIG. 4 further depicts a second exemplary content delivery transaction between Client 1 102 and Server 1 108. For the purposes of this second example transaction, Client 1 102 is a wireless or mobile wired device connecting to a POP 114 provided by service provider 120 but is bound to DNS translation server 410, labeled "DNS A2" provided by service provider 118. Note that in the previous exemplary transaction above, Client 1 102 was bound to DNS A1 204, e.g., Client 1 102 was a stationary computer or private network subscribing to the network 100 connection services of service provider 120 and using the POP's 114 provided by the service provider 120 and that service provider's 120 DNS translation server 204, DNS A1. In the current example, Client 1 102 is a subscriber to the network 100 connections services of service provider 118 but is currently roaming, i.e. geographically located in an area not serviced by a POP 116 provided by service provider 118. Therefore Client 1 102 must use a POP 114 provided by a service provider 120, which for example, has an agreement to allow such connections from service provider's 118 customers. However, because DNS translation servers are bound to the Client 102, i.e. the address of the preferred DNS translation server is typically programmed into the Client 102, Client 102 will still use its programmed or bound DNS translation server, typically the DNS translation server provided by its service provider 118, in this case DNS A2 410.

As above, Client 1 102 initiates the HTTP slow start protocol as described above by making its initial request for an HTML Web page from Server 1 108. This initiation may require making several DNS translations as described above but using DNS A2 410 instead of DNS A1 204, labeled as transactions "A", "B2", "C2", "D2", "E2", "F2", "G2", "H." Once the HTML Web page has been received by Client 1 102, it will begin to request the separately stored content associated with the Web page. As was discussed above, where Server 1 108 has been "content enabled" and subscribes to the content delivery service, the URL's of the separately stored content will comprise the domain name of the content delivery service. As well, as discussed above, these domain names will require complete DNS translation all the way back to the DNS translation server 306, DNS C of the content delivery service because the content delivery service ensures that all of its translations have TTL=0 and therefore cannot be stored in any given downstream DNS translation server. Therefore, Client 1 102 will initiate a DNS translation for the URL of the separately stored content, labeled "I." This DNS translation request will go through the POP 114 and to the routing equipment 206 of the service provider 120. The edge server 402 will see this DNS translation request and identify the domain name of the content service provider as a subscriber to its service. The request interceptor 404 will then intercept the DNS translation request, labeled as "J." The request interceptor 404 will pass the intercepted DNS translation request to the request modifier 406 which will append a geographic indication representing the physical geographic location of the edge server 402. Given that the edge server 402 is located geographically proximate to the POP's 114, this information will more accurately represent the location of Client 1 102. Alternatively, while the edge server 402 may not be geographically proximate to the POP's 114, it may be network proximate to the POP's 114, i.e. there may be a minimal of network infrastructure between the POP's 114 and the edge server 402. In some instances, while one device on a network may sit physically right next to another device on the network, the network topology may dictate that data flowing between those devices flow over a circuitous route to get from one device to the other. In this case, while the devices are physically close to one another, they are not logically close to one another. The edge server 402 may be familiar, not only with its geographic location within the context of the network 100 as a whole, but also its logical location. Using this information, the edge server 402 can further include information as to this logical location so as to enable, not only a geographically optimal redirection of Client 1's 102 requests but also a network optimized redirection.

The request modifier 406 will then pass the modified DNS translation request to the request forwarder 408 which will place the request back into the general traffic stream, and in this case, on its way to the original intended recipient, Client 1's 102 bound DNS translation server 410, DNS A2, labeled as "K2." DNS A2 410 will then translate the modified DNS translation request as described above and return the translation to Client 1 102, labeled as "L2", "N2", "N2", "O." In this case, without the additional data provided by the edge server 402, DNS C 306 would have made its redirection determination based on the IP address of DNS A2 410, as described above. This would have resulted in Client 1 102 being redirected to Cache C1 302 instead of the optimal cache for its location. However, DNS C 306, using the additional data provided by the edge server 402 is able to supply a DNS translation redirecting Client 1's 102 requests to Cache C2 304 which is the optimal cache server.

VI. The Second Embodiment

Figure 5:
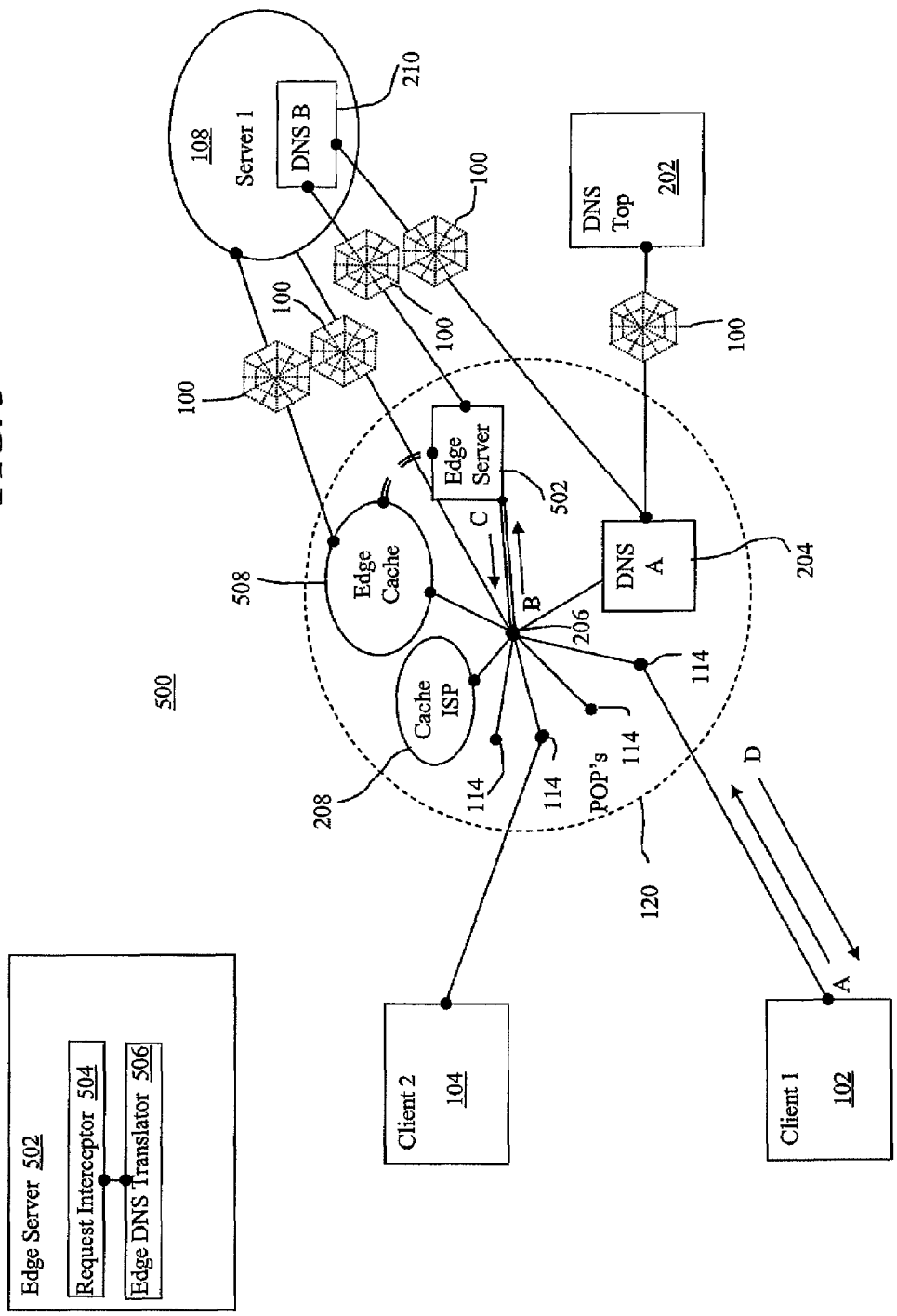
FIG. 5 depicts a content delivery system for use with the network of FIG. 1 according to a second embodiment.

Referring to FIG. 5, there is depicted a second embodiment of an enhanced DNS system to facilitate content delivery which is not dependent upon the geographic location of the downstream DNS server and is capable of enhancing the HTTP slow start protocol.

FIG. 5 shows Clients 1 and 2 102, 104 coupled with POP's 114, POP1A and POP1B of service provider 120. As described above, service provider 120 includes routing equipment 206, Cache 208 and DNS translation server 204 to facilitate coupling the POP's 114 with the network 100. In addition, service provider 120 further includes an edge server 502 and an edge cache 508. In one alternative embodiment, the edge server 502 is integrated with a router. In another alternative embodiment, the edge server 502 is integrated with a generally accessible DNS translation server such as DNS A 204. In still another alternative embodiment, the edge server 502 can be integrated with the edge cache 504 or each can be provided as separate devices or the edge server 502 can utilize an existing cache server 208 provided by the service provider 120. For clarity, a number of the components of FIG. 4 have been omitted from FIG. 5.

Referring to FIG. 5A, the edge server 502 further includes a request interceptor 504 and an edge DNS translation server 506. In one embodiment, the facilities and capabilities of the edge server 502 may be provided to Web servers 108 on a subscription or fee for services basis as will be described below. An edge server 502 and edge cache 508 may be provided at every service provider 118, 120 or at every major network 100 intersection so as to provide coverage of every POP 114, 116 on the edge 124 of the network 100. The edge server 402 may include one or more processors, a memory coupled with the processors and one or more network interfaces or other interfaces, also coupled with the processors and operative to couple or integrate the edge server 502 with the routing equipment of the service provider 120. Optionally, the edge server 502 may include secondary storage including a second memory such as a cache memory, hard disk or other storage medium. Further, the processors of the edge server 502 may be dedicated processors to perform the various specific functions described below. The edge server 502 may further include software and/or firmware provided in a read only memory or in a secondary storage which can be loaded into memory for execution or, alternatively, executed from the secondary storage by the processors, to implement the various functions as detailed below. To further improve performance, such software functionality may also be provided by application specific integrated circuits ("ASICs"). For example, an edge server 502 can comprise a Compaq TaskSmart™ Server manufactured by Compaq Corporation, located in Austin, Tex. The TaskSmart™ Server can include an Intel IXA1000 Packet Processor manufactured by Intel Corporation, located in Santa Clara, Calif. to perform the traffic monitoring and port specific traffic interception functions as well as the security applications as detailed below. The TaskSmart™ Server can further include a PAX.port 1100™ classification adapter manufactured by Solidum Corporation, located in Scotts Valley, Calif., which can receive intercepted DNS translation requests from the packet processor and, utilizing a look up table (which may be stored in a memory providing high speed access), determine whether or not the request is associated with a subscribing server 108, as described below. The classification adapter can attempt to resolve the DNS request or hand it off to a general processor such as an Intel Pentium III™ or other general purpose processor for further operations as detailed below. An exemplary edge server 502 may have six 9.1 GB hot pluggable hard drives which may be in a RAID or other redundant configuration, two redundant hot pluggable power supplies, five 10/100 Ethernet ports and 1 GB of main memory and capable of handling in excess of 1250 requests per second.

As described above, the request interceptor 504 operates to selectively intercept DNS translation requests associated with its subscribing Web server 108 generated by clients 1 and 2 102, 104. Alternatively, DNS translation requests can be forwarded to the request interceptor 504 by the service provider's 120 routing equipment 206 as described above. In this embodiment, however, because the request interceptor 504 is monitoring for DNS translation requests associated with the server 108 and not some separate content delivery service, the request interceptor 504 will selectively intercept all DNS translation requests, including the initial request to retrieve the HTML Web page file and begin the HTTP slow start protocol. Again, the request interceptor 504 may include a database or table stored in a memory or other storage medium which indicates the domain names or other identification information of subscribing servers 108.

The selectively intercepted DNS translation requests are passed by the request interceptor 504 to an internal edge DNS translation server 506. The internal edge DNS translation server 506 then translates the given domain name into the IP address of the edge cache 508 and returns this translation to the client 102, 104, labeled "A", "B", "C", "D." This effectively redirects the client 102, 104 to make all of its content requests from the edge cache 508. This differs from a proxy server, where the client 102, 104 is not redirected but either thinks that it is communicating with the server 108 (in the case of a transparent or server side reverse proxy server) or has been specifically programmed to communicate its requests to the proxy server (in the case of a client side forward proxy server). The edge cache 508 operates as a normal cache server as described above, attempting to satisfy content requests from its cache storage. However, when the requested content is not available in the cache storage (a cache miss), the request is proxied to the server 108 by the edge cache 508 and/or edge server 502, i.e. the edge cache 508 and/or edge server 502 make the request on behalf of the client 102, 104. This is in contrast to normal cache servers which forward the request from the client 102, 104 onto the server 108 upon a cache miss.

Cache misses are handled as described above, the edge server 502 or alternatively the edge cache 508 makes its own request for the uncached content from the server 108. Alternatively, other algorithms can be used to reduce or eliminate cache misses including mirroring the content of the server 108 coupled with periodic updates either initiated by the edge server 502 or edge cache 508 or periodically pushed to the edge cache 508 by the server 108. In another alternative embodiment, the server 108 can update cached content when it determines that such content has changed or can provide time durations or other form of expiration notification after which the edge cache 508 purges the content. Where the content expires or is otherwise purged from the edge cache 508, the next request for that content will miss and cause a reload of the content from the server 108. One of ordinary skill in the art will recognize that there are many caching algorithms which may be used to maintain cache coherency. In one embodiment, the edge cache 508 maintains a replacement policy of replacing the oldest data in the cache when the cache is full. Again, one of ordinary skill in the art will recognize that there are many different cache replacement algorithms that may be used.

In this way, the edge server 502 and edge cache 508 act similarly to a forward or reverse proxy server for all of its subscribing servers 108. Generally, a reverse proxy server is a proxy server that hides multiple source servers behind a single address. A reverse proxy server allows a content provider to serve their content from multiple host computers without requiring users to know the addresses of each of those computers. When a user makes a request to a content provider, they use the address of the reverse proxy server. The reverse proxy server intercepts the requests for content from the source and redirects those requests to the appropriate host computer within the content provider. The redirection can be based on a which machine contains the requested content or can be used to balance the request load across multiple mirrored servers. A forward proxy server sits between a workstation user and the Internet so that the enterprise can ensure security, administrative control and caching services. A forward proxy server can be associated with a gateway server which separates the enterprise network from an outside network such as the Internet. The forward proxy server can also be associated with a firewall server which protects the enterprise network from outside intrusion. Forward proxy servers accept requests from their users for Internet content and then request that content from the source on behalf of the user. The forward proxy server modifies the identity of the requestor (typically by altering the internet protocol address of the requestor) to be that of the forward proxy server. A user workstation typically must be configured to use a proxy server. A forward proxy server can also be a cache server (see above).

A major distinction between the edge server 502 and a proxy server is that there is no one address of the edge server 502. The edge server 502 effectively needs no address because it intercepts the necessary network traffic. Therefore, clients 102, 104 do not need to know of the existence of the edge server 502 and can operate as they normally do, making content requests of servers 108. However, when they request content from a subscribing server 108, that content will be transparently provided instead by the edge server 502 and edge cache 508.

Effectively, the edge server 502 and edge cache 508 isolate the sub-network comprising the service provider 120, the POP's 114 and the clients 102, 104 from the subscribing server 108, i.e. the clients 102, 104 are prevented from any direct contact with server 108. Should the client 102, 104 request uncached content, it is the edge cache 508 and not the client 102, 104 which will request that content from the server 108. Furthermore, the edge server 502 and edge cache 508 can ensure that the request is valid and legitimate before communicating with the server 108. This "trusted" relationship between the edge server 502/edge cache 508 and the subscribing servers acts as additional security for the servers 108. Those servers 108 can be programmed to ignore content requests from clients 102, 104 since they know that only valid content requests can come from an edge server 502/edge cache 508. Furthermore, the edge server 502 alleviates the load on the server's 108 internal DNS translation server 210 because all DNS translations will be handled by the internal edge DNS translator 506.

The effect of the edge server 502 and edge cache 508 is faster DNS translations and better response times to requests. The edge cache 508 can serve the initial HTML Web page file to the requesting client 102, 104 and immediately begin the process of requesting the separately stored content (if not already in the cache) from the server 108 in order to speed up the HTTP slow start protocol. Furthermore, the edge caches 508 may be located through out the edge 124 of the network 100 be capable of communicating and sharing cached data. In this way, the edge caches 508 can further reduce the demands placed on the subscribing servers 108.

Notice, however, that because the edge server 502 intercepts translation requests, a client 102, 104 that already knows the IP address of the server 108, can still directly communicate with that server 108 via the network 100. In this case, the server 108 can choose to disconnect itself from the network 100 generally (or refuse to accept any inbound content requests from the network 100 that do not originate from an edge server 502/edge cache 508, however such origination may be forged). The edge server 502 and edge cache 508 can then connect with the server 108 using private proprietary communications links which are not available to clients 102, 104.

The edge server 502 and edge cache 508 can also provide load balancing and security services to the subscribing servers. For example, open source load balancing techniques available from eddieware.org can be implemented in the edge server 502. Where a particular server 108 comprises multiple sub-servers, the edge cache 508 can be programmed to request uncached content from the sub-servers so as to spread the load on each sub-server.

Further, because the edge server 502 acts as the DNS translator server for its subscribers, it can detect and absorb any security attacks based on the DNS system, such as distributed denial of service attacks, "DDoS." A Denial of Service Attack ("DoS" or Distributed DoS "DDoS") is an incident in which a user or organization is deprived of the services of a resource they would normally expect to have. Typically, the loss of service is the inability of a particular network service, such as e-mail, to be available or the temporary loss of all network connectivity and services. In the worst cases, for example, a Web site accessed by millions of people can occasionally be forced to temporarily cease operation. A denial of service attack can also destroy programming and files in a computer system. Although usually intentional and malicious, a denial of service attack can sometimes happen accidentally. A denial of service attack is a type of security breach to a computer system that does not usually result in the theft of information or other security loss. However, these attacks can cost the target person or company a great deal of time and money.

There are two related varieties of DDoS attacks. One attempts to shut down the DNS system in relation to the target site so that no legitimate user can obtain a valid translation and make a request from the site. Another type of DDoS attack attempts to overload the server 108 directly with a flood of content requests which exceed the capacity of the server. However, it will be appreciated that, by placing edge servers 502 and edge caches 508 so that all POP's 114, 116 are covered and can be monitored, DDoS attacks can never reach the server 108 itself and will always be detected close to their origination by an edge server 502 where they can be stopped and isolated. It will be further apparent that where a DDoS attack cripples one edge server 502 and its associated sub-network, the remaining edge servers 502 at other service providers 118, 120 (and their associated sub-networks) can remain operational and therefore the server 108 suffers minimal impact as a result of the DDoS attack. In addition, the edge server 502 and edge cache 508 may provide bandwidth and processing power far in excess of that needed by the sub-network comprising the POP's 114 and service provider 120 in order to be able to absorb DDoS attacks and not be crippled by them.

It will further be appreciated, that the edge server 502 can incorporate the capabilities of the edge server 402 by providing enhanced DNS translations for subscribing content delivery services as well as the enhanced content delivery itself for subscribing servers 108.

In addition, where client 102, 104 is a private network such as an intranet, which has its own internal DNS translation server which is making DNS translation requests out to the network 100, the edge server 502 can set its returned DNS translations to have a TTL=0 so that the client's 102, 104 internal DNS server must always forward DNS translation requests to subscribing server 108 upstream where they can be intercepted by the edge server 502. Otherwise, the caching function of the client's 102, 104 internal DNS translation server would prevent proper DNS translations from occurring. Notice that this is not an issue in the first embodiment, because as discussed above, the content delivery service performs the DNS translations and always sets translation TTL=0 to facilitate its operation.

VII. The Third Embodiment

Figure 6:
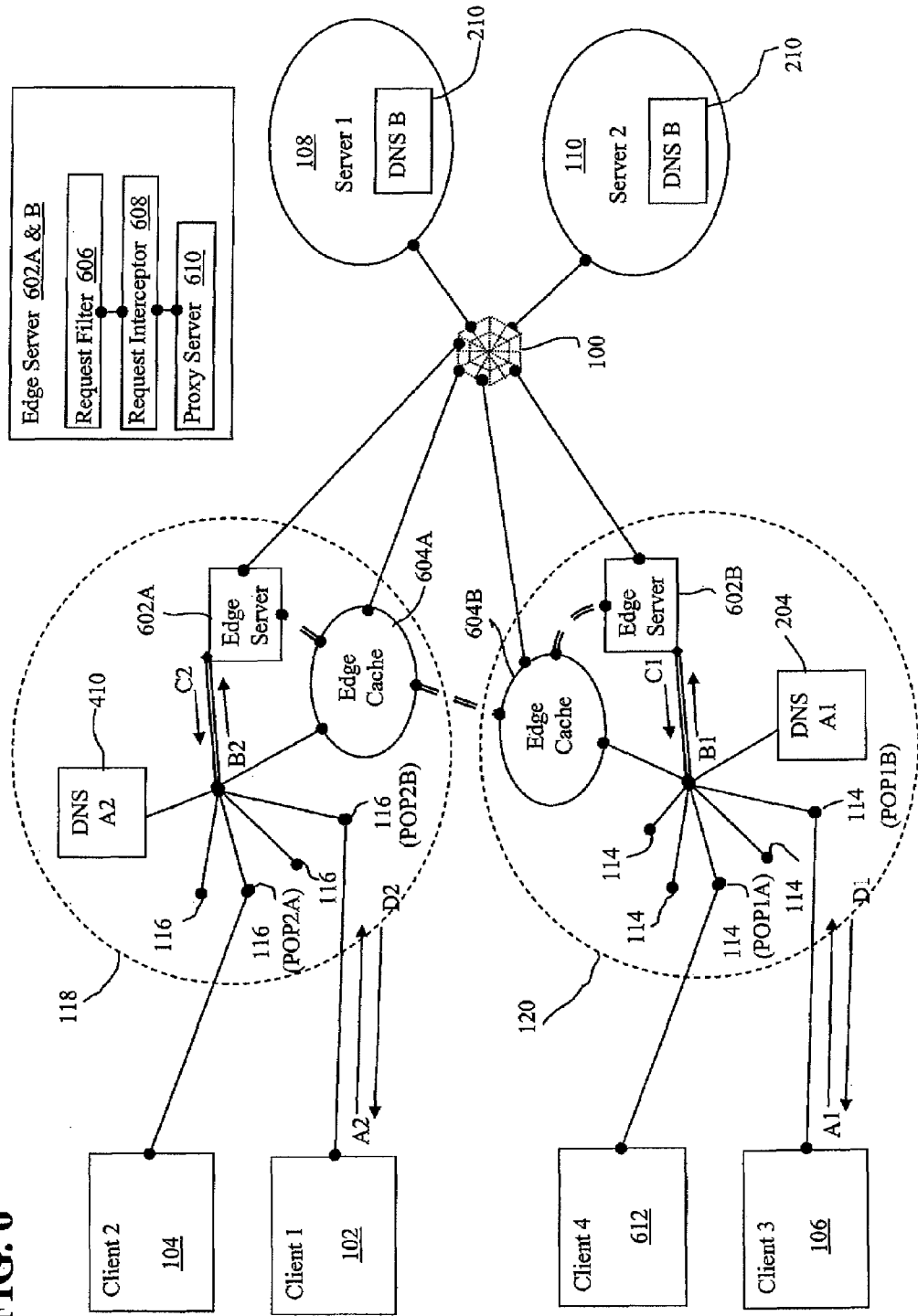
FIG. 6 depicts a content delivery system for use with the network of FIG. 1 according to a third embodiment.

Referring to FIG. 6, there is depicted an enhanced network 100 to facilitate content delivery and network 100 security. FIG. 6 depicts clients 1 and 2 102, 104 connected with POP's 114, POP2A and POP2B of service provider 118 effectively forming a sub-network of the network 100. Further, clients 3 and 4 106, 612 are shown connected to POP's 116, POP1A and POP1B of service provider 120. Further, service providers 118, 120 each include an edge server 602A, 602B and an edge cache 604A, 604B coupled with the routing equipment 206 of the service providers 118, 120 so as to be able to intercept all network traffic flowing between the POP's 114, 116 and the network 100. In one alternative embodiment, the edge server 602 is integrated with a router. In another alternative embodiment, the edge server 602 is integrated with a generally accessible DNS translation server such as DNS A1 204 or DNS A2 410. In still another alternative embodiment, the edge server 602 is integrated with the edge cache 604, or alternatively they can be implemented as separate devices or the edge server 602 can utilize a cache server 208 provided by the service provider 118, 120 (not showing in FIG. 6). In one embodiment, the facilities and capabilities of the edge servers 602 may be provided to Web servers 108 on a subscription or fee for services basis as will be described below. An edge server 602 and edge cache 604 may be provided at every service provider 118, 120 or at every major network 100 intersection so as to provide coverage of every POP 114, 116 on the edge 124 of the network 100, i.e. to minimize the size of the sub-network downstream from the edge server 602.

Referring to FIG. 6A, the edge server 602 further includes a request filter 606, a request interceptor 608 and a proxy server and/or internal DNS translation server 610. The edge server 602 is capable of operating similarly to the edge server 402 and 502 of the previous embodiments. However, the edge server 602 is further capable of intercepting data traffic at the packet level based on the source or destination IP address contained within the packets flowing past the edge server 602. In this way, the edge server 602 is able to provide complete isolation of its subscribing servers 108, 110. Any network traffic destined for a subscribing server 108, 110 can be intercepted by the edge server 602 and acted upon. The edge server 602 may include one or more processors, a memory coupled with the processors and one or more network interfaces or other interfaces, also coupled with the processors and operative to couple or integrate the edge server 602 with the routing equipment of the service provider 120. Optionally, the edge server 602 may include secondary storage including a second memory such as a cache memory, hard disk or other storage medium. Further, the processors of the edge server 602 may be dedicated processors to perform the various specific functions described below. The edge server 602 may further include software and/or firmware provided in a read only memory or in a secondary storage which can be loaded into memory for execution or, alternatively, executed from the secondary storage by the processors, to implement the various functions as detailed below. To further improve performance, such software functionality may also be provided by application specific integrated circuits ("ASICs"). For example, an edge server 602 can comprise a Compaq TaskSmart™ Server manufactured by Compaq Corporation, located in Austin, Tex. The TaskSmart™ Server can include an Intel IXP 1200 Packet Processor manufactured by Intel Corporation, located in Santa Clara, Calif. to perform the traffic monitoring and port specific traffic interception functions as well as the security applications as detailed below. The TaskSmart™ Server can further include a PAX.port 1100™ classification adapter manufactured by Solidum Corporation, located in Scotts Valley, Calif., which can receive intercepted DNS translation requests from the packet processor and, utilizing a look up table (which may be stored in a memory providing high speed access), determine whether or not the request is associated with a subscribing server 108, as described below. The classification adapter can attempt to resolve the DNS request or hand it off to a general processor such as an Intel Pentium III™ or other general purpose processor for further operations as detailed below. An exemplary edge server 602 may have six 9.1 GB hot pluggable hard drives which may be in a RAID or other redundant configuration, two redundant hot pluggable power supplies, five 10/100 Ethernet ports and 1 GB of main memory and capable of handling in excess of 1250 requests per second.

For valid content requests from clients 102, 104, 106, 612, the edge server 602 in combination with the edge cache 604 acts just like the edge server 502 and edge cache 508 in the previous embodiment. Such requests will be redirected and served from the edge cache 604. Again an edge cache 604A at one service provider 118 can share cached data from another edge cache 604B located at another service provider 120. In this way, a comprehensive content delivery service is created which completely isolates the core 122 of the network 100 from untrusted and unregulated client 102, 104, 106, 602 generated network traffic. Such traffic is isolated at the edge 124 of the network 100 within the sub-network below, i.e. downstream from the edge server 602 where it can be contained, monitored and serviced more efficiently. In terms of the economics of the network 100 then, the load on the expensive high bandwidth communications resources located at the core 122 of the network 100 is reduced and maintained at the edge 124 of the network where bandwidth is less expensive.

In addition, the edge server's 602 packet level filter 606 prevents any client 102, 104, 106, 612 from directly communicating with any subscribing server 108, 110 even if that client 102, 104, 106, 612 has the IP address of the server 108, 110. The packet level filter 606 will see the destination IP address in the network traffic and selectively intercept that traffic.

Once traffic is intercepted, the edge server 602 can perform many value added services. As described above, the edge server 602 can perform DNS translations and redirect clients 102, 104, 106, 612 to make their content requests to the edge cache 604. The edge server 602 can also monitor the data transmission being generated by clients 102, 104, 106, 602 for malicious program code, i.e. program code that has been previously identified (by the server 108 or a third party such as a virus watch service) as unwanted, harmful, or destructive such as viruses or other unauthorized data being transmitted. For example, if the edge server 602A detects a data packet whose origin address could not have come from the downstream network or POP's 114 to which it is connected, the edge server 602A knows that this data packet must be a forgery and can eradicate it or prevent it from reaching the network 100. For example, where a computer hacker surreptitiously installs a program on client 1 102 to generate a DDoS attack on server 1 108 but appear as if the attack is coming from client 4 612, the edge server 602A will see the packets generated by Client 1 102 and also see that they contain a source address associated with a client, in this case client 4 612, which based on the address, could not have come from any POP 114 of the service provider 118 to which the edge server 602A is connected. In this case, the edge server 602A can eliminate that packet and then attempt to identify the actual originating client, in this case client 1 102, so that the attack can be stopped and investigated. In addition, because general network traffic is unable to reach the subscribing servers 108, 110, hackers would be unable to access those servers in attempts to steal valuable data such as credit card numbers.

Furthermore, to enhance security, as described above, the connections between the edge servers 602A, 602B and edge caches 604A, 604B can alternatively be made through private communications links instead of the publicly accessible network 100. In this way, only trusted communications over secure communications links can reach the servers 108, 110. This security in combination with the multiple dispersed edge servers 602A, 602B and edge caches 604A, 604B covering the edge 124 of the network 100 ensures that the subscribing servers 108, 110 will be able to serve their content under high demand and despite security threats.

In operation, the request filter 606 pre-filters traffic before receipt by the request interceptor 608. The request filter 606 may provide subscriber detection, "ingress filtering" capability, and cache hit determination. The request filter 606 first determines whether or not the traffic it is monitoring is associated with a subscribing/affiliated server 108, 110. If not, this traffic is ignored and allowed to proceed to its final destination. The request filter 606 may comprise a table or database of subscribers stored in a memory or other storage device. If the traffic is associated with a subscribing server 108, 110, the request filter 606 then performs ingress filtering by determining whether the packet originated downstream from the edge server 602, i.e. from the downstream sub-network, the POP's 114, 116 affiliated with this particular edge server 602 or from upstream which indicates that they did not originate from an affiliated POP 114, 116 and therefore are suspect and most likely invalid. Packets originating from upstream may be eradicated. Valid downstream originating packets are then analyzed for the content/nature of the packet. If the packet comprises a content request, the request filter 606 can determine if the request can be satisfied by the edge cache 604. In one embodiment, the request filter 606 maintains a table or database in memory or other storage medium of the edge cache 604 contents. If the packet contains a request that can be satisfied from the edge cache 604, the request filter 606 will hand the packet/request off to the edge cache 604. The edge cache 604 operates similarly to the edge cache 508 of the above embodiment. If the packet comprises a DNS translation request or a content request which cannot be satisfied by the edge cache 604, the request filter 606 hands the packet/request off to the internal request transmitter/proxy server/DNS translation server 610 to proxy, e.g. transmit, the request to the intended server or provide a DNS translation. The server 108 responds with the requested content to the edge server 602 and/or edge cache 604 which then returns the response to the requesting client 102, 104, 106, 612 and/or caches the response. In one embodiment, the request filter 606 performs its functions at "wire speed", i.e. a speed at which will have minimal impact on network 100 bandwidth and throughput. The request filter 606 then further alleviates the processing load on the internal DNS translator/proxy server 610 of the edge server 602.

It will be appreciated that, in any of the above embodiments, additional upstream edge servers and edge caches can be provided at major peering points to provide a layered hierarchy of cache storage tiers which further enhances the response times. In addition, a hierarchy of edge servers and edge caches can be used to handle any overload of one or more downstream edge servers and edge caches or to handle spill over of capacity or even a complete failure of one or more edge servers or edge caches. By forming a hierarchy of edge servers and edge caches, the network 100 and service provider 118, 120 fault tolerance is increased and enhanced.

The edge servers and edge caches therefore act similarly to proxy servers. However, where a forward proxy server alters the source address of a given content request (effectively making that request on behalf of a client), an edge server merely adds additional data to the source address which can then be used by upstream content delivery services for more accurate redirection or intercepts and substitutes the address translation transactions to redirect a client to make its requests from a nearby edge cache. Therefore, there is no need to intercept content requests since those requests will have been already directed to the edge cache. While a reverse proxy server is typically tightly bound with a group of servers which belong to a single entity or comprise a single Web site, the edge server performs reverse proxy functions but for any entity or Web site which subscribes to the service. Furthermore, no changes are required to the client or the subscribing servers. Once the subscriber tables are updated within the edge servers, the edge server will then start to perform its functions on the network traffic of the subscribing Web server. The subscribing Web server does not need to alter their Web site in any way and the client does not need to be pre-programmed to communicate with the edge server.

Further the network of edge servers and edge caches located at every major network intersection so as to cover every POP, thereby minimizing the size of the sub-network downstream from the edge server, forms a security barrier which isolates the core infrastructure and servers of the network/internet from the edge where the clients are located. In addition to isolation, network performance is enhanced by virtually placing the content and services of core content providers at network-logically and physically-geographic proximate locations with respect to the clients. Content is placed as close as possible to the requesters of that content resulting in enhanced response times and enhanced throughput. This results in reduced load, congestion and bandwidth consumption of the expensive high capacity backbone links which form the core of the network. Trivial network traffic is maintained at the edge of the network speeding response times and throughput. In addition, the edge caches are capable of communicating with one another and sharing cached data, thereby greatly enhancing the caching effect and further reducing the load on the core of the network.

By further making the edge servers more intelligent, such as by adding additional processing capacity, dynamic load balancing services can be provided to the subscribing servers which can respond to changing demands for content. The edge servers and edge caches are further located to minimize the number of downstream clients, thereby forming sub-networks which can isolate and contain network traffic. This allows security services to be provided by isolating security threats to the smallest possible portion of the network generally while leaving the remaining portions of the network fully operational. Further, would be hackers are prevented from being able to directly access a subscribing server in an attempt to break in and steal valuable data. Therefore, even where a particular server has a security hole, the data stored there will still be protected. In addition, the edge server is aware of its physical/geographic location and its logical location within the network hierarchy allowing it to enhance content redirection services as clients switch to wireless connectivity or otherwise become more mobile in relation to their service providers. Finally, the provision of a decentralized DNS enhancement system, as provided by the disclosed embodiments, reduces the load on the existing DNS system and on subscribing servers' internal DNS systems as well as provides a distributed defense against DNS based denial of service attacks. Such attacks can be isolated to the smallest portion of the network possible and closest to the attack's source while the remaining portions of the network remain unaffected. Further, by isolating the attack, the source of the attack can be more easily pinpointed and investigated. Traffic can be monitored for unauthorized or malicious program code, i.e. program code previously identified as unwanted, harmful or destructive, such as the placement of zombies or virus programs. Such programs can be detected and eradicated before they can make it to their intended destination.

In addition, the provision of the decentralized DNS enhancement system, as provided by the disclosed embodiments, provides an infrastructure which may be used to supplant the existing DNS system and allow the creation of new domain names and a new domain name allocation service.

New services such as a keyword based DNS system may also be provided to further increase the ease of use of the network 100 and which do not rely on any modifications to a user's Web browser program (i.e. remain transparent to both the client and the content provider). A user's attempt to request content from a subscribing content provider using a new domain name provided by this new DNS system would be intercepted prior to reaching the existing DNS system and be properly translated so as to direct the user to the content provider. Alternatively, the request may be redirected to an edge server and edge cache which proxies the request for the user to the content provider. Such a system allows the content provider to remain a part of the network 100, i.e. remain connected to the Internet and maintain their access within the existing DNS system, or they may choose to completely disconnect from the network 100 altogether and utilize proprietary communications links to the network of edge servers and edge caches to provide users/clients with access to their content.

It will be further appreciated by one of ordinary skill in the art that the provision of numerous distributed edge servers and edge caches encircling the core of the network 100 provides a secure decentralized infrastructure on which service applications can be built. Through the provision of additional application and data processing capabilities within the edge servers, service applications such as user applications (for example, content monitoring/filtering, advertising filtering, privacy management and network personalization), e-commerce applications (such as regional and local electronic store fronts, distributed shopping carts or advertising distribution), distributed processing applications, database access applications (such as distributed enterprise database access), communications applications (such as electronic mail, identity authentication/digital signatures, anti-spam filtering and spam source detection, voice telephony and instant messaging), search engine applications, multimedia distribution applications (such as MP3 or MPEG distribution and content adaptation), push content applications (such as stock quotes, news or other dynamic data distribution), network applications (such as on-demand/dynamic virtual private networks and network/enterprise security), etc. can be implemented. These applications can be implemented with minimal hardware at the network 100 core 122 because much of the processing load and bandwidth demands are distributed out at the edge 124 of the network 100. Further, any application where decentralization of the client interface from the back-end processing enhances the application can be applied on a wide scale to the edge server infrastructure to reduce the centralized demands on the service providers.

VIII. The Fourth Embodiment

The above embodiments intercept packets off the network and subsequently process and determine of a course of action to be taken with those intercepted packets. As was described above, this may include selective interception of packets, selective modification of those intercepted packets and the subsequent release/reinsertion of the packets, modified or unmodified and/or release of new packets, back into the general stream of network traffic. Selective interception includes the temporary interception of all packets presented on the inputs of the edge device and performing an initial evaluation to determine whether the packet should be immediately released or held/intercepted for further processing. The determination of whether or not a particular packet should be held/intercepted and the further processing/modification and/or subsequent release of the temporarily held packet are discussed in more detail below. It will be appreciated that there may be other methods of evaluating packets for possible interception which may utilize mechanisms other than temporarily buffering packets, in whole or in part, for the purpose of the evaluation, such as applying pattern matching as the packet moves through the packet processor, etc., and all such mechanisms are contemplated.

The embodiments disclosed above may be implemented by coupling, logically and/or physically, an edge server or similar device, such as the CloudShield CS-2000 DPPM or IBM BladeCenter having a CloudShield DPI or PN 41 blade as will be described in more detail below, with the routing equipment of a telecommunications carrier and/or Internet service provider to facilitate packet interception at a point as close to the POP's as possible or otherwise at a point where services, described in more detail below, may be provisioned. This allows for early and reliable packet interception and further ensures some measure of reliability in determining the origination of a particular packet, the advantages of which are described above. Alternatively, it was noted above that the interception of packets may also take place at other upstream locations. It will be appreciated that the optimal logical and/or physical placement of the disclosed embodiments is at any point within the network traffic flow which is most likely to see all of the relevant packets that are to be intercepted flow through. For example, in carrier-class implementations, as will be described below, optimal placement may be at the logical and/or physical location from which services are provisioned to a customer base, such as a central office, peering point, metro node, etc., though the disclosed embodiments may actually permit the relocation/distribution of service provisioning to more optimal physical and/or logical locations depending on the implementation.

In addition to the above embodiments, many other solutions to the Internet's problems may involve the use of such edge devices to provide services which process, route and/or deliver packets. Examples of such services include switching, server load balancing, DNS enhancement, quality of service enhancement, and content delivery enhancement such as caching and mirroring applications. Other examples include application specific devices which provide particular services such as intrusion protection devices, e.g. the IBM ISS Preventia appliance manufactured by IBM Corporation, firewall devices, e.g. the Checkpoint Firewall-1 manufactured by Check Point Software Technologies, Inc., located in Redwood City, Calif., anomaly or Distributed Denial of Service detection appliances such as devices manufactured by Arbor Networks, Inc., located in Lexington, Mass., or virus protection appliances. One exemplary device is the WebSwitch, manufactured by Alteon Web Systems, located in San Jose, Calif., which looks for packets with a port address of 53 indicating a DNS request. The WebSwitch intercepts and re-directs all DNS requests to alternate DNS servers. In contrast to application/service specific devices, the CS 2000 Deep Packet Processing Module ("DPPM"), manufactured by CloudShield Technologies, Inc., located in San Jose, Calif. (and described in more detail above) is a general purpose selective packet interception device which, in one application, may also intercept DNS requests but performs its interception selectively by analyzing the application data layer of the packets in addition to the header data layer. Any portion of the packet may be analyzed. Implementing these applications and enhancements requires intercepting packets as they flow over the network prior to their receipt by their intended destination, e.g. the destination to which the packets are addressed, processing the packet contents to determine a course of action and then performing that course of action, as was described.

As described above, it is optimal, in most Internet enhancement applications, to intercept and process packets close to their source before they enter the general stream of Internet traffic and diverge or alternatively, at one or more "choke points" through which all of the relevant packets must flow, such as a service provisioning point. For many of the above applications/services, it is desirable to intercept packets before they are routed beyond the edge of the Internet. However, as more and more of these solutions are developed, there will be more and more demand to intercept and process packets at the edge of the Internet or at critical packet switching choke points, such as Network Access Points ("NAP's"), or service provisioning points, such as those implemented by telecommunications carriers. In reality, this means that carriers, Internet Service Providers or NAP providers may want to provide more and more services, or more and more solution providers will want access to the equipment of the carriers, Internet Service Providers or NAP providers, at the edge of the Internet or in control of the desired choke points, to install their packet interception devices and provide their services, causing new problems in the process.

As will be appreciated, in order to intercept a packet flowing from one point to another, an intercepting device must be logically and/or physically installed in series with the packet flow so that all packets of interest must flow through the device. The intercepting device then intercepts the packets as they flow from point to point and determines what actions it will take with the packets. The costs of introducing an intercepting device include the reconfiguration required of the network to physically and/or logically integrate the device, the latency added by the processing time that it takes the device to perform its function, e.g. to determine the course of action, as well as the decrease in system-wide reliability/increased risk of failure introduced by the device and its interconnection. The latency can be quantified by the degradation in packet throughput, from the ideal "wire speed" throughput, that is caused by the processing time of the device. As can be seen, as more and more intercepting devices are introduced, each device must be connected in series with the others and each adds additional processing latency to the overall packet flow. Further, if the processing performed by such devices cannot match or exceed the speed at which data is flowing, the wire speed, network performance will suffer. Carriers or Internet service providers may be unwilling to introduce such additional overhead within their sub-networks and therefore may refuse to allow edge devices to be installed. Further, even if the benefits outweigh the additional latencies introduced, each additional device adds additional configuration complexities and an additional possible failure point which can bring down the service providers entire network, a risk Carriers or Internet service providers may be unwilling to take. In addition, since each intercepting device is connected in series with the others, each device (except for the first device in the chain) must wait for the upstream devices to process a given packet before processing the packet itself. This may cause contention for the service provider when determining which device to place ahead of another in the packet flow. Finally, the physical and/or electrical limitations of the service provider's hardware or environment may discourage or prevent the installation of multiple edge/intercepting devices.

As can be seen from the above embodiments, edge devices generally perform the basic functions of intercepting packets from the general flow of network traffic, processing the intercepted packets and potentially releasing the original packets and/or reinserting new or modified packets back into the general flow of network traffic. In general, it is the choice of which packets to intercept and the subsequent processing performed by each edge/packet intercepting device on the intercepted packets, e.g. the application, which distinguishes each device.

Figure 7:
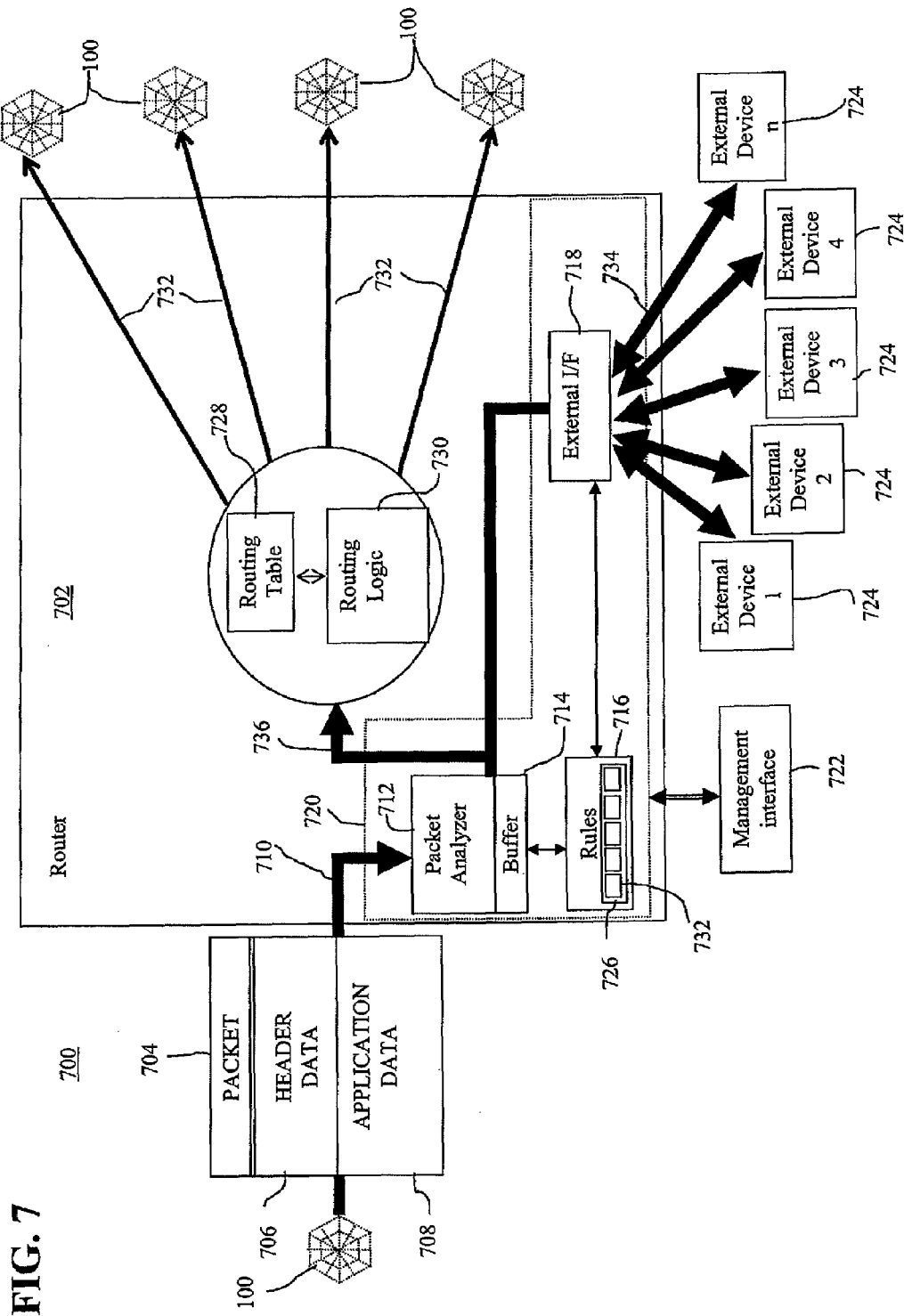
FIG. 7 depicts an edge adapter and packet interceptor according a fourth embodiment.

Referring now to FIG. 7, there is shown a fourth embodiment of an edge adapter/packet interceptor system 700 which provides a scalable and reliable connection for multiple edge/packet interception devices to the routing equipment of the Internet Service Provider without introducing additional network latency or potential failure points to the packet flow with the addition of each such edge/packet interception device. It will be understood that each device may be implemented in hardware, software or a combination thereof. The edge adapter/packet interceptor system 700 decouples the interception of packets from the processing of those intercepted packets and provides a generic packet interception and pre-processing engine which can be utilized in parallel by multiple edge devices to implement their respective functionality/applications. As was noted above, the previously described embodiments can alternatively process packets which are forwarded to them by the ISP's or Carrier's routing equipment. The edge adapter/packet interceptor system 700 provides this interception and forwarding service. Further, the system 700 provides a standardized interface to a network such as the Internet for the connection of edge type or packet interception devices making it easier for an ISP or Carrier to offer the services/enhancements of many different providers, referred to as "managed services." In addition, the system 700 is capable of processing packets at, or in excess, of wire speed so as not to degrade network performance from the optimal. In one embodiment, the system 700 is selectively transparent to the network. Where the device is to be visible, it can be addressed just like any other device coupled with the network. However, this addressability may be disabled to make the device invisible to other network devices.

The system 700 may include a router 702 and a packet interceptor adapter 720 coupled with the router. The router 702 may be located within an ISP located at the edge of a network 100, such as the Internet 100 as described above, or in a central office, peering point or metro node operated by a telecommunications carrier. Alternatively, the network 100 can be a private intranet or extranet as described above. Further, the network 100 may be an optical based network 100 or electrical, or combinations thereof. Exemplary routers 702 include: the Cisco 12000 Series GSR Internet router, manufactured by Cisco Systems, Inc., located in San Jose, Calif.; the Cisco 10000 Edge Services Router, manufactured by Cisco Systems, Inc., located in San Jose, Calif.; the Cisco 7500 Series router, manufactured by Cisco Systems, Inc., located in San Jose, Calif.; the Passport 8600 Routing Switch, manufactured by Nortel Networks, Inc., located in Saint John, Canada; the GRF MultiGigabit Router GRF 1600, manufactured by Lucent Technologies, Inc., located in Murray Hill, N.J.; and the M20, M40, and M160 Internet Backbone Routers, manufactured by Juniper Networks, Inc., located in Sunnyvale, Calif.

In the one embodiment, the adapter 720 may comprise a standalone device or an adapter card (also known as a "board" or "blade") inserted into the router's 702 expansion slot backplane or separate blade enclosure, as will be described In one embodiment, the adapter 720 implements the Intelligent Packet Architecture™ developed by CloudShield Technologies, Inc., located in San Jose, Calif. In one embodiment, the adapter 720 comprises the CS 2000 DPPM manufactured by CloudShield Technologies. Alternatively, the adapter 720 comprises the CS-2000 DPPM blade, also referred to as a DPI or PN 41 blade, developed by CloudShield Technologies for use with the IBM Blade Center enclosure, manufactured by IBM. The adapter 720 is coupled with the router 702 so as to be able to intercept packets 704 before they are routed by the router 702 over the network 100. In alternative embodiments, the adapter 720 may comprise a stand alone device either coupled with the router 702 or coupled in line with the router 702 on the network 100. In the latter case, the adapter 720 is capable of interfacing with the network 100, whether optical or electrical.

The router 702 further includes a network interface 710, a routing table 728 and routing logic 730. As is known, and described above, packets 704 enter the router 702 from the network 100 via the network interface 710. In normal operation, where there is no edge adapter 720 installed, the packet 704 would be routed to the next network 100 node by the routing table 728 and routing logic 730 which analyze the destination internet protocol address of the packet 704 and determine where the packet 704 should be sent next within the network 100. It will be appreciated that the routing logic 730 and routing table 728 can further implement policy based routing and quality of service protocols as are known in the art.

In one embodiment, the logical architecture of the packet interceptor adapter 720 includes a packet analyzer 712, a buffer 714, a rules processor 716 and an external device interface 718. The edge adapter 720 may further include a management interface 722 and interfaces 734 for external devices 724. The packet analyzer 712 is coupled with the network interface 710 of the router 702 so as to be able to intercept packets 704 before they can be routed by the routing logic 730 and routing table 728, e.g. sent along to their intended destination. Further, the adapter 720 includes an interface 736 with the routing table 728 and routing logic 730 of the router 702 to send packets to be routed. This arrangement logically places the edge adapter 720 between the network interface 100 and the routing table 728 and routing logic 730. In alternative embodiments, the routing table 728 and routing logic 730 of the router 702 can be configured to automatically forward all incoming packets out to the edge adapter 720 first and then route packets received from the edge adapter 720 as normal over the network 100.

As packets 704 enter the router 702, they are temporarily diverted to the packet analyzer 712 which determines whether or not the packet is to be intercepted. This determination is made in conjunction with the rules processor 716 by analyzing the header data 706 and application data 707 contained with the packet 704 according to pre-defined rules contained within the rules processor. As will be described in more detail below, if it is determined that the packet 704 is not to be intercepted, it is released to the routing logic 730 of the router 702 for normal routing. If the packet 704 is to be intercepted, it is stored in the buffer 714 for further processing and analysis by the rules processor 716 and interceptor/analyzer 712 or one or more of the external devices 724.

Interception and subsequent processing of packets 704 is based on the application of rules to any of the various layers of data contained with the packet 704. As is known in the art, the Internet utilizes the Transport Control Protocol/Internet Protocol ("TCP/IP") protocols to exchange information among connected clients and server computer systems. Further, it is known that the Internet supports several application protocols such as hypertext transfer protocol ("HTTP") or file transfer protocol ("FTP"). The ability of the Internet to support different application uses is based the concept of protocol "layering", also referred to as the layered protocol stack. Layering is the idea of designing several individual pieces of software, where each one performs one out of a set of functions, instead of designing one piece of software which performs all of the functions. Layering simplifies software development and reduces complexity.

In a layered software architecture, many different software components interface with one another to achieve the desired functionality, e.g. allowing a user to communicate over a network. A well known layered network software architecture has the following five layers:

Layer 5: Application Layer
Layer 4: Transport Layer
Layer 3: Routing Layer
Layer 2: Switching Layer
Layer 1: Interface Layer The application layer or layer 5 comprises the particular application program that the user is running on their computer such as a web browser or a web server. The application layer can be thought of as interfacing between the transport layer and a sixth layer which is the end user. Users communicate with the application layer which in turn delivers/receives data to/from the transport layer. Many different applications can be operating at any given time. Particular applications are assigned port numbers or addresses which the transport layer uses to uniquely identify and communicate with the applications. Well known applications have fixed port addresses known as "well known ports." These ports are assigned by the Internet Assigned Numbers Authority (IANA).

The transport layer, layer 4, interfaces the user applications to the network infrastructure and structures the data for transmission by the routing layer. An exemplary transport layer is the Transport Control Protocol ("TCP") described above. TCP is a connection oriented protocol requiring the establishment of parameters for transmission prior to the exchange of data. For more information on the TCP protocol, see TRANSMISSION CONTROL PROTOCOL, DARPA INTERNET PROGRAM, PROTOCOL SPECIFICATION, September 1981, prepared for Defense Advanced Research Projects Agency, Information Processing Techniques Office by Information Sciences Institute, University of Southern California. As described above, the transport layer interfaces with particular applications using a port number or address.

The routing layer, layer 3, facilitates the delivery of data over the network and provides the logical network infrastructure which allows for network partitions or sub-networks, scalability, security and quality of service ("QoS"). An exemplary layer 3 protocol is the Internet Protocol ("IP") discussed above. The IP layer 3 protocol relies on IP addresses to route and deliver packets from their source to their destination.

The switching layer, layer 2, allows end station addressing and attachment. Layer 2 relies on unique Media Access Control ("MAC") addresses assigned to each computer connected to the network. The interface layer, layer 1, is responsible for device connectivity and usually refers to physical hardware/firmware which is used to build the physical network. Layers 1 and 2 are usually integrated and operate together. An exemplary layer 1 is provided by Ethernet type networks. Other layer 1 network hardware includes token ring or fiber optic based networks. The layer 1 physical network hardware provides a unique MAC address for use by layer 2. For example, every Ethernet interface card includes a unique Ethernet address built into it.

The software which implements each layer only has to know how to interface with its adjacent layers, i.e. the application layer only has to know how to interact with the user and the transport layer. This, for example, alleviates the need for a web browser to know how to communicate over all of the various types of physical network hardware (layers 1 and 2) that could be attached to the particular computer. For example, the web browser program, Internet Explorer™, manufactured by Microsoft Corporation, located in Redmond, Wash., does not need to know whether a user is connected to the Internet via local area network or a modem. The routing, switching and interface layers handle this.

In practice, the user communicates with the application layer which generates application data to be sent to a destination. For example, the user enters a Uniform Resource Locator ("URL") into his web browser. The URL identifies a particular world wide web page to be retrieved from a particular web server computer. The web browser then generates a request to that web server for the desired web page, known as a "GET" request. This application data, in this case the URL and the request command, is passed to the transport layer. The transport layer breaks the data down into one or more packets which can be sent over the network. A packet is the unit of data which can be transferred over the network infrastructure and is discussed in more detail below. The transport layer figures out how many packets are needed, and organizes and identifies them so they can be reassembled at the destination. In the case of a URL, only one packet may be necessary to contain the data. The transport layer then passes each packet to the routing layer. The routing layer adds a source and destination address to each packet and hands the packet off to the switching layer. The switching layer in combination with the interface layer transmits the packet onto the network. Once on the network, network hardware such as routers and switches route and direct the packet to the proper destination based on the IP and MAC addresses.

At the destination, as each packet is received, the interface and switching layers pull them off the network hardware based on the MAC address and hand them up to the routing layer. The routing layer ensures that the particular packet has reached the right IP address and then passes the packet up to the transport layer. The transport layer receives and assembles all of the packets. If any packets are missing (due to a network error for example), the transport layer re-requests the missing packet from the source by generating a special request packet. Once the application data has been received and assembled, it is passed up to the application layer. For example, the destination may be a web server, within or external to the device, which receives the URL and request command for further processing.

Notice that the routing, switching and interface layers, as used with the IP protocol, implement a connectionless protocol. These three layers do not guarantee delivery of a packet or set of packets or guarantee how (i.e., over what route or in what order) or when those packets will arrive. They perform a specific function of attempting to deliver a given packet to its intended destination. It is up to the transport layer to make sure that the overall communication is successful.

Another layered architecture which defines seven different layers is the Open Systems Interconnect ("OSI") model. These layers include the application layer, the presentation layer, the session layer, the transport layer, the network layer, the data-link layer and the physical later. For more information on layered network architectures, see Layer 3 Switching, An Introduction, 3-Com Technical Papers, published by 3-Com Corporation, Santa Clara, Calif.

As mentioned above, the transport layer breaks the application data down into packets. The routing layer then attempts to deliver each packet to its destination. A packet is the unit of data upon which the routing layer, layer 3, operates. Packet switching is the scheme by which the packets are routed and delivered to their destination. A packet also logically comprises layers which correspond to the layers of the software architecture described above. In reality, each layer of the packet is really the pieces of information added by each of the software layers as the packet is passed along.

A packet can also logically be thought of as having two distinct layers or parts, the application data and the header data. The application data is the data provided by the application layer, layer 5, as broken down by the transport layer, layer 4, for transmission. This may also be referred to as the "payload". This may be a URL, part of a web page, part of an email, part of a telnet terminal communications, part of a FTP file transfer, etc. The header layer comprises all of the other addressing information provided by layers 1-4 which is used to get the packet from its source application to its destination application. This includes the TCP port address (layer 4), packet sequencing data (layer 4), IP addresses of the source and destination computers (layer 3) and the MAC address (layers 2 and 1). While the above layering architecture and packet structure are more prevalent, one of ordinary skill in the art will appreciate that there are many different known network architectures and software models which can be used with the disclosed embodiments, such as the User Datagram Protocol ("UDP") which is similar to TCP and transmits datagrams.

Packets are delivered to their destination over the network by routers and switches. These devices access the different layers within the packet to determine where to send the packet. A switch is usually associated with layer 2. A switch reads the layer 2, MAC address, from the packet and delivers the packet directly to the correct device. If the switch determines that the device with the correct MAC address is not connected to it, then the switch delivers the packet to another switch and so on until the packet is delivered to its intended destination.

A router is usually associated with layer 3. A router reads the layer 3 IP address of the destination from the packet and, as described above, determines the route, and specifically the next adjacent network point to which the packet should be sent. Routers typically require routing logic which is programmed with knowledge of the network and knows how to determine the route over which to send a particular packet. This routing logic typically includes a routing table which identifies the routes for particular IP addresses. Many routers also factor in network usage information so as to route packets over less congested routes. A router ultimately delivers the packet to a switch which delivers the packet to its final destination. In some cases, a router and switch may be combined. A router may also be used as a firewall or proxy server (reverse or forward), blocking and/or re-routing packets based on their source and/or destination IP addresses.

Referring back to FIG. 7, all packets 704 which are flowing through the particular network node implemented by the router 702 first flow through the packet analyzer 720. Each packet 704 is stored in the buffer 714 for processing by the rules processor 716 and packet analyzer 720. While the processing of a single packet 704 is generally described, it will be appreciated that multiple packets 704 may be buffered and processed substantially simultaneously as described below, such as to improve throughput. The rules processor 716 contains one or more rule sets 726 which are used by the packet analyzer 720. Each rule set 726 contains one or more rules 732 which are applied by the packet analyzer to the buffered packet(s) 704. Essentially, each rule 732, described in more detail below, consists of a function and an action to be taken based on the results of the evaluation of the function. The function may involve analysis or examination of one or more portions of the packet(s) 704, and typically comprises a comparison operation which compares one or more portions of the packet(s) 704 with one or more pre-defined values to determine whether or not the associated action should be taken. The packet analyzer 720 is capable of analyzing or examining any part of the packet(s) 704, including any data from the header data layer 706 or application data layer 708 (including all 5 or 7 layers as described above). For example, one rule 732 may be to compare the port address from the header data layer 706 to a value of 80 to determine if this is an HTTP packet. Further, the rule set 726 may contain several rules which compare different parts of the packet(s) 704 to different values, in effect creating a compound function. An example would be to determine not only that a particular packet 704 is an HTTP packet but also to then determine the URL contained within the application data layer 708. In addition, a function of a rule 732 may also use the result of another rule 732 in its rule set 726 or another rule set 726 as an input to be evaluated. In addition, state information representing the analysis of past packets may be stored and used by rules 732 to analyze future packets. This functionality, for example, may be used to monitor for sequences of particular packets 704 flowing over the network 100.

Once the function of a rule 732 has been processed/evaluated, the packet analyzer 720 will take the desired course of action or actions as dictated by the rule 732. The packer analyzer 720 is capable of taking several basic actions independently or in combination. Further, these actions may be implemented as part of a rule or separately implemented and triggered via an external command from the management interface 722 or from one or more of the external devices 724. The basic actions that the packet analyzer 720 can take include: capturing a packet to the buffer 714 for further operation; releasing the buffered packet 704 to the routing logic 730; forwarding a copy of the buffered packet 704 to one or more of the external devices 724 (described in more detail below); deleting the buffered packet 704 from the buffer 714; modifying the buffered packet 704; and replacing the buffered packet 704 with a new packet(s), which may be received from one of the external devices 724. In addition to or, alternatively, instead of taking these basic actions, the packet analyzer 720 may log or otherwise store information about the packet, including storing a copy of the packet itself. This log may be used for subsequent processing/analysis of other packets or for reporting purposes. As can be seen, one or more of these basic actions can be combined with others to create compound actions to be taken on a given packet 704. For example, a compound action could include capturing a given packet 704 which satisfied the operation of a particular rule 732, forwarding a copy of the captured packet 704 to one of the external devices 724 for further processing, and in response to a command received from that external device 724 (as determined by its own processing of the copy of the packet 704), modifying the IP address and payload of the captured packet 704 and releasing the modified packet 704 to the routing logic 730 of the router 702. It will be appreciated that such complex actions and compound operations can be directly implemented as opposed to being implemented via a combination of basic actions.

In addition, data about the packet 704 may be stored in a memory for use by other rules, for processing the current or future packets 704. This allows stateful processing, i.e. state based rules, of packets 704 as they flow through the packet analyzer 720. By storing information about past packet 704 activity that the packet analyzer 720 has processed, rules 732 may be implemented which take into account historical packet activity. An additional basic operation of the packet analyzer 720 is provided for storing a one or more attributes, or an entire copy, of the captured packet(s) in a state memory. For example, a rule 732 may defined to watch for multiple malformed packets 704. Where a single malformed packet 704 is received, the rule 732 will take no action as this may be due to a random network error. However, data regarding that malformed packet, or the entire packet itself, will be stored. If another malformed packet 704, similar to the first malformed packet 704, is subsequently received, the rule 732 may determine that some malicious activity is underway and delete the second packet 704. Other state information may also be recorded such as a time stamp. This allows the memory to be periodically purged, or alternatively, allows the rule 732 to take into account the frequency of occurrence, etc.

The packet analyzer 720 is fully programmable and rules 732 must be defined for each desired action and contingency. If no rules are defined for a particular contingency, the packet analyzer 720 will take the default action of releasing the packet. In this way, an unprogrammed device will not impede network traffic. For example, where a given packet 704 fails to trigger any rules 732, that packet 704 can be automatically released to the routing logic 730 of the router 702 through the operation of a default action. In one embodiment, the default action is part of a default rule 732, such as a rule 732 which has an evaluation function which always triggers the associated action. In this way, packets 704, for which the packet analyzer 720 or no external device 724 wishes to intercept are simply released to the routing logic 703 for routing as normal. In an alternate embodiment, an unprogrammed packet analyzer 720 will take no action including not releasing the packet 704.

Note that depending upon the implementation of the adapter 720, the basic operations may be implemented in a different fashion. For example, if the packet analyzer 720 automatically captures every packet 704 which flows through the device 720 to the buffer 714, then a capture packet operation may not be necessary. However, in this situation, a release packet operation may be necessary to actively release unwanted packets 704. In alternative embodiments, the packet analyzer 720 may implement an in-line filtering function which eliminates the need to capture a given packet 704 to the buffer 714 for initial analysis. In this case, a capture packet action may be required to tell the packet analyzer 720 to capture the packet 704 to the buffer 714 for subsequent analysis and processing. Further, then, the packet analyzer 720 does not need to actively release unwanted packets 704. However, a release packet action may still be necessary to release those packets 704 which are captured to the buffer 714.

As described above, the rules processor 716 may comprises multiple rule sets 726 and rules 732. Some rule sets 726 and their rules 732 may be defined by the external devices 724 coupled with the edge/packet interception device 720. For example, one external device 724 may want to intercept DNS packets and will define a rule set 726 to implement that function. Another external device may want to monitor and copy all HTTP requests to a particular IP address and will define a rule set 726 to implement that function. Other rules sets 726 may be standardized and provided as standard functions, such as in a library. Still other rule sets 726 may be defined by an external device 724 but can be entirely processed by the rules processor 716. These rule sets 726 and rules 732 may be redefined or reset dynamically by the rules processor 716 or the external devices 724, as needed, to implement their desired functionality. Further, the rule sets 726 and rules 732 may be re-defined or reset via the management interface 722. Rule sets 726 may also implement security or authentication to prevent one external device 724 from interfering with the operation or security of another external device 724. The rules processor 716 interfaces with the external devices 724 and the management interface to enable definition and modification/re-definition of rules 732 and rule sets 726 both statically and dynamically.

The external device interface 718 couples the adapter 720 with one or more external devices 724. The interface 718 provides the hardware and software connection to pass data back and forth between the packet analyzer 712 and rules processor 716 and the external devices 724. This data includes commands to the adapter 720, such as to release a buffered packet 704, modify a buffered packet 704 or to redefine one or more of the rules 732 or rule sets 726 in the rules processor 716. In addition, the data includes packets to be delivered to the routing logic 730 of the router 702 for routing onto the network 100, in addition to, or to replace, the packet presently held in the buffer 714. Further the data can include copies of buffered packets 704 from the packet analyzer 712 sent to one or more of the external devices 724 in response to the action of one or more rules 732. The interface 718 further implements the parallel connection of multiple external devices 724 to the network 100 so that each device 724 does not increase the overall network 100 latency. The interface 718 may also implement arbitration schemes so that each external device 724 can implement its particular application in an efficient manner and without interference from the other external devices 724. In one embodiment, up to eight external devices may be coupled with the adapter 720 via the interface 718, although alternative embodiments may support fewer or more devices. In one embodiment, all packet processing is handled within the adapter 720 and no external device interface 718 is provided.

Figure 8:
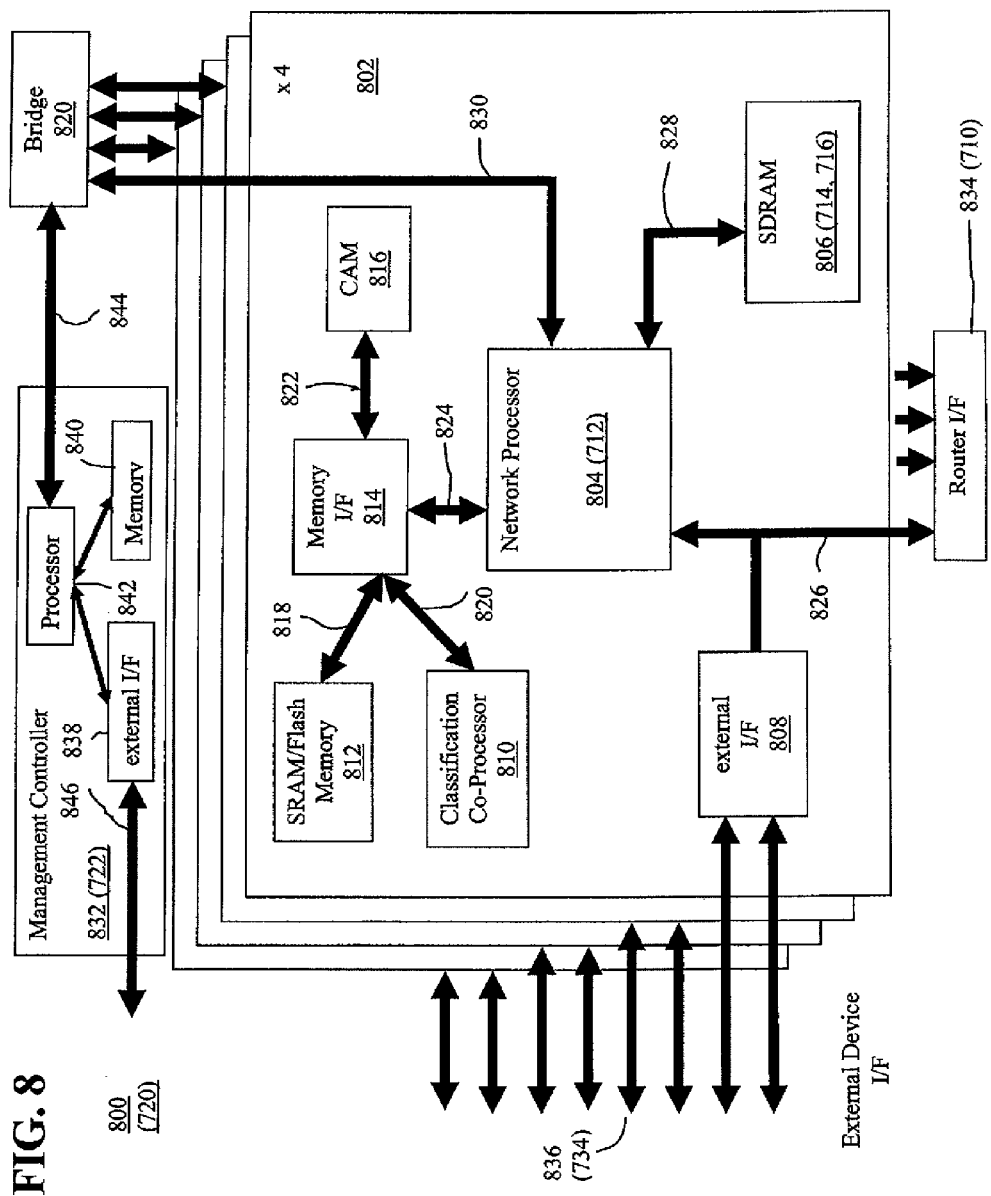
FIG. 8 depicts a block diagram of the packet analyzer/adapter of FIG. 7.

Referring now to FIG. 8, there is shown a more detailed block diagram 800 of the adapter 720 from FIG. 7. As described above, the adapter 720 may be implemented as a standalone device, an adapter card/board/blade which is inserted into a router's 702 backplane interface or an adapter card/board/blade which is inserted into blade enclosure and coupled with the ISP or Carrier's routing mechanism. Further, in one embodiment the adapter card comprises a management controller 832 and four adapter daughter cards 802, each daughter card providing, for example, two external device 724 interfaces 836. Further, a bridge device 820 may be provided to interface each of the daughter cards 802 with the management controller 832 and a router interface 834 which couples each of the daughter cards 802 with the router 702 backplane.

The management controller 832 may comprise an external interface 838 coupled with a processor 842 and memory 840. The external interface 838 may be an 82559 100 megabit Ethernet interface, manufactured by Intel Corporation, located in Santa Clara, Calif. It will be appreciated that other external interface technologies may also be used such as serial, parallel, coaxial and fiber optic based interfaces. The external interface 838 further comprises a VMS747 Security/Cryptographic Processor, manufactured by Philips Semiconductors, Inc., located in the Netherlands for security. The external interface 838 interfaces the management controller 832 with an external management device (not shown) for controlling and managing the adapter 720 via interface 846 which may be a 100 megabit Ethernet interface. The external management device may be a 808× compatible desktop computer including a Pentium Class processor such as a Pentium III processor manufactured by Intel Corporation in Santa Clara, Calif., 32 megabytes of RAM, 6 gigabytes of hard disk space and an Ethernet interface. It will be appreciated that such desktop computer systems are well known. In alternative embodiments, the external management device can be locally or remotely located with respect to the adapter 720. The processor 842 may be a StrongArm™ control processor manufactured by Intel Corporation located Santa Clara, Calif. The processor 842 is coupled with memory 840 which may comprise both 16 megabytes of Synchronous Dynamic Random Access Memory as working storage and 32 megabytes of non-volatile (Flash or Static RAM) storage for firmware and back-up storage. The processor 742 interfaces the management controller 732 with the four daughter cards 802 using a standard Personal Computer Interface ("PCI") compliant bus 844 and bridge logic 820. Alternatively, the Compact Personal Computer Interface ("CPCI") may be used.

Each daughter card 802 includes a network processor 804, bulk data storage 806, an external device 724 interface controller 808, a memory interface 814, a classification co-processor 810, non-volatile storage 812, and a content addressable memory 816. The network processor 804 may be an IXP1200 Network Processor, manufactured by Intel Corporation, located in Santa Clara, Calif. The network processor 804 includes six micro-engines (not shown) which handle buffering and processing packets as will be described. The network processor 804 is coupled with the PCI bus 830 which interfaces the daughter card 802 with the PCI bridge logic 820 which in turn links all of the daughter cards 802 together and with the management controller 832. The network processor is also coupled with the bulk data storage 806, which is which may include 8 megabytes of Synchronous Dynamic Random Access Memory (SDRAM), via a 64 bit. 83 MHz bi-directional (166 MHz total) SDRAM bus. The bulk data storage 806 is used to store the operating software for the network processor 804, the buffered packets undergoing processing as well as the rules and rule sets as will be described below.

The network processor 804 is further coupled with the external device 724 interface controller via a 64 bit. 66 MHz bi-directional (132 MHz total) IX bus 826. The external device 724 interface controller may be an IXF1002 Dual Port Gigabit Ethernet MAC, manufactured by Level One™, Inc., located in Sacramento, Calif., a subsidiary of Intel Corp., located in Santa Clara, Calif. The external device 724 interface controller interfaces with the external devices 724 using gigabit optical transceiver interfaces 836.

In addition, the IX bus 826 also interconnects the four daughter cards 802 with the router backplane (not shown) via the router interface 834. The interface 834 may comprise a Quad IXA field programmable gate array, manufactured by Xilinx located in San Jose, Calif., which controls cross communications between the daughter cards 802 and the traffic gating to the router backplane. Further, the router interface 834 may include the router switch fabric interface to interconnect the adapter 720 with the router backplane.

The classification co-processor 810 may comprise a ClassiPI™ Classification Co-processor, manufactured by SwitchON Networks, Inc., located in Milpitas, Calif. The non-volatile storage 812 may comprise 32 megabytes of Flash memory or Static RAM or other non-volatile storage as is known in the art. The content addressable memory 816 may comprise a NetLogic IPCAM® Ternary CAM Ternary Content Addressable Memory, manufactured by NetLogic Microsystems, Inc., located in Mountain View, Calif. The classification co-processor 810, the non-volatile storage 812 and the content addressable memory 816 are all coupled with the memory interface 814 via memory busses 818, 820 and 822. The memory interface 814 may be a field programmable gate array device implementing glue logic and clocking signals for the non-volatile memory 812. The memory interface 814 further couples the classification co-processor 810, the non-volatile storage 812 and the content addressable memory 816 with the network processor 804 via a 32 bit 83 MHz bi-directional (166 MHz) Static RAM memory bus 824.

The non-volatile memory 812 is used to store the operating software, including the operating system and custom microcode, for the adapter 800. Upon boot up of the adapter 800, this operating code is loaded into the bulk storage memory 806 from which it is executed. The non-volatile memory 812 is further used to store rules 832 and state level information used to restore previous system operation parameters when powering on. The classification co-processor 810 and content addressable memory 816 are used by the network processor 804 to offload specific rule processing tasks when it is more efficient to do so. In particular, processing of rules which involves table look ups or matching values to table entries is best handled by the content addressable memory 816. Establishing packet type or other classifying operations are best handled by the classification co-processor 810. As will be described below in more detail, the operating code of the network processor 804 is pre-programmed to cause the network processor 804 to offload certain processing functions to the classification co-processor 810 or the content addressable memory 816 when those devices can perform the particular function more quickly and efficiently than the network processor 804 can. It will be appreciated that other application or function specific processing devices may be included to more efficiently process particular functions of the adapter 800. Such devices may include: a CryptoSwift™ cryptographic processor, manufactured by Rainbow Technologies Products, Inc. located in Irvine, Calif.; a C-5™ Digital Communications Processor, manufactured by C-Port, Inc., located in North Andover, Mass., a subsidiary of Motorola, Inc., located in Schaumburg, Ill.; a NetLogic Policy Co-Processor™ Packet Classification Engine, manufactured by NetLogic Microsystems, Inc., located in Mountain View, Calif.; a NetLogic CIDR Co-Processor™ Longest Prefix Match Engine, manufactured by NetLogic Microsystems, Inc., located in Mountain View, Calif.; a NetLogic IPCAM® Ternary CAM Ternary Content Addressable Memory, manufactured by NetLogic Microsystems, Inc., located in Mountain View, Calif.; a NetLogic SyncCAM® Binary CAM Binary Content Addressable Memory, manufactured by NetLogic Microsystems, Inc., located in Mountain View, Calif.; or a NetLogic NCAM™ Binary CAM Binary Content Addressable Memory, manufactured by NetLogic Microsystems, Inc., located in Mountain View, Calif.

It will be appreciated that the preferred components are known in the art and that suitable substitutes which implement the same functionality may be used. Further, the disclosed packet interceptor adapter may also be embodied in an alternative physical architecture such as a single board design, or an adapter box external to the router.

Generic operation of the packet interceptor adapter 720 is as follows: A packet is intercepted by the packet analyzer 712/804. Framers on the router interface 834 capture the packet and forward it to the network processor 804. Framers are protocol specific devices which understand the network protocol in use, such as Ethernet or Asynchronous Transfer Mode ("ATM"), and which are capable of isolating packets from the raw communications stream and extracting the actual packet contents.

The packet is buffered in buffer 714/806. The network processor 804 places the intercepted packet into the bulk data storage 806 and creates and stores a packet information block ("PIB") which contains parameters of the packet for efficient reference. These parameters include the source and destination addresses, length and other packet specific data as well as the address within the SDRAM 806 where the packet is buffered/stored. The network processor 804 further creates a pointer to the packet information block in a queue which lists packets ready for further processing. In one embodiment, the network processor 804 includes six micro-engines as described above. Two of these micro-engines are designated masters and the remaining four are designated as slaves. As packets enter the adapter 800, one of the two master micro-engines, depending upon availability, buffers the packet to the SDRAM 806 and creates the PIB and pointer.

First level rules/sets are executed against the buffered packets. In one embodiment, the slave micro-engines, described above, when idle, continually check the queue of packets ready for further processing. When there is a pointer in the queue of a packet that is ready, the idle slave micro-engine dequeues the pointer entry for the packet and begins processing that packet according to the rules and rule sets programmed into the adapter 800. In one embodiment, each rule set consist of a hierarchical tree of nodes which are logically linked together, where one or more nodes form a rule. Each tree begins with a root entry node where processing begins. Each node may be one of three types, data gathering, decision or action. Data gathering nodes retrieve data or other information about the current packet, about the current operating environment or about other packets which may be relevant to the current packet being processed and which have been stored for such reference. Data gathering nodes gather information to be used by decision nodes. Decision nodes perform a function utilizing the data gathered by the data gathering nodes such as a comparison function, an equality function, an inequality function, or some other mathematical and/or Boolean operation. An action node uses the result of the decision node to perform some operation on the packet. In one embodiment of the adapter 800, the possible actions include releasing the current packet, copying the current packet and sending the copy to an external device via the external device interface 808, or alternatively, sending the PIB or pointer, deleting the packet or modifying some or all of the packet and releasing it, or combination thereof. Each node specifies another node to which processing should continue when processing of the current node is complete. It will be appreciated that the node and tree structure is a logical data organization which may be implemented as a table of pointers or other construct as is known.

When processing a data gathering, decision or action node, the slave micro-engine may offload the processing to a co-processing element such as the classification co-processor 810 or the content addressable memory 816. The operating code of the slave micro-engine is pre-programmed to cause the micro-engine offload processing of specific node functions when that processing can be more efficiently completed with the other device. In this case, while the co-processing device is processing the particular node, the slave micro-engine either waits for processing to complete or begins processing another packet. In the latter case, when the co-processing device finishes its processing of the particular node, it can indicate that the packet requires further processing, for example by adding a pointer back to the ready for processing queue, so that a slave micro-engine will finish processing the packet.

Once a slave micro-engine has begun processing a packet, it must determine which rule set to enact upon the packet. In one embodiment, each rule set defines a set of one or more packet parameters which indicate to the slave micro-engine that the rule set is to be applied to the current packet. The slave micro-engine references the packet information block using the pointer to determine that the one or more packet parameters meet the rule set requirements. If so, then the slave micro-engine executes that rule set starting with the root node in the tree. If a particular packet triggers application of more than one rule set, the slave micro-engine processes the rule sets in a prioritized order. Alternatively, other execution schemes may be used such as round robin. In one embodiment, the slave micro-engine determines which rule set to execute based upon packet type, wherein only a single rule set is stored for each type of packet that may be intercepted. For example, FTP packets may trigger application of one rule set while HTTP packets may trigger application of a second rule set.

Each rule set/tree of nodes then consists of a set of data gathering, decision and action nodes which process the packet and take a particular course of action. In one embodiment, each rule set is constructed so as to make a quick initial determination on whether to hold or release the packet from the buffer. In this way, processing latency is reduced. Once the particular course of action has been taken with the packet, the slave micro-engine other rule sets, if any, on that packet or returns to polling the queue of packets ready for processing to pick up another packet for processing.

When an action node results in sending a copy of a packet out to an external device, no further action is taken on that packet until a response is received from the external device. In one embodiment, the slave micro-engine waits for a response from that external device before continuing processing. In an alternate embodiment, the slave micro-engine processes other packets while waiting. The response from the external device instructs the slave micro-engine on what further actions to take with the packet. Such further action includes deleting the packet, releasing the packet, or modifying the packet, or combinations thereof. In one embodiment, the external device may provide a substitute packet for the buffered packet to release, with the buffered packet being deleted. This substitute packet may be provided directly to the buffer 806 to overwrite the buffered packet. In yet another alternative embodiment, once the copy of the packet, the PIB or the pointer has been sent to the external device, the slave micro-engine is free to begin processing another packet. The external device then signals that it has completed its processing, such as by writing a packet pointer to the queue of packets ready for processing or some other flag indicating the further processing can take place on the buffered packet to complete the processing thereof.

Where a particular packet fails to trigger the application of any of the rule sets, default rules or actions may be provided for processing the packet, as discussed above. In the disclosed embodiments, the default rule/action consists only of the action of releasing the packet. In this way, packets which are not of interest are immediately released for normal routing.

In addition, the adapter 800 may receive commands from either one more of the external devices 836, or the management interface 832. In one embodiment, the adapter 800 authenticates any commands received to ensure they are from valid sources. Such commands include commands for adding, modifying or deleting a rule set, commands for providing an externally generated packet for release, or commands to delete, modify or release a packet currently in the buffer.

The specific operation of the packet interceptor adapter 720 executing denial of service protection application for malformed Internet Control Message Protocol ("ICMP") packets is as follows: Framers on the router interface 834 captures a packet and forwards to network processor 804. An idle master micro-engine on the Network processor 804 stores packet in buffer/SDRAM 806 and creates PIB and pointer. The pointer put on the queue of packets ready for processing. An idle slave micro-engine checks the queue for packets to be processes and dequeues the packet pointer. The slave micro-engine executes a default application specific rule set. The first rule in the set checks the source IP address of the packet against a list of blocked IP addresses. This processing takes place in the content addressable memory 816 which is more efficient at processing this type of look-up function.

If the source IP address matches a blocked IP address stored in the content addressable memory 816, the slave micro-engine deletes the packet from the buffer and processing ends for this packet. If the source IP address does not match a blocked IP address, the slave micro-engine determines the packet type by analyzing the packet header. If this packet is not an ICMP packet, the packet is released.

If the packet is an ICMP packet, the packet is sent to the classification co-processor 810 to check for proper packet construction. The classification co-processor 810 compares the construction of the buffered packet against a reference stored in the non-volatile memory 812.

If the packet is determined to be malformed, the slave micro-engine is instructed to delete the packet and processing ends for this packet. In one embodiment, the IP address of malformed packet is added to a block list. In an alternate embodiment, the IP address is added to the block list only after the number of malformed packets received from this IP address exceeds a particular threshold. In still another embodiment, the receipt of one or more malformed packets raises an alert to a user for manual intervention to add the source IP address to the block list.

It will be appreciated that any device which intercepts and processes packets can utilize the packet interceptor adapter 720. For example, devices which utilize the transport layer or layer 4 data to route packets to their destination or redirect them to alternate destinations are known. These devices attempt to learn the type of application data being carried by the packet based on the transport layer port address. As described above, well know applications utilize "well known ports." For example, HTTP data uses port 80, Telnet use port 23, FTP uses port 21 and domain name server requests use port 53. This information can be used to redirect a particular packet to a server which can more optimally handle the packet. Utilizing the packet interceptor adapter 720, such devices could define a rule to have the adapter intercept packets destined for a particular port number of a particular IP address. For those packets which are intercepted, the action taken could be to modify the destination IP address to an alternate destination and release the packet. This functionality could be completely implemented on the adapter 720 itself or the adapter 720 could forward copies of intercepted packets out to an external device which dynamically determines the modified IP destination address.

Another exemplary application of the packet interceptor adapter 720 is as web switch. A web switch is used to balance the load across multiple mirror servers at a particular web site. The adapter 720 is programmed with a rule to intercept packets directed to transport layer port 80 of the particular web site (based on the IP address). Knowing that these packets contain HTTP requests, the adapter can re-route the packet from an overloaded server to a server which has excess capacity, thereby balancing the load distribution. Again, this functionality can be implemented directly on the adapter 720 or in combination with an external device 724 which is monitoring and controlling the load distribution across the servers.

In one alternative embodiment, the adapter 800 provides no external interface 836 for external devices. In this embodiment, the adapter 800 intercepts packets and executes rule sets as described above. The rule sets may be developed and provided by third party developers for particular applications. The adapter then comprises a generic packet interceptor and processor.

In still another alternative embodiment, the adapter is configured as an application specific device with a defined rule set for implementing a specific application or set of applications. For example, the adapter is specifically configured to act as an anti-denial of service security device.

In an alternate implementation, the disclosed embodiments may themselves be implemented in a standardized environment to bridge between external devices 724, as described above, and a common or standardized interface to the provider's infrastructure, e.g. the provider's router or routing logic, and thereby, the network 100. This results in the decoupling of the interception of packets from the processing of those intercepted packets thereby providing a generic packet interception and pre-processing engine which can be utilized in parallel by multiple edge devices to transparently implement their respective functionality/applications.

In particular, the disclosed embodiments may be physically implemented as a "blade" or "blade server," as was described above, and connected via a rack mount arrangement referred to as a blade enclosure, such as the IBM Blade Center, manufactured by IBM Corporation, Sorrens, N.Y., which provides standardized power, cooling and connectivity for blade-implemented devices, such as blade servers, etc. The external devices 724 may also be implemented as blades inserted into the same, or a different, blade enclosure and interconnected thereby as will be described. Blade servers are self-contained computer servers, designed for high density deployment. Whereas a standard rack-mount server can exist with (at least) a power cord and network cable, blade servers have many components removed for space, power and other considerations while still having all the functional components to be considered a computer. A blade enclosure provides services such as power, cooling, networking, various interconnects and management—though different blade providers have differing principles around what should and should not be included in the blade itself (and sometimes in the enclosure altogether). Together these form the blade system.

In an exemplary standard server-rack configuration, 1 U (one rack unit, 19" wide and 1.75" tall) is the minimum possible size of any equipment. One principal benefit of, and the reason behind the push towards, blade computing is that components are no longer restricted to these minimum size requirements. The most common computer rack form-factor being 42 U high, this limits the number of discrete computer devices directly mounted in a rack to 42 components. Blades do not have this limitation; densities of 100 computers per rack and more may be achievable with current blade systems.

The exemplary implementation using the IBM Blade-Center system provides services delivery within the IBM BladeCenter HT Chassis leveraging adapters 800, referred to as Deep Packet Processing Modules (DPPM), developed by CloudShield Technologies, such as the CloudShield Deep Packet Inspection ("DPI") Blade, also referred as the IBM PN41 Deep Packet Inspection ("DPI") Blade Server, which may include one or more DPPM's, available from the IBM Corporation. The identification of customer network traffic and coordination of services being applied to the traffic is one role of the DPI blade as a network processor. Other server blades may host the applications/services that will be served up to the customers on an as-provisioned basis, referred to as application servers. In an alternate embodiment, the DPI blade may host applications/services in addition to or in lieu of other server blades. These applications/services include, for example, firewall (e.g. Checkpoint Firewall-1), virtual private network, denial of service protection (e.g. Arbor TMS), intrusion prevention (e.g. IBM ISS Preventia IPS), anti-spam and/or anti-spyware applications. A DPI blade or server blade may also play the role of a content processor whose functionality is more limited to heavy lifting and deep inspection of traffic often as a co-processor or subordinate role to an application server or network processor.

The implementation provides a resilient, scalable framework to add new services via a software provisioning event, i.e. transparently without requiring reconfiguration of the providers physical or logical infrastructure, while also enabling customer based provisioning to have a dynamic impact on the per customer and/or per device service delivery. From a transport perspective the system may be transparent on both ends, the service provider infrastructure as well as to the application servers providing the services. This allows a service provider to insert the chassis, or cluster of chassis', into the network without impacting the Layer 2 or 3 delivery structure as if the services were transparent or not even present. Application servers are further able to leverage existing products in their native form without modification. For example, an enterprise firewall may be deployed in a carrier environment on an application server without change as the disclosed embodiments make it transparent to the network yet allow the firewall to act as a gateway as it normally would. To enable increased features for enterprise class applications, virtual machine technology can be introduced to provide simplified migration, high availability and maximize resource utilization.

The CloudShield DPI blade acts as a network processing line card and together or separately as a deep packet inspection content processing blade. These blades look at all traffic that arrives at the chassis, determine which was for customers or services within the chassis and which are for other systems. Traffic for a specific customer being serviced would be sent to the appropriate customer's applications housed on an application server. Network layer transport manipulation would be utilized to appropriately deliver a customer's traffic to their associated processing element, customer specific rule set as well as support high-availability and fault tolerant fail-over scenarios. When multiple services are applied, coordination of the order of services is manages such that response traffic goes through services in the opposite order of requests.

As scalability demands increase, greater amounts of processing time or multiple server blades can be leveraged for a given customer's traffic. When virtualization technology is used on the application servers, as a failure occurs, virtual machines can be migrated to alternative server blades and the network devices can dynamically re-route traffic to the new customer processing location. As more customers are provisioned to the system, the traffic can be selected based upon newly provisioned policies to be sent to the appropriate processing element. Leveraging the ability to identify traffic as belonging to a customer at the application layer and performing modification of the packets within the chassis to provide internal BladeCenter address translation, applications can be deployed without unique tailoring for each customer beyond what they wish to configure. This mechanism provides for mobility, fault tolerance and resiliency as well as scalability.

As was described above, the DPI blade, provides multi-gigabit, multi-function, programmable, deep packet inspection. Inspecting, processing, and modifying packet contents at high speeds without noticeable latency provides capabilities for handling application layer threats, and the text-based protocols of Voice, Video and Data services. Coupled with packet operations scripting language, the DPI blade enables network operators to deploy traffic treatment algorithms of their own design allowing them to differentiate service offerings, or develop classified solutions for protecting national infrastructures. These capabilities further enable content monitoring and control, and security applications to be performed on even small packet sizes, and enable entirely new classes of applications and services.

The DPI blade, having one or more DPPM's, may scale in clusters as well as individual systems processing from 2 Gbps up to 5 Gbps per DPPM, and offer, for example, 10/100 Ethernet, Gigabit Ethernet and OC-3/12/OC-48 SONET/SDH interfaces. 10 Gbps Interfaces and enhanced clustering capabilities (referred to as Traffic Control System in this document) may be further provided to enable scalable processing in the 10's of Gigabits per second ranges without change to existing applications. Future processor sub-systems may increase the layer 7 processing ability in similar form factors.

As described above, the DPPM is architected to feed input rates up to 10 Gbps to Packet Buffer Memory for content analysis. Analysis occurs in place (a zero copy architecture) based upon flexible logic (RAVE™ code) provisioned to the system that leverages content analysis functions to assess and maintain state information in a relational database implemented in silicon (Silicon Database). The system can operate at a packet level as well as session level with stream re-assembly capabilities (Stream Processing Accelerator) in the data plane.

In one embodiment, the DPPM includes, for example, a combination of Network Processors (Intel IXP28xx or Netronome NFP 32xx manufactured by Netronome Inc., Cranberry Twp, Pa.), CloudShield Processors (Xilinx Virtex II Pro, Virtex 5 or Virtex 6 FPGAs), Content Processors (IDT PAX.Port 2500 or LSI T1000 processor manufactured by LSI Corp., located in Milpitas, Calif.), Silicon Database Memory (Netlogic 18 Mb T-CAM, 512 MB DRAM) plus Stream and Packet Memory (768 MB RDRAM). In addition a slew of support chips such as Intel Framers, Health Management & SONET Overhead Controllers (FPGA/CPLD), General Purpose Memory (QDRSRAM, ZBTSRAM) and Management Network GigE Switches among other devices are utilized to create the motherboard for a network content processing architecture. An operating system software, such as the CloudShield Packet Operating System ("CPOS™"), may be provided, such as a run-time operating system that orchestrates DPPM platform data plane resources to perform the packet operations (packet read, table lookup, string search, variable update, packet capture, packet write, etc.) called within applications, such as RAVE™ applications.

With respect to operations, there are at least two aspects of a DPPM, such as the adapter 800 described above, which may be considered. First is the streaming side of the device which includes the data path of packets in and out of the DPPM as well as to content processors and packet storage areas. In one embodiment, these pathways may be designed using 12.8 Gbps bus technology (SPI-4.2) to move traffic from network interfaces in and to a packet buffer storage. These packet buffers may use three RDRAM banks each operating at 12.8 Gbps as a single large striped memory array. On top of this high speed foundation is overlayed the network intelligence. Network intelligence may come in several flavors to map to the types of processing required. At the baseline, there is layer 2 through 7 packet dissection, checksum validation & recalculation and switching which occurs at bus rates (packet analysis at >10 Gbps all packet sizes). The second layer is packet buffering and delivery to content analysis engines. Stream buffers (where multiple packets can be assembled into an application layer message) reside in the RDRAM as well and are able to maintain storage of packets, copying of packets to and from stream buffers plus transmission external at line rate. In addition, unstructured content analysis (e.g. POSIX Regular Expression Analysis—REGEX) is done by streaming selected data from packet or stream buffers to pattern analysis engines accessible on the SPI-4.2 bus. REGEX is able to sustain between 4 and 5 Gbps per blade with custom response processor removing the overhead of return traffic on the SPI-4.2 bus. The usage of these of these buses and access rates per packet is controlled by the application. The last level of processing is the logical application processing. Systems may be currently tuned for a balance of processing and analysis such that a sustained 2 to 4 Gbps is generally achieved in the layer 7 analysis by combining algorithms and application logic, unstructured content analysis, state management and statistics storage. RAVE™ is one example of a network processing language, developed by CloudShield Technologies, Inc., designed for developing applications (or policies) that operate in the data plane. It is abstracted from the hardware, however, tuned for high speed content analysis. Generally engines are developed in RAVE™ with data driven user based provisioning of features coming from out of band OSS systems.

The disclosed embodiments may be used for extreme processing cases where every packet is interrogated at layer 7. This generally includes inspection, analysis and manipulation. This has focused processing around driving all traffic to deep packet processing logic developed in RAVE™ with tuning to maximize the amount of packets processed per blade at layer 7.

In 10 Gbps market scenarios where a given network interface is 10 Gbps and possibly heavily utilized, processing can become difficult to achieve without negatively impacting the network. In this environment, it becomes important that a system can analyze all traffic at wire speed, for example, categorizing the traffic into one of three buckets, namely traffic not of interest, traffic that may be of interest and traffic known to require specific processing. Traffic not of interest can be redirected (directly or indirectly switched), traffic potentially of interest can be passed along for further layer 2 through 7 analysis in a RAVE™ subsystem of a DPPM and traffic known to be of interest can be processed on a DPPM or other device (such as a server blade) awaiting the traffic. Of importance in this scenario is to make sure that traffic can be directed at each level in accordance with the processing ability of the next stage of processing.

In one embodiment, flow control may be implemented using a RAVE™ application. Upon ingress of packets to the RAVE™ flow control application, the application analyzes the traffic for customer identification and determination of interest in the flow, identifies services to apply and performs header storage and transformation, and tabulates billing metrics and services tracking data for reporting systems. Coordination of re-routing for failover situations may also be implemented.

The packets then may be routed to the application server via a fabric interface controller which may remove or envelope internal headers and transmit traffic onto the appropriate 10 GbE backplane switch fabric. Once the application servers finish processing, the packets may be received therefrom via the fabric interface controller which receives traffic from the 10 GbE backplane switch fabric interface, inspects the traffic and sends it to the appropriate next destination.

Traffic may then egress the Rave™ flow control application whereby the application restores the customer's packet headers and frees storage as appropriate, analyzes custom packets for table management and generates and maintains per-subscriber and per-service Billing/Reporting counters.

Figure 10:
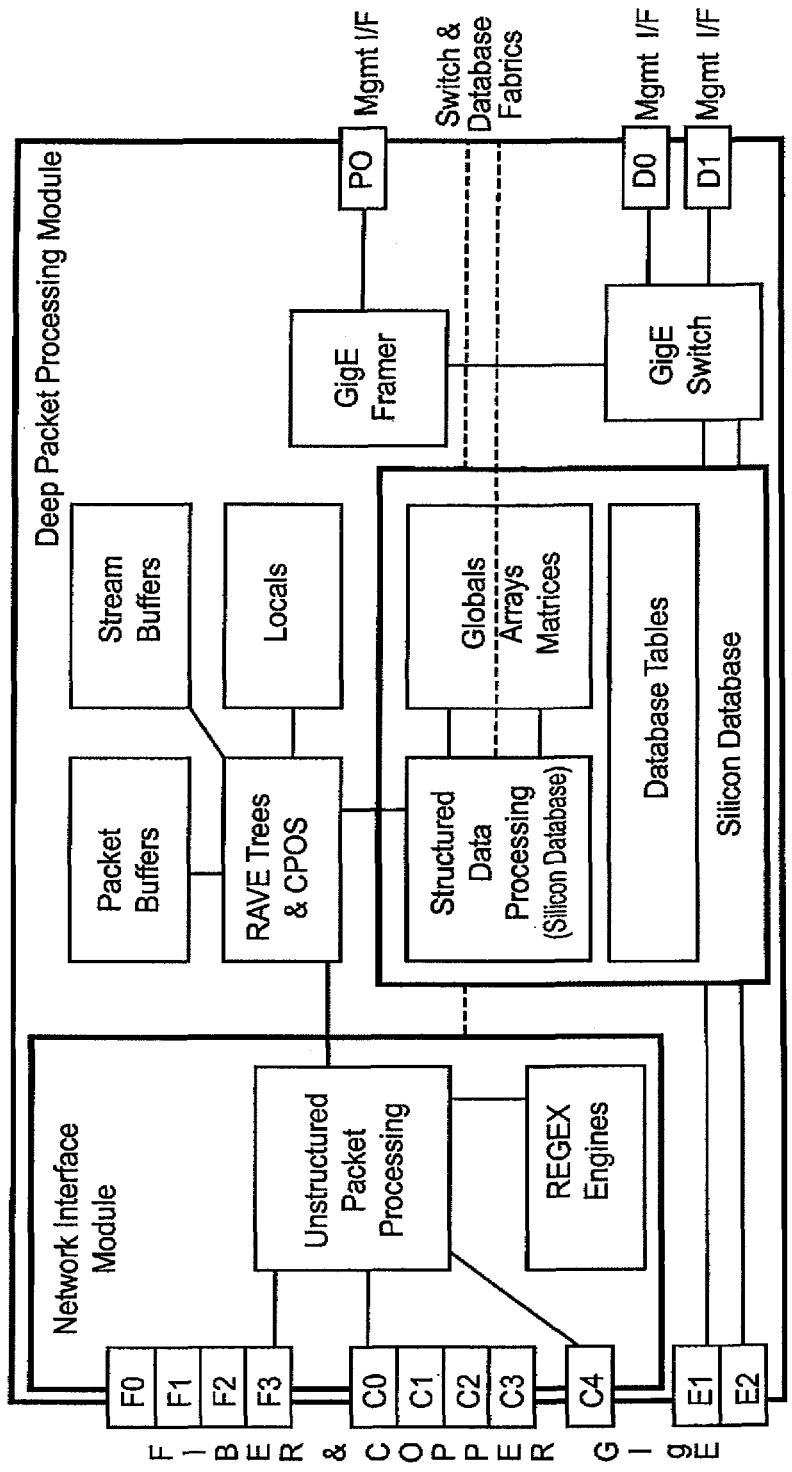
FIGS. 10 and 11 depict the logical and physical implementation of a deep packet processing module according to one embodiment.
Figure 11:
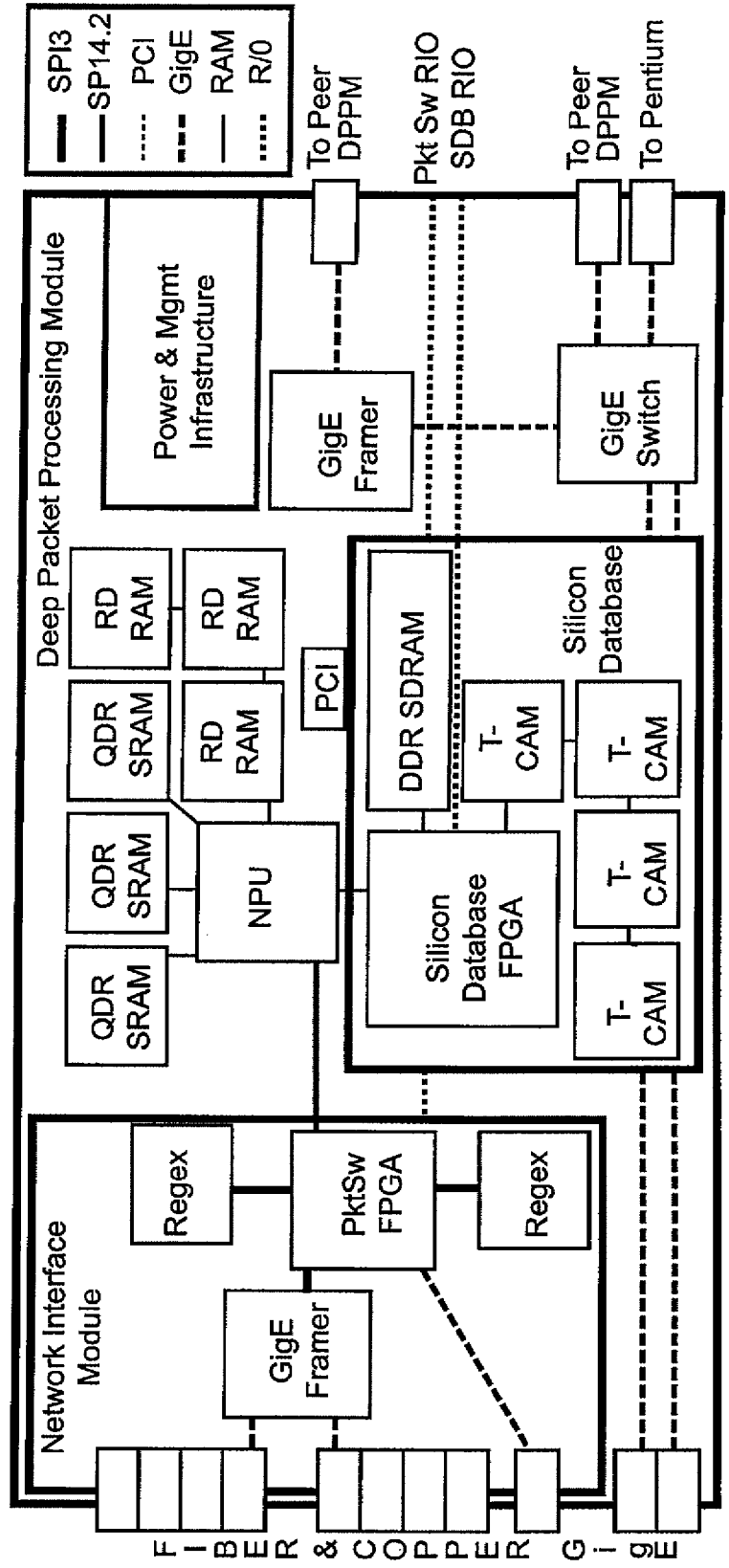

Solution deployments come down to picking the appropriate traffic to process at layer 7 within the device. FIGS. 10 and 11 show the logical and physical breakout of an exemplary Gigabit Ethernet DPPM. In this standard configuration, the focus is to bring all traffic from the interfaces (up to 5 GigE) into Packet Buffers and then apply layer 2 through 7 processing. The exemplary DPPM, performing wirespeed 10 Gbps layer 2 through 7 classifications, may be capable of making decisions on which traffic to send locally for processing, distribute to other DPPMs for processing or pass directly on to an alternate processing devices. In the exemplary 10 Gbps DPPM design, a line rate Traffic Control System is integrated into the Network Interface Module allowing full 10 Gbps classification to occur and appropriately determine and direct where to process. This enables either direct load balancing to external devices (optically or via fabric), content based routing and selective application layer processing within a 10 Gbps stream and clustering of layer 2 through 7 processing for intensive applications where both data rate and number of applications must be scaled. Line rate 10 Gbps is able to be sustained and scaling of processing is separated from network rate and content distribution within the traffic streams, assuming that at some point more applications will be applied to a given stream than can be processed within a single resource module thereby requiring scalability and clustering.

Figure 12:
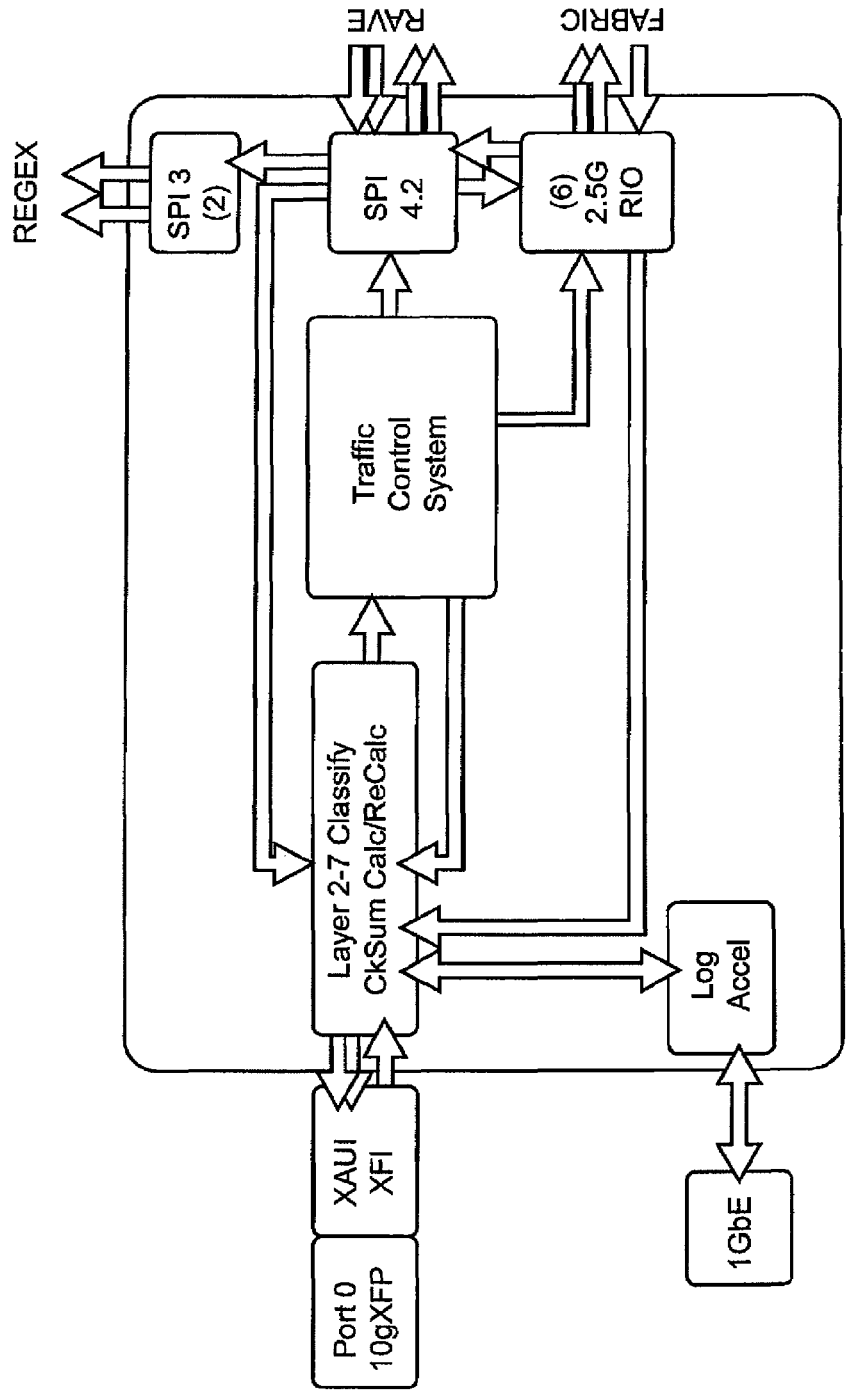
FIGS. 12 and 13 depict a logical architecture of an exemplary traffic control system according to one embodiment.
Figure 13:
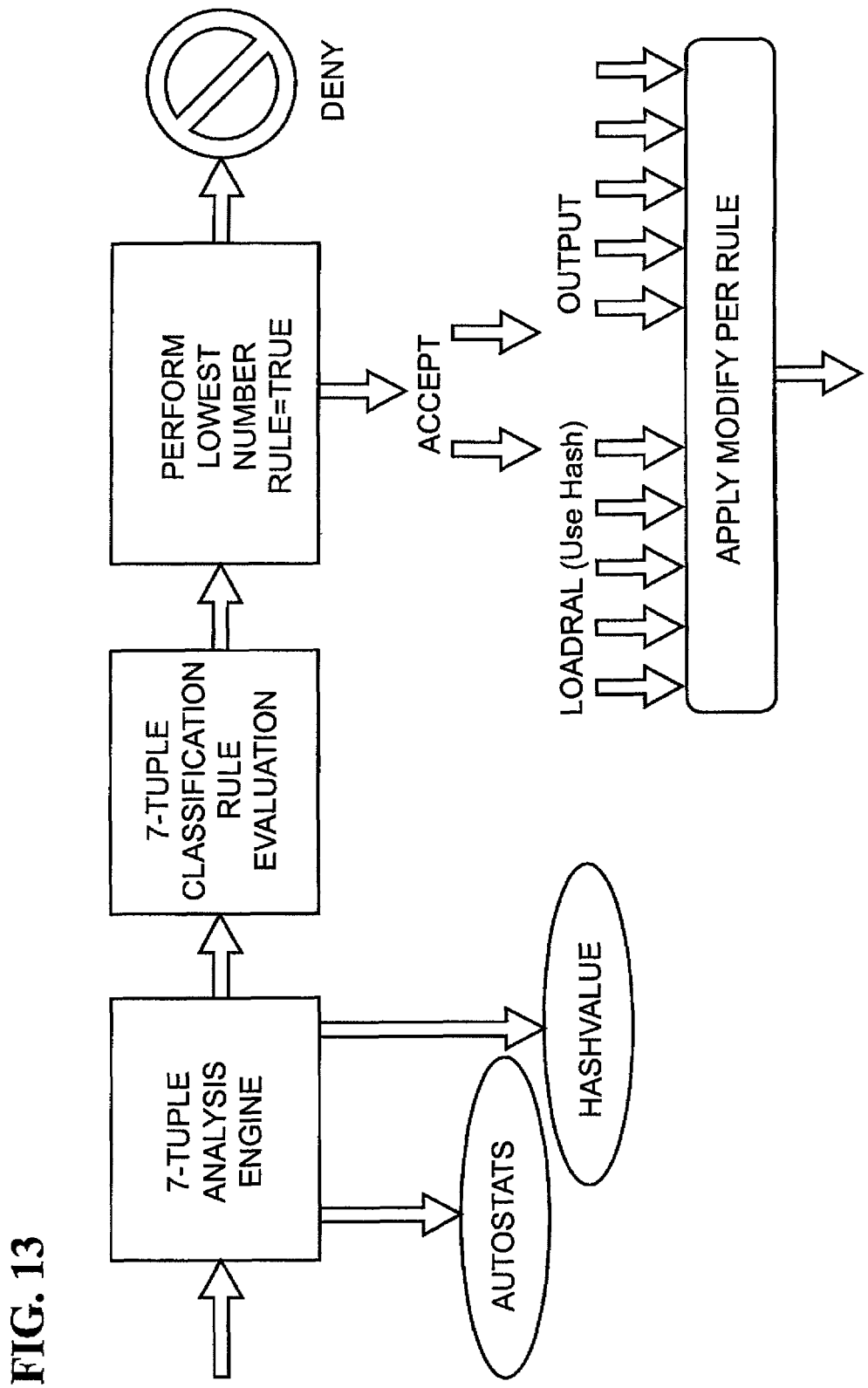

FIGS. 12 and 13 show the logical architecture of an exemplary Traffic Control System integrated with the 10 Gbps Network Interface Module (NIM) of the exemplary DPPM 800. A single 10 GbE XFP plus a single RJ-45 GbE interface comes into the DPPM to the device. In both cases the Framer is instantiated within the Virtex II Pro FPGA. The Layer 2 through 7 classification and checksum management system remains as implemented in other disclosed Gigabit Ethernet DPPM modules operating at 10 Gbps input and output. FIG. 13 shows the logical architecture of the Traffic Control System (TCS). The TCS analyzes the 7-tuple described later in the appendices. Important to note is that since some traffic may not go to the local RAVE™ processing subsystem, the layer 2 through 4 traffic statistics are tracked within the TCS and forwarded to the Silicon Database automatically by the system. Traffic analysis can result in filtering, switching as well as layer 2 re-writing for indirect switching. Locally the TCS may direct traffic to the local 10G or 1G interface, local RAVE™ processor or destinations across the Fabric interface which may be a remote RAVE™ processor or any physical or Ethernet destination remote to the Fabric. In a CS-2000 with (2) DPPM blades the fabric connects each DPPM direct to the peer DPPM. In an IBM BladeCenter implementation, a fabric switch on the DPPM may be implemented that ties to the DPPM Rocket IO interfaces, as shown FIGS. 12 and 13, and to the (4) 10 GbE interfaces on the backplane.

Figure 14:
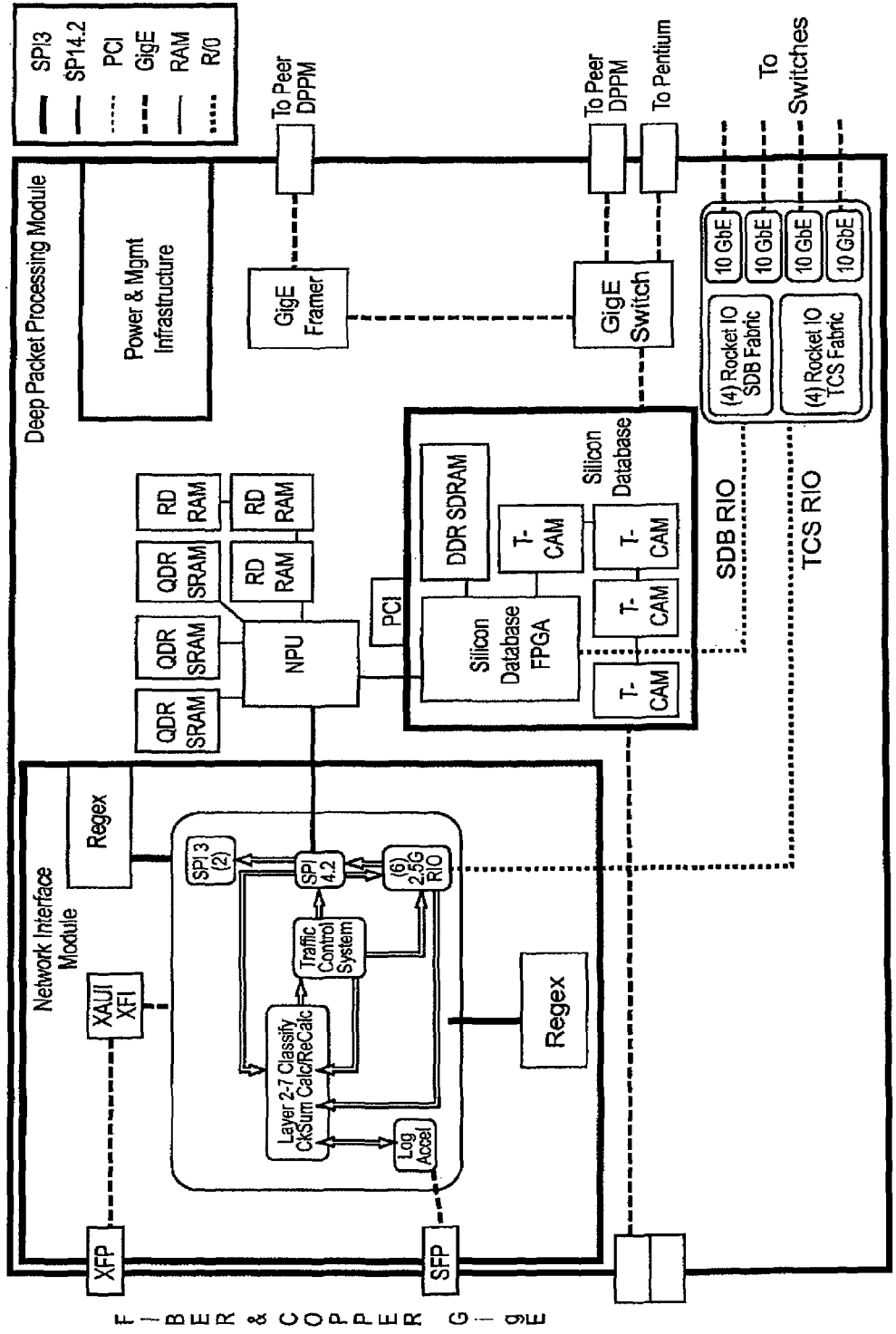
FIG. 14 depicts a representation of one embodiment of a packet analyzer/adapter implemented for use with a blade enclosure.

FIG. 14 shows a block diagram of the IBM BladeCenter variant of the exemplary DPPM. In one embodiment, the DPPM will be integrated within the IBM BladeCenter chassis as a processor blade, fitting into the same slots where blade servers will occupy. DPPM's shall be interchangeable with blade servers fitting in any of the 14 slots on an H chassis or 12 slots on an HT chassis. The functionality of CloudShield CS-2000's application server module ("ASM") may be ported to operate on an existing IBM blade server. The hardware management functionality built onto ASM and DPPM blades may be integrated with the existing IBM BladeCenter chassis management systems such that DPPMs can be managed as if they were a blade server for traditional information and via IBM's IPMI interfaces for DPPM specific information. The DPPM blades will have one XFP based 10 GbE interface and on RJ-45 GigE interface on the front faceplate. Standard Gigabit Ethernet pathways will be used internally for management and high speed 10 GbE interfaces internally will be used for fabrics interconnect. There may be four high speed fabric interfaces on the backplane of a blade. There may be up to four high speed switches able to be inserted into the chassis. The intent is that traffic will come into a DPPM and initially be processed at 10 Gbps by the Traffic Control System. Packets may immediately exit the chassis or be directed either to other DPPM blades or blade servers. To separate data plane processing from server processing, high speed switch fabrics may be separated between those that are used to interconnect the DPPMs and those that are used to connect the DPPMs to the blade servers. This architecture may remove traffic not being processed from the chassis from the high speed switch as well as provide secure separation of network processing from application layer processing since a CloudShield DPPM could be the bridge between two high speed switching domains.

In one embodiment, a CloudShield DPPM may be embedded within the IBM BladeCenter with 10 Gigabit Ethernet switch fabric connectivity built into the BladeCenter.

The CloudShield DPPM is connected to the ingress and egress interfaces for the network and may be responsible for processing all network traffic arriving or leaving the chassis to and from the service provider network. An application, written in CloudShield's in-networking computing data plane programming language, known as "RAVE™," may be responsible for determining the customer and directing the traffic to the application server(s) using network layer modifications, generally comprising Layer 2 and Layer 3 Ethernet.

As was described above, application software may be loaded onto blades servers such that they can operate as applications server that provide revenue bearing services on behalf of a service provider's customer, such as antivirus services, anti-spam services, intrusion protection services, etc. This software may be of an enterprise application type which takes over an entire blade and has no notion of customers, or may be one that stores a different policy per customer. In some cases this software may be transparently bridging network interfaces of the blade server while other software may act as gateways or responding targets on a single interface. Furthermore, tools such as VMWare may be loaded on these application servers such that different services or different instances per customer may be loaded in each virtual machine ("VM").

An example implementation of the architecture may leverage the VMWare ESX Server provisioned onto a blade server. For example, the application may perform Malicious Packet Scrubbing with a tool such as SNORT using its inline functionality. 10 Virtual Machines may be configured on a blade server, each with their own unique MAC ID on assigned to each VM for each interface (Eth0 and Eth1 which are 10 Gbps NIC interfaces). Services may be provisioned based on classifications of customers as gold, silver or bronze, reflecting the level of service to which a customer has subscribed or is otherwise being provided. Virtual Machine #1 is assigned to Gold Customers where 5,000 signatures are loaded into a system that at 100% processor load sustains 200 Mbps at an Internet Traffic Mix. Virtual Machine #2 contains a reduced rule set, 1,000 signatures, for Silver Customers where 100% processor load sustains 500 Mbps at an Internet Traffic Mix. Virtual Machine #3 would be setup for Bronze Customers with 100 signatures looking for the top "in the wild" exploits of interest to home users. At 100% processor load, this mix maintains 800 Mbps with an Internet Traffic Mix. The remaining 7 Virtual Machines may be assigned to business customers with dedicated packet scrubbing. The intent would be to service T-1/E-1 customers (1.5 Mbps service) with extensive rule sets, similar to a Gold Service but with personalized rule sets. At 100% load each of these would be presumed to have similar to Gold Service performance at 200 Mbps with an Internet Traffic Mix. At 5% CPU for each Platinum VM, they should sustain bursts to 10 Mbps, while occupying 35% of total CPU time. The remaining three services might each get 20% CPU providing Gold with 40 Mbps for sale, Silver with 100 Mbps for sale and Bronze with 160 Mbps for sale. Separate from oversubscription, using bandwidth rates this can be equated to customers served and % of an application server and software to identify pricing. This may also be used to measure when load becomes too high.

The VMWare based configuration allows the network processing blades to direct traffic using Ethernet Address (MAC ID) to the physical server blade. Should the virtual machine need to be re-hosted on another blade for performance or availability reasons, traffic redirection can seamlessly migrate as it would be seen as a simple layer 2 switching re-route. Given a static configuration of rules, as in the Bronze, Silver and Gold exemplary embodiment, subscribers would see no loss due to such migration and potentially could be applied to another already running backup without waiting for a switch-over at the VMWare level.

In one embodiment, the DPPM with 10 Gigabit Ethernet Interfaces may act as a line card, interfacing the telecommunication lines coming from the subscribers (such as copper wire or optical fibers) to the rest of the carrier's access network. In this embodiment, the ingress to the BladeCenter may be connected to an upstream router facing the Internet which carries traffic that has not yet been processed.

In a simple implementation, a server blade may be configured to receive traffic using layer 2 delivery and may respond back to the requesting Layer 2 device with the resultant data after processing. In this method, a service may require only one backplane port, may live within a single switch domain and may easily scale to 2 ports and switches for redundancy. This model may require modification of applications, however, a dual 10 Gbps NIC enables an application server to have a primary and secondary should a switch fail. Traffic of interest flows into the DPPM and is inspected to determine which subset requires processing. Traffic not of interest may be immediately sent out of the chassis while traffic to process is sent to the appropriate blade server. The blade server will receive the traffic and, if virtual machine technology is in use, the traffic may be analyzed by the virtual machine to direct it to the virtual interface with the configured soft MAC address of the particular application running thereon. The application will process the traffic according to the service being provided. If, according to the service, the traffic, or a subset thereof, is to be allowed to continue to a destination or over the network, the traffic is provided back to a DPPM. The receiving DPPM will then adapt the traffic to make it appropriate to place back into the service provider network.

Figure 15:
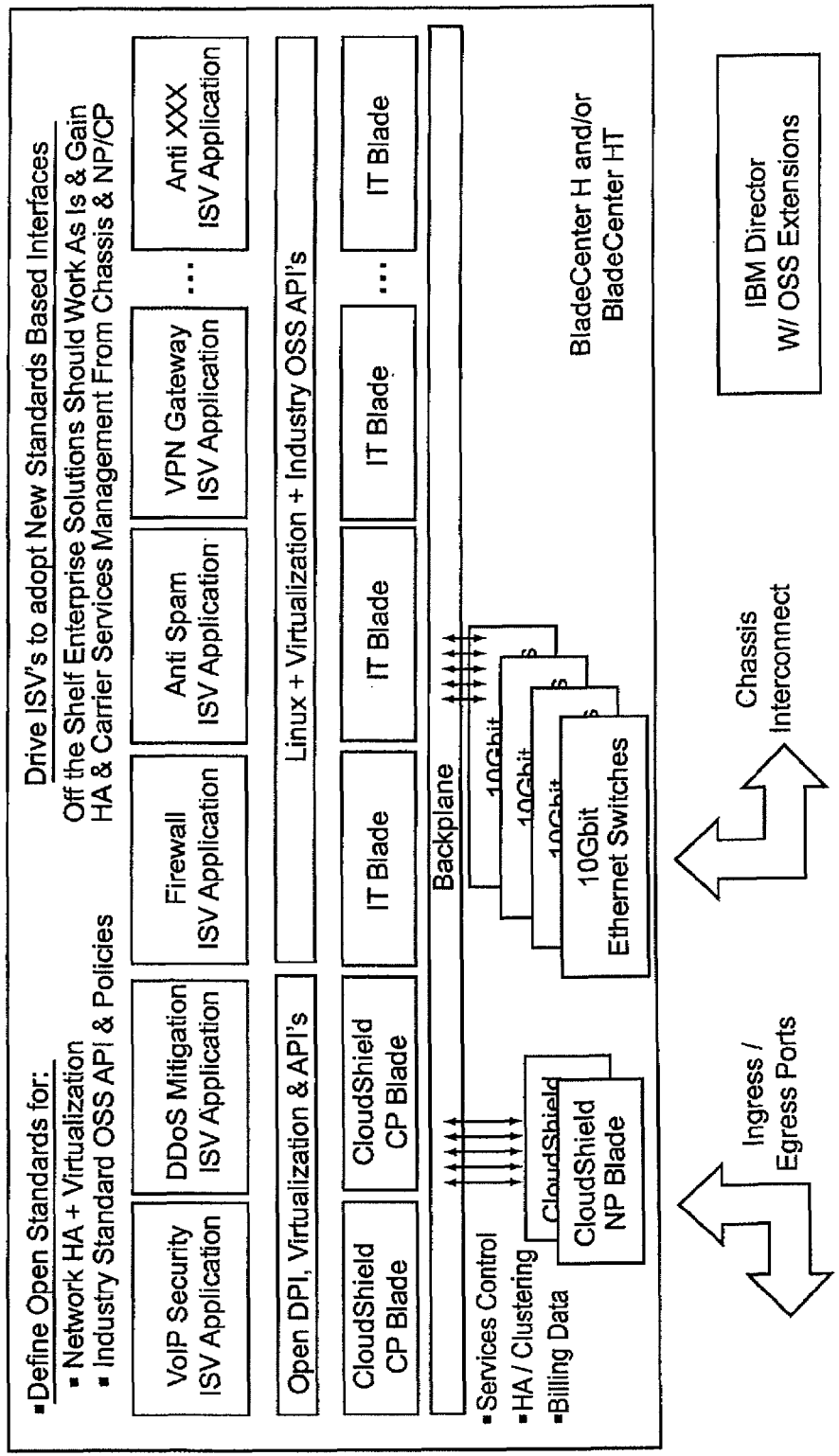
FIG. 15 depicts another representation of a blade implementation of the packet analyzer/adapter according to one embodiment.

FIG. 15 shows a solutions oriented view of the IBM BladeCenter according to one embodiment. Along the bottom are the primary interface blades to the chassis, namely the CloudShield DPPM acting as an NP Blade and one or more Blade Network Technologies (BNT) 10 Gigabit Ethernet Switch Modules. The transport links connected to the service provider may tie into the NP Blades while chassis to chassis interconnect may tie into the BNT Switches. In the figure, a green horizontal bar represents the backplane and the logical separation of CloudShield blades and Server blades provide application level support. In this role, CloudShield DPPM blades may be referred to as Content Processors while the IBM BladeCenter server blades (e.g. HS21 IT Blade) are running Application Servers. As part of the role of an open platform, API's for CP blades and IT blades are identified and may include the RAVE™ migration to PacketC and Cloudshield's Northbound application program interfaces ("APIs") such as SSH and Web Services. This embodiment may be deployed into regional or metropolitan aggregation nodes, e.g. metro-nodes, where high bandwidth ingest and processing may be required.

In one embodiment, 10 Gigabit Ethernet may be the basis for connectivity of the solution. Internal to the chassis, short point to point signaling may be used while chassis to chassis signaling may utilize fiber based connectivity with features such as link aggregation becoming important on a switch to switch link. Internally and between chassis, virtual local area network ("VLAN") tags of multiple varieties may be added to the packets and the switches should ensure that they operate in L2 switching mode, not performing any specific operations based upon higher layer packet constructs such as VLANs. Static MAC to interface addressing must be supported in the switches. Externally, the ingress and egress traffic may have VLAN tags, 802.1q in q, multiprotocol label switching ("MPLS"), point to point protocol over Ethernet ("PPPoE") and non-IP traffic signaling between routers that must be understood and preserved such that no link issues occur.

In some embodiments, a router may be north and south of the transport interfaces to a cabinet. Further, primary and secondary interfaces to the routers may be provided for redundancy. Considering a single 10 Gigabit pathway, with upstream and downstream connectivity, that brings (4) 10 Gigabit Interfaces to the system that must be monitored for that circuit. Redundant DPPM pairs may be utilized for the primary/secondary fiber pathways in an active/active mode such that with 4 interfaces only 4 blades are required and should any link fail the traffic can adapt to the other pathways. Internally, high speed switch fabrics will be able to hand-off traffic between NP blades. In one implementation, 2 BNT Switches may be leveraged for customer application servers while another 2 BNT Switches may be leveraged for Inter-NP Blade traffic. Customer traffic asymmetry should be considered. Given that application solutions, such as Firewalls, are being introduced as a service, if traffic appears upstream on one given set of NP blades and the response downstream appears in a different chassis in the cabinet, that upstream and downstream traffic may have to be coordinated to arrive at the appropriate application server so that the firewall application sees the expected bidirectional traffic stream. In addition, depending on a provider's core network, upstream and downstream traffic may be divided among metro nodes.

As traffic rates increase, e.g. the percentage of traffic desiring value added services and number of available services, the disclosed embodiments should be able to gracefully scale to tens of 10 Gigabit circuits with a hundred thousand customers and dozens of available services in a given metro node.

Service Traffic Manipulation refers to the re-writing of traffic in order to transform it from the service provider network form ("SPNF") to the internal application server form ("IASF"). Note that there may be many forms in which traffic will arrive at the chassis (MPLS, VLAN, Q in Q, PPPoE, etc.) and those protocols may have no relationship with how an application server may expect to have traffic delivered to it. For example, enterprise class applications or application servers may expect to receive traffic formatted in standard enterprise class protocols, such as Ethernet, as opposed to the protocols used by carriers. The modification of traffic from SPNF to IASF and back to SPNF may be a critical role of the NP Blade. In addition, there may be multiple services applied to a packet for which the NP Blade may need to do multiple IASF to IASF manipulations based upon the application servers requirements for a given service.

Figure 16:
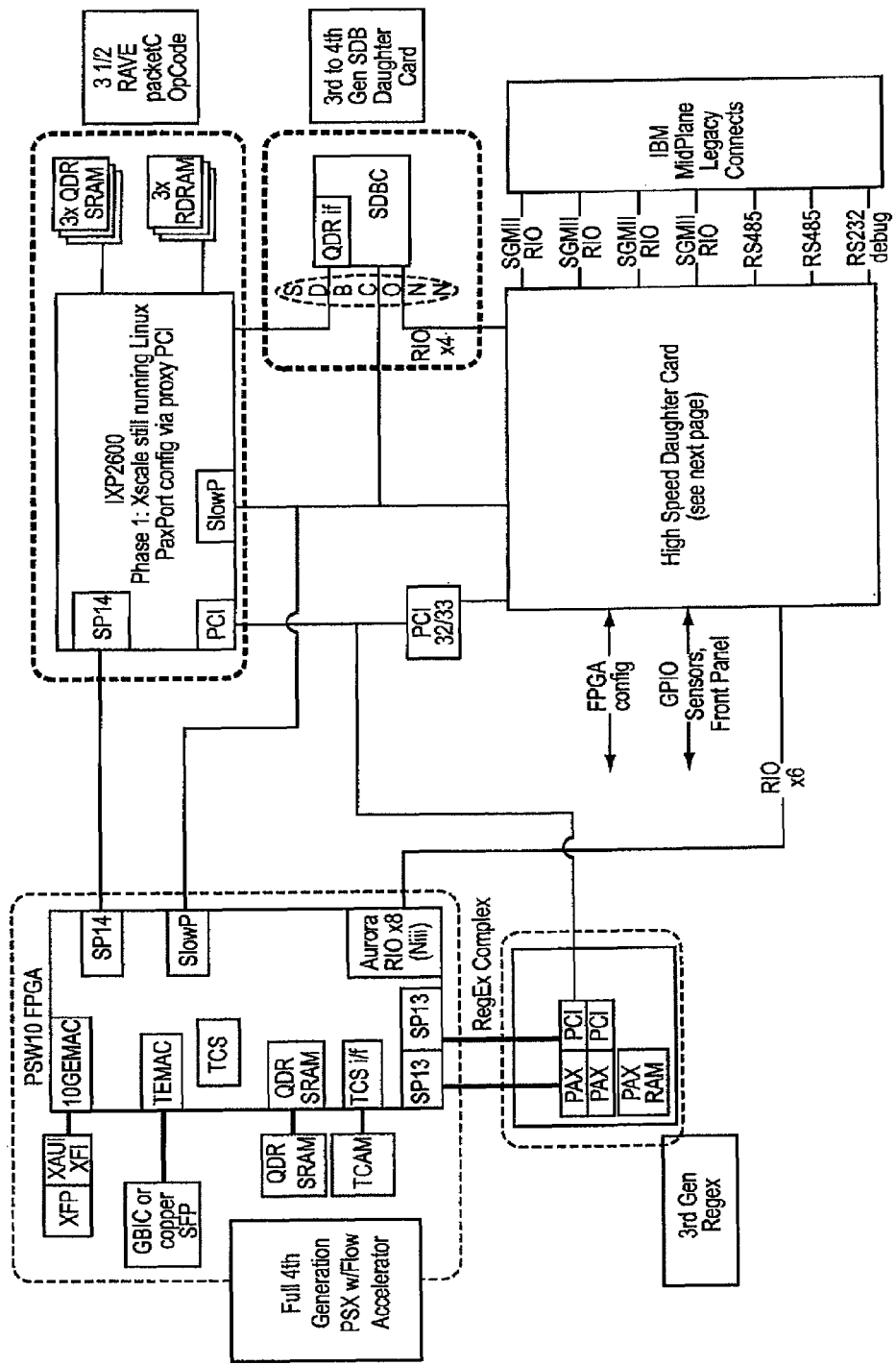
FIG. 16 depicts another representation of a blade implementation of the packet analyzer/adapter according to one embodiment.

FIG. 16 shows a block diagram of one embodiment of the DPPM base card for the IBM BladeCenter. In this embodiment, the network interface module ("NIM") is condensed onto the base board and there is a ternary content addressable memory ("TCAM") added to the content switching system ("PSX") to support the migration from traffic control system ("TCS") to the flow acceleration subsystem ("FAST"). The silicon database ("SDB") may be implemented as a daughter card as shown along the right edge of the figure. Support logic, such as PCI Bridge, Dual GigE MAC, CMX and other elements have either been removed or integrated into the High Speed Daughter Card ("HSDC"), shown in FIG. 17 and described in more detail below. Rocket IO signaling from the SDB and PSX communicate with the HSDC. The FAST indentifies bulk traffic not identified for the provisioning of services by leveraging customer identification lookups in a content addressable memory and user based routing in the chassis. A page index table ("PIT") indicates which action set is to be executed for a given matched customer identity and a flow action table ("FAT") specifies the action and action modifiers. Rule actions include forwarding the packet to the network processing using ("NP"), forwarding the packet to a port with no modification, forwarding the packet to a port with header modification, such as DMAC/SMAC/other), or forwarding the packet to a port with VLAN header modification.

Figure 17A:
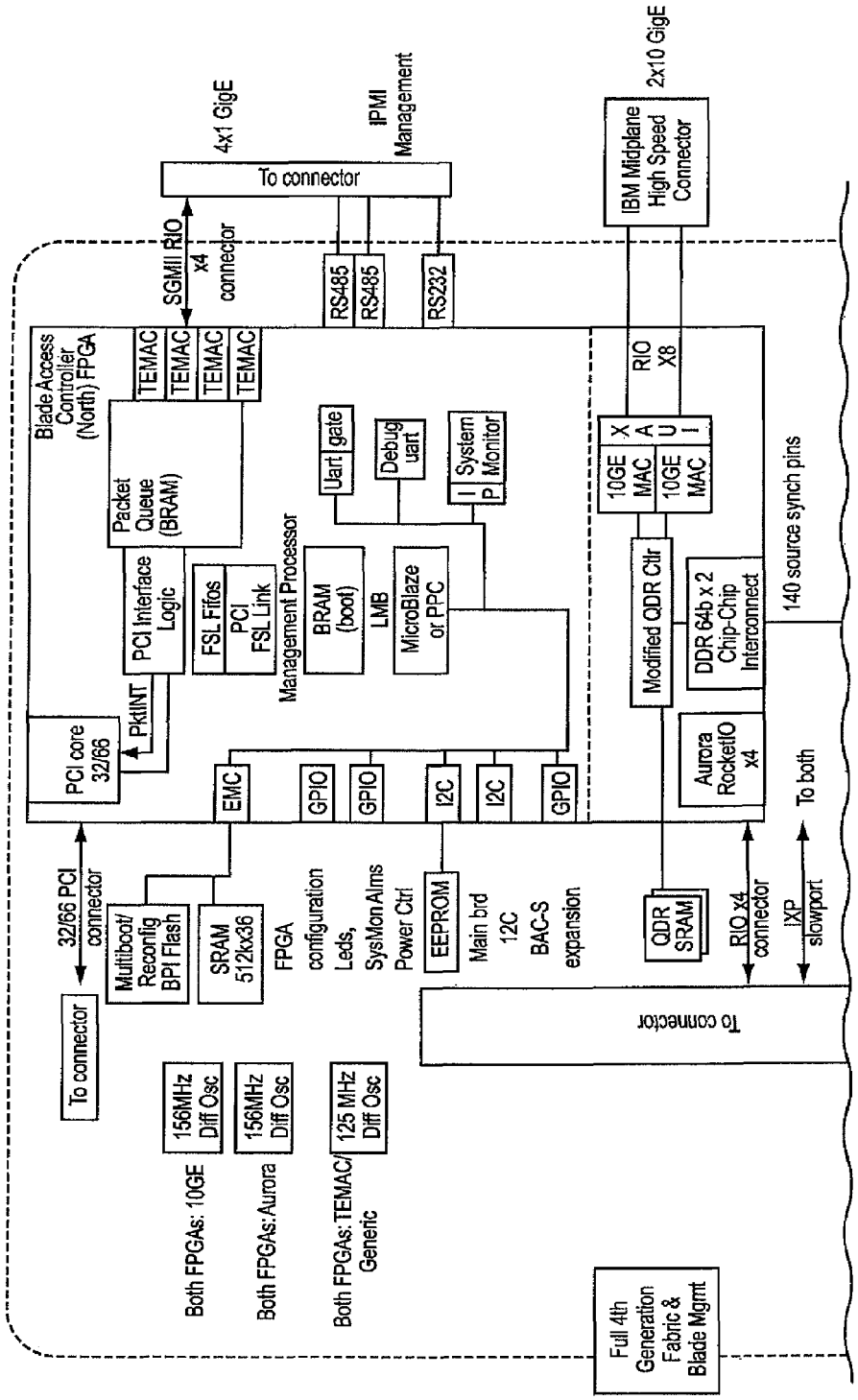
FIG. 17 depicts another representation of a blade implementation of the packet analyzer/adapter according to one embodiment.
Figure 17B:
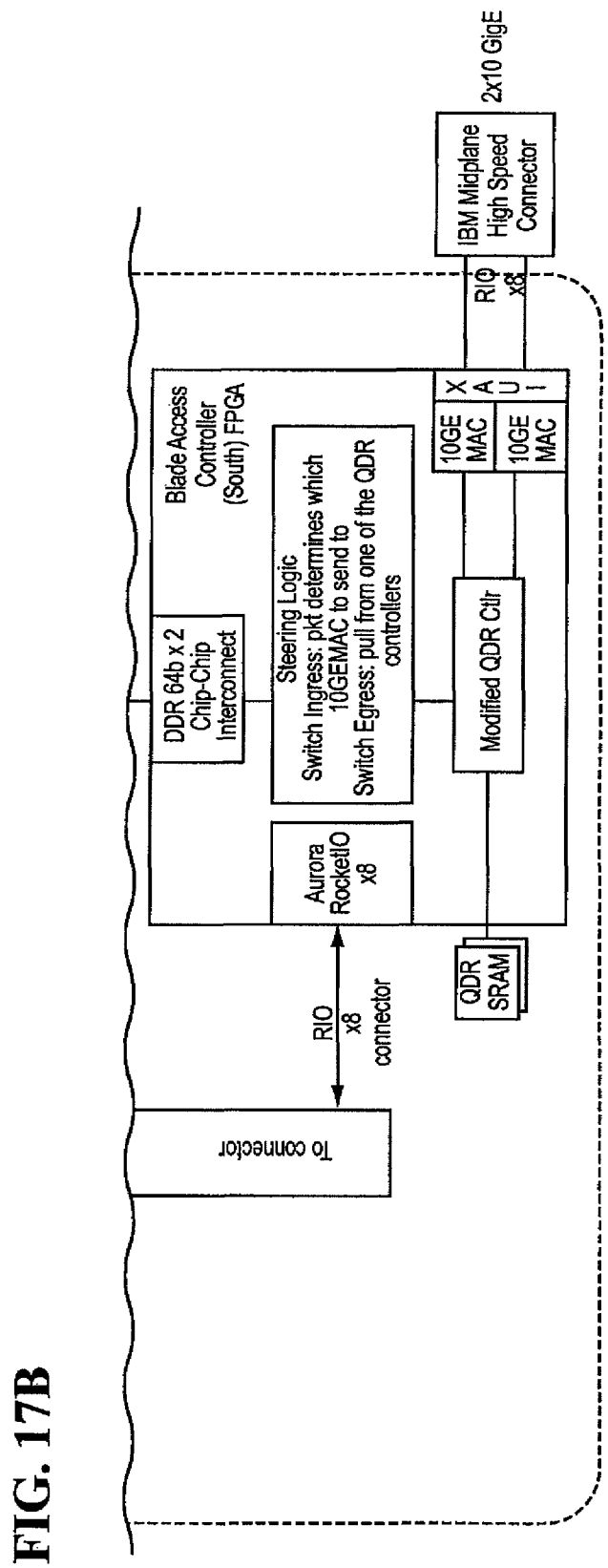

FIG. 17 shows a representation of one embodiment of the High Speed Daughter Card for use in the IBM BladeCenter. In this embodiment, the north chip (Blade Access Controller) is a Virtex 5T that embeds the PCI Bridge, GigE MACs and CMX into an intelligent platform management interface ("IPMI") based management controller. The IXP2805 or NFP-3200 communicates with this device using PCI, Slow Port and a diagnostics The Blade Access Controller ("BAC") and the Fabric Interface Controller (south chip, also Virtex 5T) each manage two of the 10 Gigabit Ethernet backplane interfaces along with Rocket IO support to the SDB and PSX. The BAC has 4 lanes to the SDB while the FIC has 8 lanes to the PSX. Each of these also has limited queuing ability for flow control using an associated QDR SRAM. There is also a high speed interconnect for packets that need to cross connect between the devices.

In one embodiment, the first action a Service Director must perform is inspecting all traffic to determine whether it is for a customer whom has paid for services. Any traffic which is not for a paying customer must be prioritized to egress immediately on the appropriate link. Depending on the service provider's network, determination of which packets are from a paying customer may be accomplished by multiple means, such as:
 IPv4 Address
 IPv6 Simple Address
 IPv6 Embedded Routing Address
 802.1q VLAN Tag
 802.1q in q Embedded Tag
 802.1q in q Combined Tags
 MPLS Label Stack Entry or Pseudo Wire
 PPPoE (PPPoEoE per Cisco/Juniper)

In one embodiment, traffic embedded in transport headers which is non-IP within the metro nodes may be considered to be not customer related as non-IP traffic should have not made it from the edge past routers to this point in the network. As such, all non-IP traffic may be considered not for customers and passed through the architecture. For a given deployment, the Service Provider Network Form (SPNF) should be consistent. In other words the format of traffic coming into the transport interfaces of the DPPM should be of one type from the list above and have only one identification mechanism for customers for a given Service Director blade, though the software may provide options in this regard.

Traffic received on the transport interfaces may be decoded and then the appropriate fields may be interrogated to determine whether the traffic is applicable to a customer and how it should be serviced. For example, if the identification method is IPv4 Address, the source and destination IP addresses will be read and a look up will be performed against the packet. Should a match be found, this may identify that the traffic is to be processed for a particular service. The appropriate action is read and the traffic is directed appropriately. These steps are performed within the FAST and the action may be to pass the packet on to the RAVE™ logic portion of the Services Director for applications.

IPv4 Customer Traffic Identification refers to a method of traffic identification whereby the packets arrive in standard Ethernet II form with IPv4 headers and the IP addresses are utilized to identify the customer. IPv4 traffic identification involves reading the source and destination IP addresses. Traffic flowing from the customer to the destination will utilize the source IP address. In the above described embodiments having dual DPPM's, one DPPM may be responsible for this identification practice. The other DPPM may be responsible for inspecting traffic returning from the destination to the customer and would utilize the destination IP address for identification.

Some networks, especially mobile networks and networks used in Asia, may require IPv6 addressing for identification of customers. IPv6 Simple Addresses refers to the condition where IPv6 is presented with a single header in the packets and the Source and Destination IP addresses can be utilized similar to IPv4 Customer Identification. Note that in IPv6 networks, the applicability of some applications as services may be limited or need further DPI processing in order to present them in a fashion that the application services blades can accept. This may include IPv4 to IPv6 gateways or more detailed flow proxies.

IPv6 Embedded Routing Address Customer Traffic Identification is a similar use case to the IPv6 Simple Address identification, however, in this case more complex routing headers are anticipated on the network and decoded to find a final destination which will be utilized.

Figure 18:
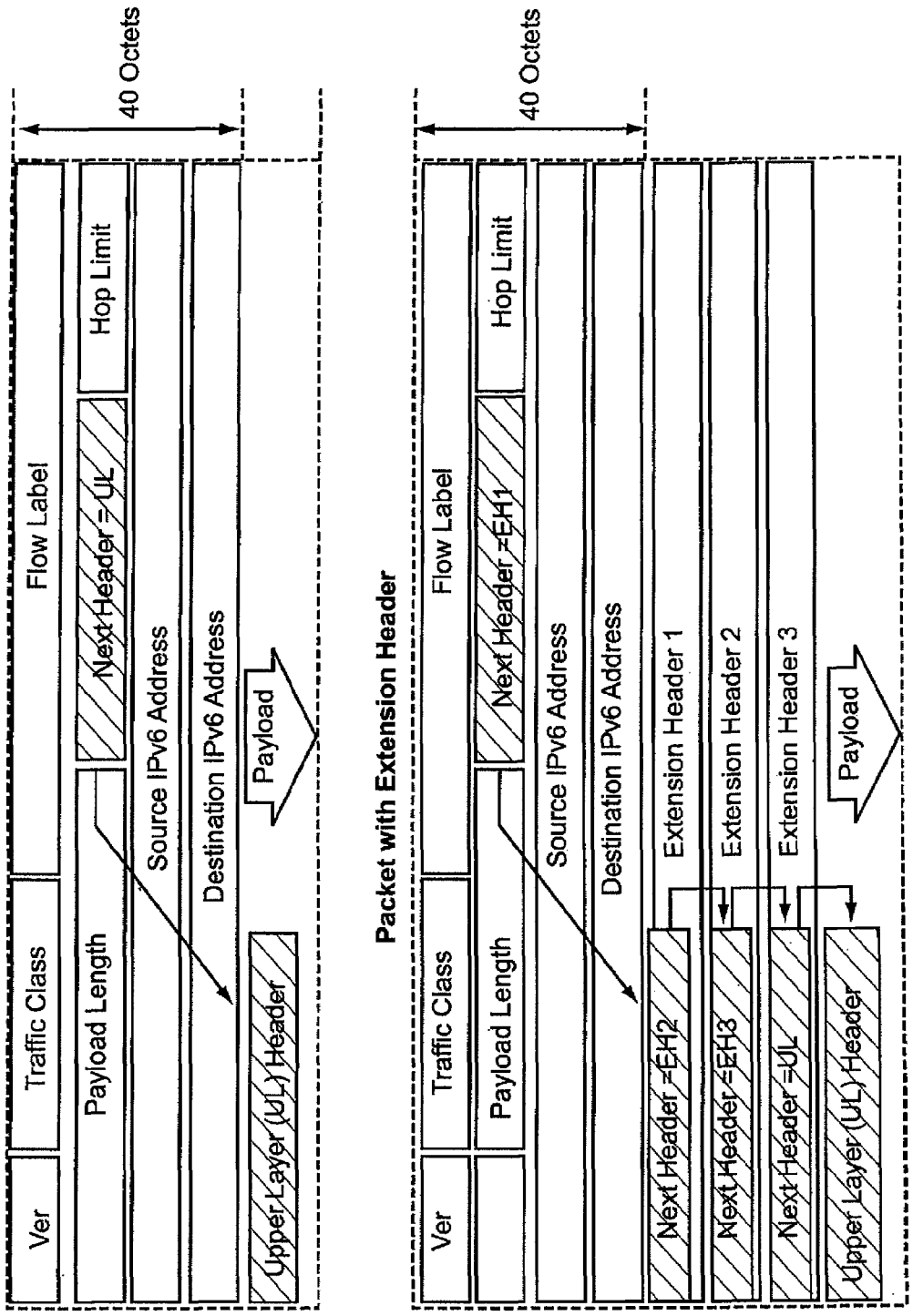
FIG. 18 depicts a logical representation of an IPv6 packet header for use with the disclosed embodiments.

FIG. 18 shows a logical representation of an IPv6 packet header with multiple headers and extension headers. In this method of customer identification, it may be the embedded (bottom) routing header that is required to be processed in order to find customer identity.

With respect to 802.1q VLAN Tag Customer Traffic Identification, some networks utilize VLAN tags within the Ethernet header to separate customer for private LAN service or for identification of the customer traffic at layer 2. Based upon deployment location, this may be seen as a one or two labels (Q in Q).

Figure 19:
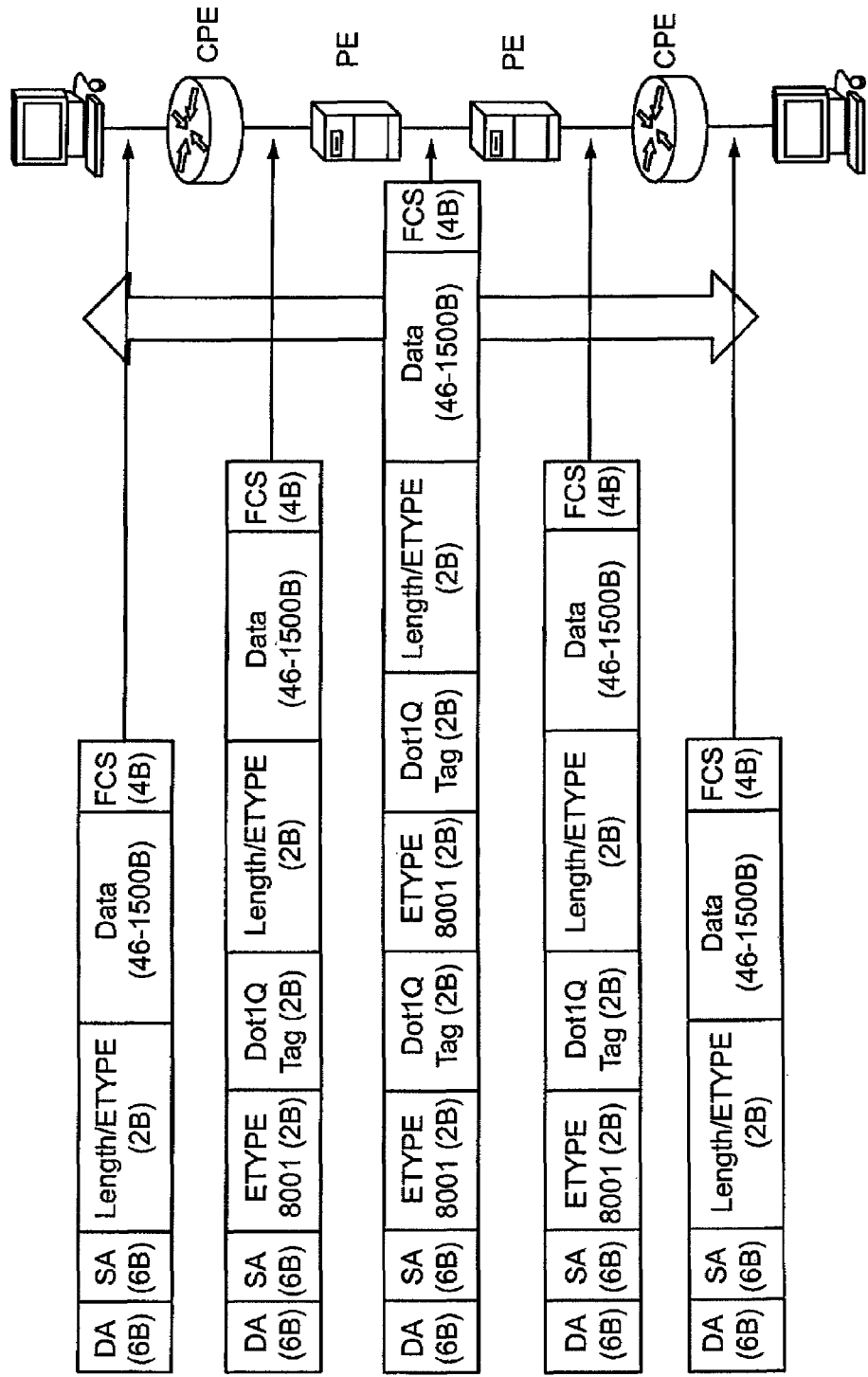
FIG. 19 depicts how the labels can be added to and removed from packets by routers as they flow through a network.

FIG. 19 shows how the labels can be added and removed as they flow through the network by the routers. The 802.1q VLAN Tag Customer Identification works by inspecting the case where a single VLAN Tag (present when EtherType=0x8001) is present. There can be 4096 unique values (12 bits within the 2 bytes following the EtherType) of which 0 is generally no tag used for 802.1p prioritization only yielding at most 4095 customers.

802.1q in q Embedded Tag Customer Traffic Identification is similar to the previous section, however, two tags are present and the inner tag is utilized rather than the outer/first tag.

With respect to 802.1q in q Combined Tags Customer Traffic Identification, when two tags are present, this is referred to as 802.1q in q (Q-in-Q). As the two tags together offer over 16 million possible combinations, this is often utilized to identify a unique customer as it moves into the metro from the access circuits. This mechanism involves reading the 2 tags (24 bits in total) and leveraging them for determining the customer and the appropriate services to apply. The form is shown in the diagram in the previous section.

MPLS Label Stack Entry Customer Traffic Identification leverages the MPLS label stack as the targeting and identification means of the customer. The entries within the label stack identify the customer for whom processing should be applied. One or more headers are present in order to enable the MPLS Label Switch Routers (LSR) to determine the next hop in a simple review of the labels.

From inspecting the labels, a destination can be identified that may be a useful method for some business customers to be identified for services. Other techniques may simply be focused on a method such as IPv4 identification but must work around the presence of MPLS based Psuedo-wires properly removing and re-applying.

PPPoE Customer Traffic Identification refers to the framing on the Ethernet to be PPP as a point to point transfer pathway while IP headers and content ride above this layer. This is generally found closer to the access point, however, this may be present in the traffic being analyzed for customer identification. Generally, PPP will not be utilized as a mechanism for detection, however, the protocol must be addressed as a carrier for other methods described above. Cisco and Juniper often refer to PPPoE as PPPoEoE (extra of is over Ethernet again) in order to separate this from PPPoEoA which is DSLAM northbound ATM transport of these types of packets.

The suggested software configuration of the server blades is a fairly typical virtual machine based server, in this case based upon VMWare ESX Server. The VMWare ESX Server software is loaded onto each of the server blades containing a different customer, or group of customer applications within each virtual machine. In this case a single customer might be represented by a large enterprise with a Platinum Service Offering while a group of customers might represent small businesses that purchased a Bronze Service Offering for Malicious Packet Scrubbing. In either case, the representative software application is loaded as a typical virtual machine instance on the server. It may be important, in the configuration of the VMWare ESX Server, to ensure that there is a unique MAC address associated with each Virtual Machine instance that is separate from the physical blade hardware address. This would allow the network processing blades to direct traffic using Ethernet Address (MAC ID) to the physical server blade and should the virtual machine need to be re-hosted on another blade for performance or availability reasons, traffic redirection can seamlessly migrate as it would be seen as a simple layer 2 switching re-route. As more complex services farms are developed, there may be needs to support more fine-grained traffic segmentation and virtual machines may be configured using VLAN Tag support, 802.1q in the Ethernet Header, to do further segmentation. In other embodiments, tag support in the switch fabrics may be used for traffic segmentation instead of using a Layer 2 Ethernet MAC delivery model for the blades.

Figure 20:
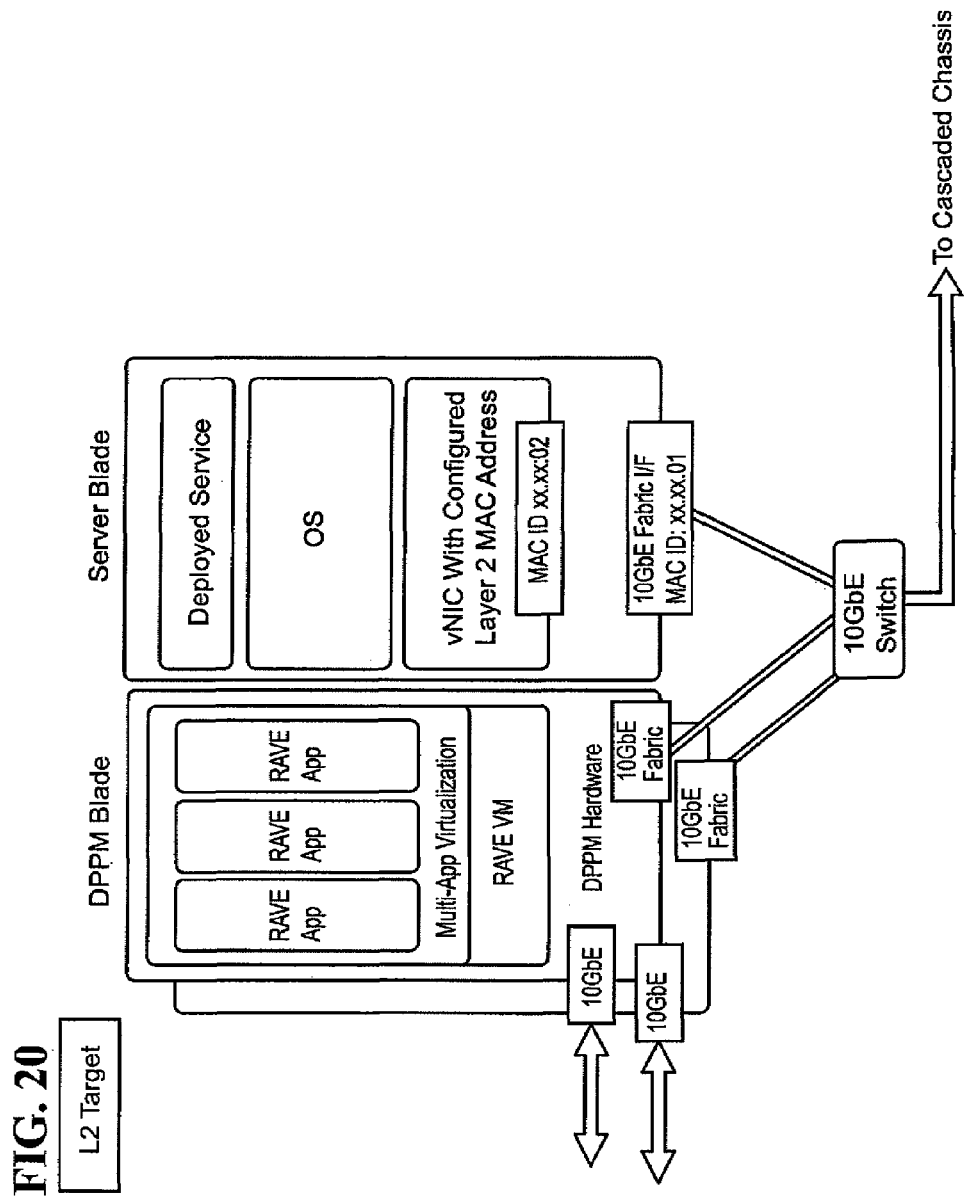
FIG. 20 depicts a dual packet analyzer/adapter configuration according to one embodiment.
Figure 21:
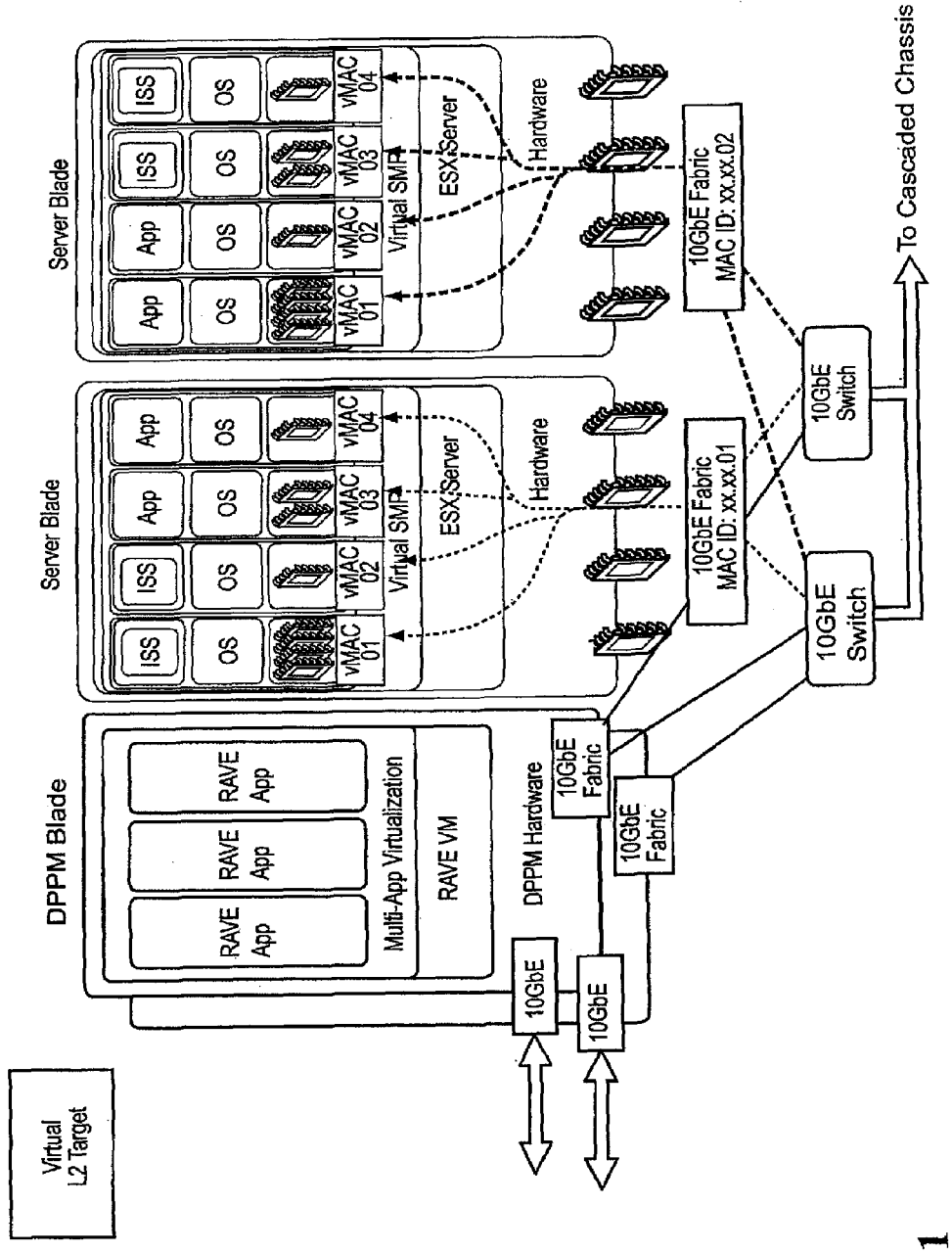
FIG. 21 depicts another alternate implementation of a dual packet analyzer/adapter configuration according to one embodiment.

FIGS. 20 and 21 show the dual-DPPM configuration at left providing an ingress and egress 10 Gbps path as would be deployed in an inline service using one or more server blades executing one or more services. Some situations may not require multiple external links for providing an inline model but rather a single target acting as an MPLS switch path location or a routed-to destination and redundancy may be for processing or network interface redundancy issues.

As traffic arrives on the 10 Gigabit Ethernet interface on a CloudShield DPPM it will be inspected to determine whether the traffic is to be processed within the current chassis or passed along. For traffic destined to this chassis, Deep Packet Inspection technology will be utilized to classify flows and associate with a given customer. If this is a new conversation, this information will be recorded in a Silicon Database for future reference. The database will be referenced to determine the appropriate virtual machine to navigate the traffic to. At this point Ethernet MAC addresses will be modified to navigate traffic appropriately within the chassis and the Ethernet header will be converted to an 802.1q header to include a VLAN tag which will be specified by the DPPM Blade. Traffic will be sent out of the DPPM onto the switch fabric where the destination MAC address will be utilized to direct the packet to the appropriate server blade. VMWare ESX will receive the packet and inspect the VLAN Tag to send it to the appropriate virtual machine. Upon completion of processing returned traffic will have a VLAN Tag applied by the ESX Server and transmission to either the original source MAC address or a prescribed destination will cause the packet to be directed to the appropriate DPPM for egress of the chassis.

Figure 22:
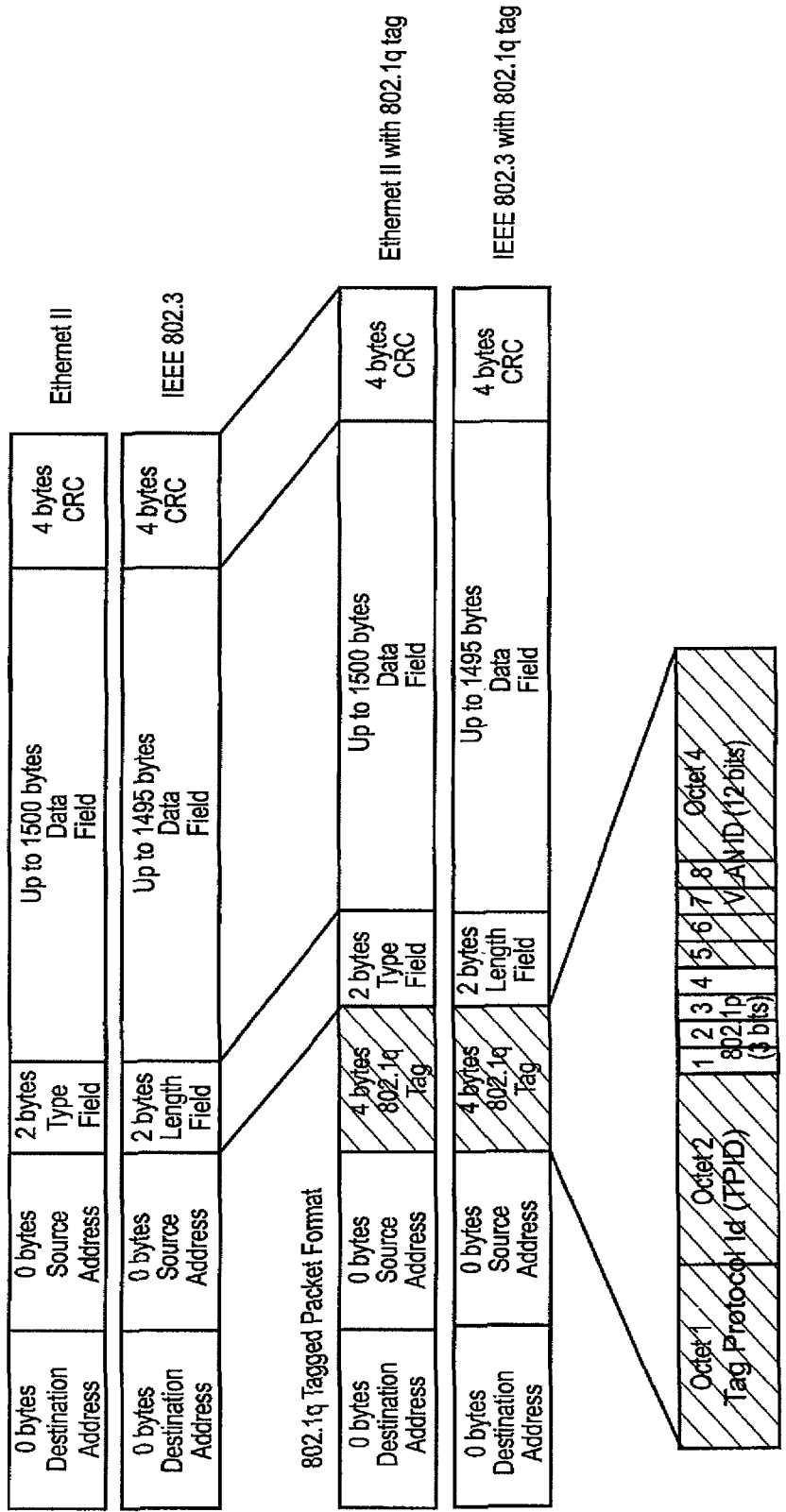
FIG. 22 depicts an exemplary untagged Ethernet frame.

FIG. 22 shows a normal untagged Ethernet frame as it would be received by the chassis and its difference with regards to the packet that would be sent within the chassis containing a VLAN tag. Note that the Up to 1500 bytes Data Field represents the TCP/IP datagram delivered over Ethernet. It is through the modification of the first 16 bytes of the packet (Destination MAC ID, Source MAC ID and VLAN Tag) that internal chassis navigation to specific blades and virtual machines are accomplished.

In alternative embodiments, there are cases where load balancing of multiple server blades associated with a single customer application is required. In these cases, the network element could monitor load, health and appropriate distribute traffic in a manner that works for the application such as flow based or protocol based load balancing.

In the above examples, MAC and VLAN tags are leveraged as the mechanism for identifying virtual machines. In some scenarios it may be preferred to have a unique MAC ID per virtual server. There is no reason why destination MAC re-writing cannot be leveraged as the sole mechanism for the mapping should that be preferred or the only mechanism for delivery. Of importance in this scenario is ensuring that the switches cannot be overwhelmed and can learn all MAC IDs for the chassis.

Given that it may take many more server blades than can even fit within a chassis to attain 10 Gbps of Services Processing, in an alternative embodiment, the chassis maybe cascaded at the switch fabric level instead of on the front side DPPM based connections. Since layer 2 switching is maintained across multiple chassis' in this configuration, a DPPM can look at traffic and change the MAC ID and VLAN Tags to associate with a virtual machine and by delivering that packet to the switch fabric locally, layer 2 switching will deliver and return the packets appropriate across a cascaded collection of chassis'. It is envisioned that with multiple chassis' switches will be managed in pairs for redundancy but otherwise kept separated to manage traffic and security within the switch.

In implementations where more than one service is sold to a given customer, the DPPM may be responsible for moving traffic from one VM to another until all services have been applied to a given packet. In addition, logic can be applied such that traffic leaving an application in a specific way may dictate which or if any other applications should process the traffic.

For some applications, especially as DoD or Wireless Carrier Markets are addressed, issues such as IPv6 or MPLS come up. The DPPM technology can adapt these packets in a variety of ways such as removing MPLS labels during transmission to the Virtual Machine and re-assigning upon egress or adapting IPv6 addressed packets into private IP based IPv4 ranges for processing by tools within the chassis in an IPv4 space while keeping packets IPv6 as the come in and out of the chassis.

In most cases, traffic sent to a server blade will be expected to be returned to the same DPI blade for finishing up traffic processing. In some cases, however, the traffic may be desired to egress another blade. If traffic flow is set up such that packets are forwarded to a server and then the packet is returned to the requesting source, the DPPM can choose to insert the source MAC address of the desired egress blade before forwarding to virtual machine. Switches will need to be configured with static MAC entries so as to not misinterpret the spoofed source as being the destination to send future packets to the MAC ID, however, in high traffic rate scenarios this can dramatically provide benefits to switch fabric traffic engineering.

Service Providers often would like to provide an enterprise class product embodied in a virtual machine as a multi-user service offering such as a Bronze Firewall Service for small businesses. Unfortunately, most enterprise class products do not have the notion of separately provisioned policy sets per customer nor a notion of reporting to multiple management systems. This is a case where Deep Packet Control can really come into play.

For example, an enterprise firewall may implement a single provisioned rule set and report alerts and logs to a central station via methods such as syslog or SNMP. In a virtual machine scenario as described in this white paper, not only can Layer 2 Ethernet be re-written to appropriately address a given blade server and virtual machine but so too can layer 3 IP information. Within the Blade Center each customer could be given an RFC 1918 private address such as 10.0.0.1 for customer 1, 10.0.0.2 for customer 2 and so on. As traffic comes in from a given customer, the layer 3 information is stored in the DPI devices and re-written to a prescribed private addressed before being forwarded to the firewall. Each customer's policies are adapted to a refined set of address that constrain them to the specific private IP block versus any style rules. As the traffic egresses the firewall, the original addresses are replaced in the packets and sent along their way. In this fashion the rule sets of 1000's of customers can be intelligently merged into a single rule set.

As alerts come out of the system, the contents of the SNMP Trap or Syslog can be inspected to identify the customer (by the private IP), the IP Address content can be replaced in the alert and the packet can be directed to the customer's alert manager as opposed to the singularly configured one in the enterprise firewall. The net result is each customer receives their alerts on their management console (which may be yet another virtual machine) reflecting their traffic only.

Figure 23:
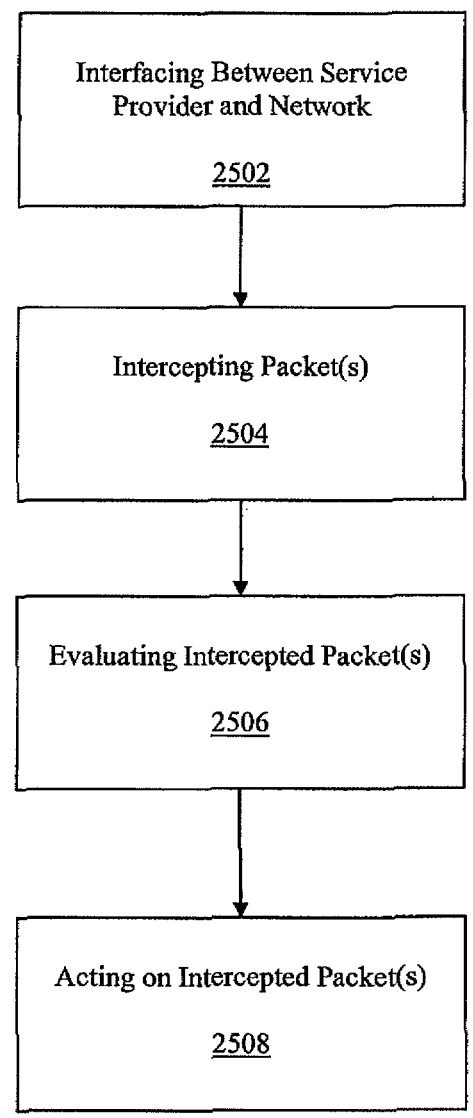
FIG. 23 depicts a flow chart showing exemplary operation of one embodiment.

Referring to FIG. 23, as described, the disclosed embodiments may implement a method of transparently provisioning one or more services to a network, such as a firewall service, content control service, malicious content detection service, anti-denial-of-service service, intrusion detection and/or prevention service, internet protocol (IPv4 to IPv6) gateway service, lawful intercept service, URL filtering service, or combinations thereof, etc., the network carrying a plurality of packets each being transmitted by an associated source, e.g. an end user or client device or router, proxy server, web server, etc., to at least one associated intended destination intended by the source, e.g. the destination(s) to which the packet(s) are specifically addressed, routed or otherwise directed by the source. Each of the plurality of packets includes routing data, such as Layer 2 or Layer 3 data, which is operative to cause the forwarding of the packet via the network towards the at least one intended destination, e.g. data which is used by the various routers and switches on the network to forward the packet along a route which should convey the packet to its ultimate destination. This data includes inter-network data, such as Layer 2 data or other data, such as a MAC address, which may be used to route the packet among devices within a network, as well as intra-network data, such as Layer 3 data or other data, such as an IP address, which may be used to route the packet among devices which are connected to different networks. The source and destination may include any combination of inter and intra network devices. Accordingly, for example, the source and destination may include inter-network entities, e.g. within a particular network hop, such as client devices and firewalls and/or proxy servers, or ingress and egress routers of a network, the ingress router receiving external communications and forwarding them, based on the layer 2 or 3 data, to the egress router. Alternatively, the source and destination may include intra-network entities, such as a client web browser and web server communicating using Layer 3 data. The service(s) may be provided by one or more application service providers via one or more applications. The service(s) may be provisioned such that the application service provider(s), at least one of the associated source, at least one associated intended destination, or a combination thereof, are unaware of the provisioning of the service(s) as described below. The service(s) may be provisioned, such as remotely and/or in real time, as managed services, also referred to as managed subscriber services, routing and/or load balancing traffic to one or more applications providing one or more applications.

The method includes interfacing between one or more applications, such as a first application and a second application, and an interface to the network (block 2502), such as by providing a hardware and/or software interface to which one or more application service providers may couple an application and/or device for implementing a service with respect to the packets being transmitted over the network. In one embodiment, the interfacing is implemented such that the application(s)/device(s) is unaware that it is not directly connected with the network, such as by not requiring that Layer 2 or Layer 3 protocols be modified to accommodate the application(s)/device(s). In addition, the method includes intercepting one or more of the plurality of packets prior to a forwarding thereof, such as by a router or switch, toward the at least one associated intended destination (block 2504). The interception may take place after the packet has been processed, and forwarded, by an ingress router to a carrier facility, but prior to the receipt and forwarding of that packet by an egress router out of the carrier facility. The method further includes evaluating the intercepted packet(s) based on a one or more specifications of one or more subsets of the plurality of packets with respect to which the application(s) is to perform the service(s) (block 2506), such as a first specification of a first subset of the plurality of packets with respect to which a first application is to perform a first service and a second specification of a second subset of the plurality of packets with respect to which a second application is perform a second service. At least the first specification may specify the first subset of the plurality of packets based on criteria other than only the routing data contained in the intercepted packet, e.g. other than only the Layer 2 or Layer 3 data. For example, the application service provider(s) may define criteria for which packets are and/or are not to be intercepted, such as criteria based on the packet payload, or portion thereof, alone or in combination with the Layer 2 and/or Layer 3 data. It will be appreciated that the criteria may be defined as inclusive or exclusive criteria, i.e. specifying which packets are to be acted on or, alternatively, which are to be excluded. Further, the method includes acting on the intercepted packet, based on the evaluating, to facilitate the performance of at least one of the service(s), alone or in combination, with respect to the intercepted packet if the intercepted packet is included in at least one of the specified subset(s), or combinations thereof (block 2508). As noted above, the disclosed embodiments may act on behalf of an application service provider, performing functions specified thereby, and/or the intercepted packets may simply be passed to the device and/or application of the application service provider to be processed according to the service provided thereby. Accordingly, the acting may include at least one of providing at least a copy of at least a portion of the intercepted packet to the application(s), deleting the intercepted packet, substituting a modified intercepted packet for the intercepted packet, substituting a new packet for the intercepted packet, allowing the intercepted packet to continue to the at least one associated intended destination, or other singular or compound actions or combinations thereof. In particular, the acting may include providing the intercepted packet, or a copy thereof, to a first application/device if the intercepted packet is one of a specified first subset to facilitate the performance of a first service with respect to the intercepted packet and generate a result based thereon and to a second application/device if the intercepted packet is one of a specified second subset to facilitate the performance of a second service with respect to the intercepted packet and generate a result based thereon. Further, the method may include receiving the result of the performance of the service(s) on the intercepted packet from the application(s) wherein the result may comprise at least one of an instruction to delete the intercepted packet, an instruction to modify the intercepted packet, an instruction to substitute a modified intercepted packet for the intercepted packet, an instruction to substitute a new packet for the intercepted packet, an instruction to allow the intercepted packet to continue to the at least one associated intended destination, an instruction to respond to the source, or combinations thereof and further wherein the acting further comprises executing the instruction.

As described, in one embodiment, more than one application service provider may be interested in providing more than one service to the network. In one embodiment, the specified subsets of the plurality of packets may be different, e.g. each service provider may be providing a different service with respect to different packets flowing over the network. In another embodiment, the specified subsets may overlap, partially or entirely. For example, the service providers could be interested in the same packets, such as for providing the same service competitively or at different price points, for example. In such a situation, the acting may further comprise providing the intercepted packet only to a first application service provider when the intercepted packet is one of a first subset specified by the first application service provider and one of a second subset specified by a second application service provider. Alternatively, other methods of resolving packet contention may be implemented, such as round robin, or providing each with a copy of the packet(s). In one embodiment, the same application service provider may provide more than one service and those multiple services may the be the same or a different service. For example, an application service provider and/or operator of the disclosed embodiments may wish to provide the same service but split/balance the processing load. Thereby, non-overlapping subsets of the plurality of packets to which each instantiation of the service will be applied may be specified by the application service provider and/or by an operator of the disclosed embodiments. In one embodiment bi-directionally related packets may be routed to the same service of the multiple services.

To reduce implementation barriers, the interfacing may further comprise interfacing between the application(s) and the network without modifying layer 2 or layer 3 protocols of the application(s), the interface to the network, such as a router or switch, or combination thereof. This would avoid having to reconfigure the application(s) or network interface, such as routers or switches, to handle interconnection of the application(s) with the network. In one embodiment, the interfacing may further comprise translating between the protocols used by the network and the protocols used by application(s), e.g. between a service provider network form ("SPNF") and an internal application server form ("IASF"). Intercepted packets would be appropriately modified prior to being provided to the application(s) and any packets provided by the application(s) for release to the network would be appropriately modified prior to such release.

The disclosed embodiments may be implemented as a system for transparently provisioning one or more services provided by one or more application service providers to a network via one or more applications, the network carrying a plurality of packets each being transmitted by an associated source to at least one associated intended destination intended by the source. Each of the plurality of packets may comprise routing data operative to cause the forwarding of the packet via the network towards the at least one intended destination, as was described above. The system may include a packet processor coupled between the application(s) and the network, the packet processor being further operative to intercept at least one of the plurality of packets prior to a forwarding thereof toward the at least one associated intended destination, evaluate the at least one intercepted packet based on one or more specifications of one or more subsets of the plurality of packets with respect to which the application(s) is to perform the service(s), and act on the intercepted packet to facilitate the performance of the service(s), individually or in combination, with respect to the intercepted packet if the intercepted packet is included in one of the associated specified subset(s), wherein at least one of the specifications specifies a subset based on criteria other than only the routing data contained in the intercepted packet. For example, the packet processor may be operative to intercept at least one of the plurality of packets prior to the forwarding thereof toward the at least one associated destination, evaluate the at least one intercepted packet based on a first specification of a first subset of the plurality of packets with respect to which a first application is to perform a first service and a second specification of a second subset of the plurality of packets with respect to which a second application is to perform a second service. Exemplary services include a firewall service, content control service, malicious content detection service, anti-denial-of-service service, intrusion detection and/or prevention service, internet protocol (IPv4 to IPv6) gateway service, lawful intercept service, URL filtering service, or combinations thereof. Further, the services may be provided such that at least one of the associated source, at least one associated intended destination, or a combination thereof, are unaware of the operations of the interface. The service(s) may be provisioned, such as remotely and/or in real time, as managed services, also referred to as managed subscriber services, routing and/or load balancing traffic to one or more applications providing one or more applications.

The act performed by the packet processor may include at least one of provide at least a copy of the intercepted packet to the application(s), delete the intercepted packet, modify the intercepted packet, substitute a modified intercepted packet for the intercepted packet, substitute a new packet for the intercepted packet, allow the intercepted packet to continue to the at least one associated intended destination, respond to the associated source, or other singular or compound actions or combinations thereof. In particular, the interface may be further operative to provide the at least one intercepted packet to a first application if the intercepted packet is one of a specified first subset to facilitate the performance of a first service with respect to the intercepted packet and generate a result based thereon or to a second application if the intercepted packet is one of a specified second subset to facilitate the performance of a second service with respect to the intercepted packet and generate a result based thereon. The interface may then be further operative to receive the result of the performance of the service(s) on the intercepted packet from the application(s) and, wherein the result comprises at least one of an instruction to delete the intercepted packet, an instruction to modify the intercepted packet, an instruction to substitute a modified intercepted packet for the intercepted packet, an instruction to substitute a new packet for the intercepted packet, an instruction to allow the intercepted packet to continue to the at least one associated intended destination, an instruction to respond to the source, or combinations thereof, the packet processor is further operative to execute the instruction.

As described, in one embodiment, more than one application service provider may be interested in providing services to the network and/or an application service provider may be interested in providing more than one service. In one embodiment, the specified subsets of the plurality of packets may be different. Alternatively, the specified subsets may overlap or be the same. As such, the interface may be further operative to provide the intercepted packet only to a first application when the intercepted packet is one of a first subset and one of a second subset. Alternatively, other methods of resolving packet contention may be implemented, such as round robin, or providing each with a copy of the packet(s).

To reduce implementation barriers, the interface may be capable of coupling between the application(s) and the network without modifying layer 2 or layer 3 protocols of the application(s) and/or interface to the network. This would avoid having to reconfigure the application(s) and/or network interfaces to handle the interconnection of the application(s) with the network.

The system for transparently provisioning one or more services, such as first and second services, the services being provided by one or more, e.g. first and second, application service providers to a network via one or more, e.g. first and second, applications, the network carrying a plurality of packets each being transmitted by a source to at least one intended destination intended by the source, may be implemented by one or more processors, one or more memories coupled with the processor(s), a network interface operative to couple the processor with the network, and an application interface operative to couple the processor with the application(s). Each of the plurality of packets may comprises routing data operative to cause the forwarding of the packet via the network towards the at least one intended destination, as was described above. The system may further comprise first logic stored in the memory(s) and executable by the processor(s) cause the processor(s) to intercept at least one of the plurality of packets prior to a forwarding thereof toward the at least one intended destination, second logic, coupled with the first logic, stored in the memory(s) and executable by the processor(s) to cause the processor(s) to evaluate the at least one intercepted packet based on one or more, e.g. first and second, specifications of one or more, e.g. first and second, subsets of the plurality of packets with respect to which the application(s) is to perform the service(s), wherein at least the first specification specifies the first subset based on criteria other than only the routing data contained in the intercepted packet, and third logic, coupled with the second logic, stored in the memory(s) and executable by the processor(s) to cause the processor(s) to act on the intercepted packet to facilitate the performance of at least one of the service(s), individually or in combination, with respect to the intercepted packet if the intercepted packet is included in at least one of the associated specified subset(s), individually or in combination.

It will be appreciated that the application(s) may be implemented in software executing on the packet processor or implemented in a separate device connected thereto.

IX. The Fifth Embodiment

Meeting the universal demand for an Internet that is more robust, that is capable of sustaining its own growth and that can adapt to new technologies, requires the migration of the current network infrastructure to next generation networking technologies. This next generation data network is often referred to as the "Optical Internet."

The shift to the Optical Internet has created a new set of challenges. Chief among these challenges is the need to manage an exponentially higher volume of network traffic at much higher rates of speed. In the U.S., the principal standard for optical networks is the American National Standards Institute ("ANSI") standard for synchronous data transmission over optical media known as Synchronous Optical Network ("SONET"). The SONET standard actually comprises multiple standards for transmission rates up to 9.953 gigabits per second ("Gbps") with the capability to go up to 20 Gbps. Each transmission rate standard is known as an Optical Carrier Level ("OC-X"). Exemplary optical carrier levels include OC-12 for communications at 622.08 Mbps, OC-48 for communications at 2.488 Gbps and OC-192 for communications at 10 Gbps. Today's microprocessors face a situation where they cannot support the pace of performance increases associated with the deployment of fiber-based network bandwidth of OC-48 and higher. Simply put, the move to fiber-optic networks has pushed the physical limits of microprocessors and the I/O bus beyond their current technical capabilities. The platform described herein is designed to address many issues associated with Optical Internet services that cannot be addressed by the current software based firewall servers.

Figure 9:
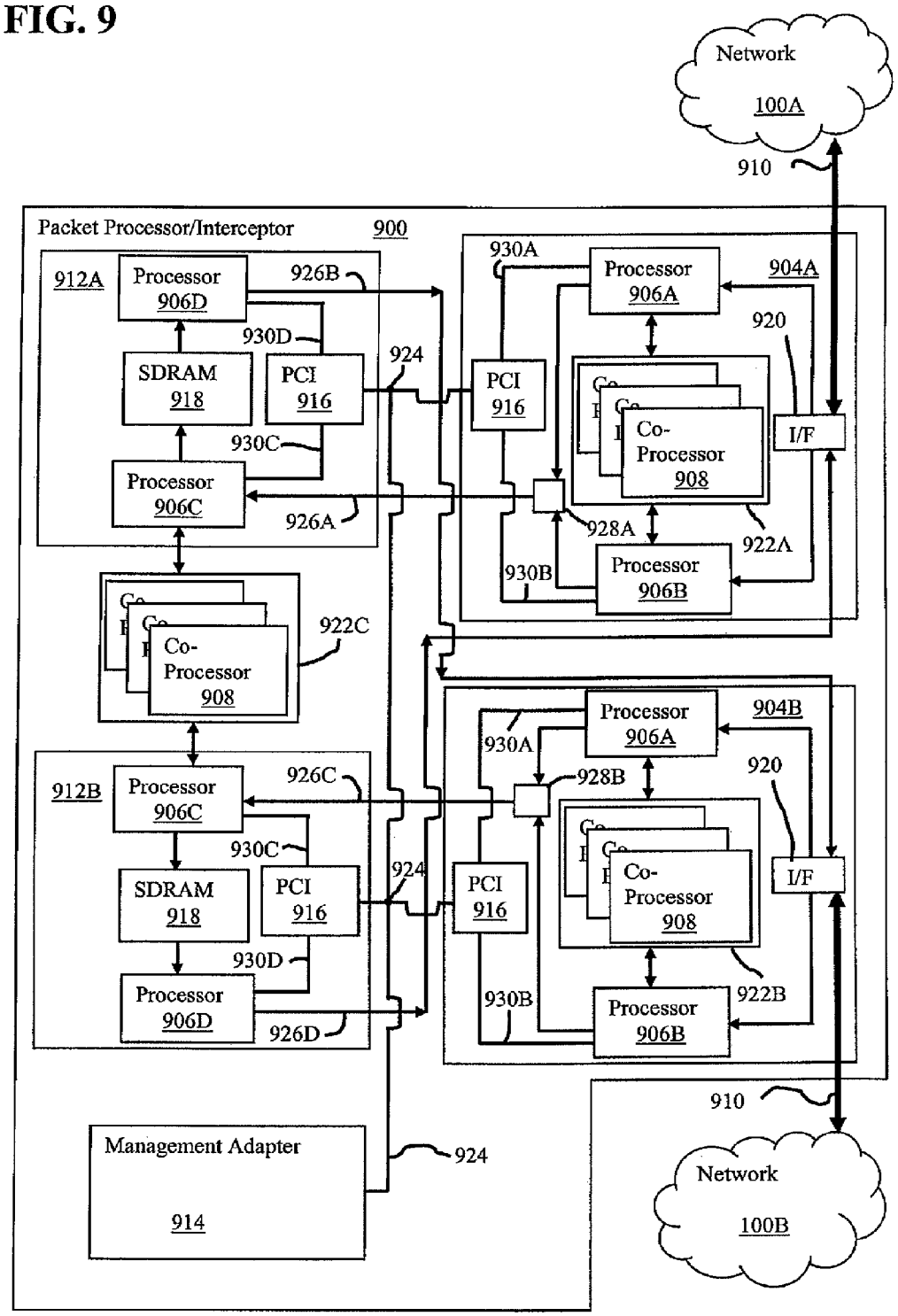
FIG. 9 depicts a block diagram of a packet interceptor/analyzer according to a fifth embodiment.

FIG. 9 shows an exemplary device 900 for intercepting and processing packets at wire speed from an optical based network 100, such as the Internet, compatible with the OC-48 standard or faster. For a more detailed explanation of the operation of devices which intercept and process packets, refer to U.S. Patent Application Serial entitled "EDGE ADAPTER ARCHITECTURE APPARATUS AND METHOD", which is captioned above. The exemplary device 900 may include the Rapid Intelligent Processing Platform manufactured by Cloudshield Technologies, Inc., located in San Jose, Calif. For clarity, some components of the device 900 are not shown.

The device 900 shown in FIG. 9 is coupled with the network 100 (consisting of an upstream network portion 100A and a downstream network portion 100B) via a network connection 910 so as to be able to intercept and process packets communicated between the upstream network portion 100A and the downstream network portion 100B of the network 100. Herein, the phrase "coupled with" is defined to mean directly connected to or indirectly connected through one or more intermediate components. Such intermediate components may include both hardware and software based components. In one embodiment, the network connection 910 is an optical network connection. In an alternate embodiment, the network connection 910 is an electrical network connection.

In one embodiment, not shown in the figure, the device 900 is configured to operate within a rack-mount system, e.g. implemented as a blade for installation within a blade enclosure, such as the IBM Blade Center described above, comprising a chassis which provides power, cooling and a housing for the other components, as described below. The housing further includes a backplane into which the other components plug into and which interconnects those components. Such components may include interface components to couple external devices to add additional processing functionality.

The device 900 includes two primary processing elements 904A, 904B which intercept and process packets from the network 100. One primary processing element 904A is coupled with the upstream network 100A and the other primary processing element 904B is coupled with the downstream portion of the network 100B via the network interface 920. It will be appreciated that additional primary processing elements 904A, 904B may be provided depending on the topology, physical and logical arrangement of the network 100 and the coupling point of the device 900. Further, the functionality of the processing elements 904A, 904B may be consolidated into a single processing element. In one embodiment, each primary processing element 904A, 904B includes a printed circuit board capable of being plugged into the backplane described above. For more detail on the operation of the primary processing elements, refer to U.S. Patent Application entitled "APPARATUS AND METHOD FOR INTERCONNECTING A PROCESSOR TO CO-PROCESSORS USING SHARED MEMORY", captioned above.

The primary function of the primary processing elements 904A, 904B is to perform stateless processing tasks on the incoming packet stream. Stateless processing tasks are tasks that do not require knowledge of what has come before in the packet stream. Stateless tasks include ingress and egress filtering. Ingress and egress filtering involves ensuring that packets arriving from a particular portion of the network actually came from that portion of the network, as was described above. For example, where the device 900 is programmed with the range of network addresses in the portion of the network 100B downstream of the device 900, packets arriving from that downstream portion with a network address out of range would be detected as invalid and filtered out of the packet stream, or vice versa for the upstream portion of the network 100A. Egress filtering refers to filtering in the upstream to downstream direction and ingress filtering refers to filtering in the downstream to upstream direction. For the filtering function, the filter values are typically maintained in block lists. Note that while filtering is a stateless function, independent of what packets have come before, the device 900 interjects stateful processing, as described below, to dynamically update the filtering or other information required for the stateless processing tasks. While the network processor 906A, 906B on the primary processing elements 904A, 904B can store state information about historical packet activity, each processing element 904A, 904B only sees one direction of the packet flow off the network 100. Therefore, they cannot perform true stateful processing tasks which requires bi-directional visibility. This functionality is provided by the secondary processing elements 912A, 912B, described in more detail below.

The device 900 further includes two secondary processing elements 912A, 912B which are coupled with the primary processing elements 904A, 904B via a command/control bus 924 and packet busses 926A, 926B, 926C, 926D. In one embodiment, each secondary processing element 912A, 912B is a printed circuit board capable of being plugged into the backplane described above. Additional secondary processing elements 912A, 912B may be included or the functionality of the secondary processing elements 912A, 912B may be consolidated into a single secondary processing element. In one embodiment, the command/control bus 924 is a bus routed over the interconnecting backplane of device 900 and complying with the Compact Personal Computer Interface ("cPCI") standard and is 64 bits wide and operates at a frequency of at least 33 MHz. Exemplary packet busses 926A, 926B, 926C, 926D include busses complying with the IX bus protocol of the Intel IXP1200 Network Processing Unit and are described in more detail below. Each exemplary packet bus 926A, 926B, 926C, 926D may be bi-directional, 64 bits wide and operate at a frequency of at least 84 MHz and may be routed over the backplane described above. Alternatively, other bus technologies/protocols may be used and are dependent upon the implementation of the device 900. The command/control bus 924 carries command and control information between the primary and secondary processing elements 904A, 904B, 912A, 912B. The packet busses 926A, 926B, 926C, 926D carry packet data between the primary and secondary processing elements 904A, 904B, 912A, 912B. For more detail on the operation of the secondary processing elements, refer to U.S. Patent Application entitled "APPARATUS AND METHOD FOR INTERFACING WITH A HIGH SPEED BI-DIRECTIONAL NETWORK", captioned above.

The primary function of the secondary processing elements 912A, 912B is to perform stateful processing tasks, i.e. tasks which are dependent on historical activity. One example of a stateful processing task involves network security applications which require monitoring conversations, i.e. bi-directional packet flow, in the packet stream, typically consisting of requests and responses to those requests. Stateful processing and the ability to monitor traffic bi-directionally allows the secondary processing elements watch for requests and responses and match them up. The arrangement of the inbound network processors 906C of the secondary processing elements 912A, 912B, described in more detail below, allows them to share information about packets coming from either direction, i.e. upstream or downstream. Further, the secondary processing elements 912A, 912B can affect the stateless processing of the primary processing elements 904A, 904B. For example, where the secondary processing elements 912A, 912B determine that packets from a certain network address are consistently invalid, the secondary processing elements 912A, 912B can add that network address to the filtering list of the primary processing elements 904A, 904B thereby dynamically updating the stateless processing environment.

For example, packets such as those traversing between a web browser and web server change port numbers once a session between the two entities is created. A stateless rule cannot be applied that says "don't allow HTTP POST commands from network address ABC" without destroying all communications from the network address ABC. To accomplish the desired filtering and not destroy all communications from the source network address, the device 900 watches for new sessions directed to the web server on port 80 (standard HTTP application port). By watching the traffic, an example session might choose to then communicate on port 23899 at the web server. Only by subsequently watching traffic destined to this new port would the device 900 be able to search for HTTP POST commands that need to be blocked. Once identified, the packets could then be dealt with. If the session startup was not monitored and information not stored for future reference, i.e. not storing state information, an HTTP POST command traversing the network as part of a text stream from a different application, such as a document about how to configure a blocking system, might be falsely identified. Stateful inspection generally requires visibility to traffic in both directions. In the case above, a packet from the client to the server would have shown the request for a new web session. The response from the server to the client would have shown the web server port number to monitor. In firewalls it is also this response that subsequently allows that port number to have future traffic allowed through the firewall. This second port number on the server is the one for which traffic can be subsequently monitored for the HTTP POST. By storing relevant information for future packet processing analysis, the device 900 is made stateful.

In addition, the device 900 includes a management adapter 914 which is coupled with the command/control bus 924. The management adapter 914 is used to manage the device 900 and control the functionality of the primary and secondary processing elements 904A, 904B, 912A, 912B. In one embodiment, the management adapter 914 includes a computer server having dual-Pentium III processors manufactured by Intel Corporation, located in Santa Clara, Calif., or suitable alternatives. The management adapter 914 further includes at least 64 MB of RAM and at least 10 GB of hard disk storage. The management adapter 914 is preferably implemented as a single board computer that plugs into the back plane, as described above, although more than one board as well as a stand alone personal computer may also be used. The management adapter 914 further includes an external management interface (not shown) which allows the connection of an external management device (not shown) for programming, controlling and maintaining the device 900. In one embodiment, the external management interface includes a model 82550 100 megabit Ethernet Interface manufactured by Intel Corporation, located in Santa Clara, Calif. Other interfaces, such as serial, parallel, coaxial and optical based interfaces may also be used. In one embodiment, the external management device is a desktop computer such as the Deskpro Model ENS SFF P733 manufactured by Compaq Computer Corporation, located in Houston, Tex. Alternatively, any suitable Pentium™ class computer having suitable memory and hard disk space in addition to Ethernet or other form of network connectivity, may be used. Further, the external management device may be located locally with respect to the device 900 or remotely and connected to the device 900 via a local or wide area network.

The primary processing elements 904A, 904B are preferably capable of operating in parallel. The two primary processing elements 904A, 904B, are also referred to as Media Adapter Cards ("MAC") or Media Blade Adapters ("MBA"). Each primary processing element 904A, 904B includes a network interface 920, two network processors 906A, 906B, a set 922A, 922B of one or more co-processors 908, a packet bus interface 928A, 928B, and a command/control bus interface 916. The network interface 920 is coupled with the network 100 via the network connection 910. In one embodiment, the network connection 910 is an optical network connection operating at a throughput of approximately 2.5 Gbps and a 1, 4 or 16 bit width. Each network processor 906A, 906B is coupled with the network interface 920, in a parallel configuration, to receive packets from the network 100. The network interface converts the protocol, bus width and frequency of the network connection 910 to the protocol, bus width and frequency of the network processors 906A, 906B. Further, the network interface 920 splits the incoming data stream between the network processors 906A, 906B, as described below. It will be appreciated that the disclosed embodiments can support any number of network processors 906A, 906B operating in parallel as described below, as the application demands. Further, each secondary processing element 912A, 912B is also coupled with network interface 920 of one of the primary processing elements 904A, 904B via packet busses 126C, 126D to transmit packets onto the network 100, described in more detail below. The network interface 920 converts the protocol, frequency and bus width of the packet busses 126C, 126D from the secondary processing elements to the protocol, frequency and bus width of the network connection 910. In addition, each network processor 906A, 906B is coupled with a set 922A, 922B of one or more co-processors 908 which is described in more detail below. Further, each network processor 906A, 906B is coupled with the command/control bus 924 via command/control interface busses 930A, 930B and the command/control bus interface 916. In one embodiment, the command/control interface busses 930A, 930B are compliant with the Personal Computer Interface ("PCI") standard and are 32 bits wide and operate at a frequency of at least 33 MHz. Further, the command/control bus interface 916 is a PCI to cPCI bus bridge for interfacing the busses 930A, 930B with the command/control cPCI bus 924, described above. Both network processors 906A, 906B are also coupled with one of the secondary processing elements 912A, 912B via the packet bus interface 928A, 928B and the packet bus 926A, 926B.

Each secondary processing element 912A, 912B also includes two network processors 906C, 906D, in a serial configuration, and a command/control bus interface 916. It will be appreciated that the disclosed embodiments can support any number of network processors 906A, 906B operating serially as described below, as the application demands. Each of the network processors 906C, 906D is coupled with the command/control bus 924 via the command/control interface busses 930C, 930D and the command/control bus interface 916. In one embodiment, the command/control interfaces are at least 33 MHz 32 bit PCI compliant as described above and the command/control bus interface 916 is a PCI-to-cPCI bus bridge as described above. One of the network processors 906C is coupled with both network processors 906A, 906B of one of the primary processing elements 904A, 904B via the packet bus 926A, 926C and packet bus interface 928A, 928B for receiving packet data from the primary processing elements 904A, 904B. The other of the network processors 906D is coupled with the network interface 920 of the other of the primary processing elements 904A, 904B via the packet bus 926B, 926D for sending packet data to the network 100, as described above. The secondary processing elements 912A, 912B are also referred to as Intelligent Packet Adapters ("IPA").

Each secondary processing element 912A, 912B further includes a shared synchronous dynamic RAM ("SDRAM") memory fabric 918 coupled between each of the network processors 906C, 906D to allow the network processors 906C, 906D to operate uni-directionally and move data from the inbound network processor 906C to the outbound network processor 906D. For more detail on the operation of this memory fabric 918, refer to U.S. Patent Application entitled "APPARATUS AND METHOD FOR INTERFACING WITH A HIGH SPEED BI-DIRECTIONAL NETWORK", captioned above.

In addition, one of the network processors 906C, from each secondary processing element 912A, 912B is coupled with a set 922C of co-processors 908. It will be appreciated that the description below relating to the sharing of co-processors 908 sets 922A, 922B between the two network processors 906A, 906B of the primary processing element 904A, 904B are applicable to the arrangement of the co-processors 908 and the secondary processing elements 912A, 912B. In one embodiment of the secondary processing elements 912A, 912B, the network processors 906C which are sharing the co-processors 908 of set 922C are located on two different circuit boards (one for each element 912A, 912B) which share a common daughter card containing the set 922C of co-processors 908.

Each network processor 906C, 906D handles one direction of the bi-directional packet flow coming to/from the secondary processing elements 912A, 912B. In particular, the inbound network processor 906C handles traffic incoming to the secondary processing element 912A, 912B and performs inspection and analysis tasks. The outbound network processor 906D handles outgoing traffic from the secondary processing element 912A, 912B and performing actions on the packet such as modification, cleansing/deletion or insertion of new or replacement packets. By serializing the network processors 906C, 906D on the secondary processing elements 912A, 912B, the processing of packets can be divided into steps and distributed between the two network processors 906C, 906D. It will be appreciated more network processors 906C, 906D may be coupled serially to enhance the ability to sub-divide the processing task, lowering the burden on any one network processor 906C, 906D only at the cost of the latency added to the packet stream by the additional network processors 906C, 906D and the additional hardware cost. The network processors 906C, 906D intercommunicate and share data via an SDRAM memory fabric to implement this serial packet flow. For more detailed information, refer to U.S. Patent Application entitled "APPARATUS AND METHOD FOR INTERFACING WITH A HIGH SPEED BI-DIRECTIONAL NETWORK", captioned above. Further each secondary processing element 912A, 912B handles a different direction of packet flow from the network 100. In particular, the upstream secondary processing element 912A handles packets flowing from the network 100A upstream of the device 900 to the network 100B downstream of the device 900. The downstream secondary processing element 912B handles packets flowing from the network 100B downstream of the device 900 to the network 100A upstream of the device 900. For a more detailed description, please refer to U.S. Patent Application entitled "APPARATUS AND METHOD FOR INTERFACING WITH A HIGH SPEED BI-DIRECTIONAL NETWORK", captioned above.

The device 900 intercepts and processes packets from the network 100. One "upstream" primary processing element 904A intercepts packets arriving from the network 100A upstream of the device 900 and the other "downstream" primary processing element 904B intercepts packets arriving from the network 100B downstream of the device 900. The intercepted packets are pre-processed, as described above, and then passed on to a corresponding secondary processing element 912A, 912B for subsequent processing and possible release back to the network 100. Further, within each primary processing element 904A, 904B, the network interface 920 converts the protocol, frequency and bus width of the network connection 910 to the protocol, frequency an bus width of the network processors 906A, 906B and splits the incoming packet stream among the two network processors 906A, 906B which process packets in parallel (explained in more detail below). In one embodiment, the packet stream is alternated between the network processors 906A, 906B in a "ping-pong" fashion, i.e. a first packet going to one network processor 906A, 906B, the second packet going to the other network processor 906A, 906B and the next packet going back to the first network processor 906A, 906B, and so on. For more detail on this parallel packet processing architecture, refer to U.S. Patent Application entitled "EDGE ADAPTER ARCHITECTURE APPARATUS AND METHOD", captioned above. The network processors 906A, 906B are further coupled with the packet bus interface 928A, 928B which couples both network processors 906A, 906B with the common packet bus 926A, 926C to the secondary processing elements 912A, 912B. The packet bus interface 928A, 928B converts the bus width of the packet processors 906A, 906B to the bus width of the packet bus 926A, 926C. For more information about the packet bus interface 928A, 928B, refer to U.S. Patent Application entitled "APPARATUS AND METHOD FOR INTERCONNECTING A PROCESSOR TO CO-PROCESSORS USING SHARED MEMORY", captioned above.

For example, a packet traveling from the network 100A upstream of the device 900 to the network 100B downstream of the device 900 is intercepted by the network interface 920 of the upstream primary processing element 904A. The network interface 920 passes the intercepted packet to one of the network processors 906A, 906B which preliminarily process the packet as described above. This may involve the shared co-processors 908, as described below. The packet is then transmitted to the inbound network processor 906C of the upstream secondary processing element 912A for subsequent processing via the packet bus interface 928A and the packet bus 926A. Within the upstream secondary processing element 912A, the packet is processed and moved from the inbound network processor 906C to the outbound network processor 906D via the SDRAM memory fabric 918. This processing may involve processing by the shared co-processors 922. If it is determined that the packet is to be released, in original or modified form, the outbound network processor 906D sends the packet to the network interface 920 of the downstream primary processing element 904B via the packet bus 926B. The network interface 920 of the downstream primary processing element 904B then transmits the packet back onto the network 100B.

For packets traveling from the network 100B downstream of the device 900 to the network 100A upstream of the device 900, the packets are intercepted by the network interface 920 of the downstream primary processing element 904B. The network interface 920 passes the intercepted packet to one of the network processors 906A, 906B which preliminarily process the packet as described above. This may involve the shared co-processors 908, as described below. The packet is then transmitted to the inbound network processor 906C of the downstream secondary processing element 912E for subsequent processing via the packet bus interface 928B and packet bus 926C. Within the downstream secondary processing element 912B, the packet is processed and moved from the inbound network processor 906C to the outbound network processor 906D via the SDRAM memory fabric 918. This processing may involve processing by the shared co-processors 922. If it is determined that the packet is to be released, in original or modified form, the outbound network processor 906D sends the packet to the network interface 920 of the upstream primary processing element 904A via the packet bus 926D. The network interface 920 of the upstream primary processing element 904A then transmits the packet back onto the network 100A.

Overall, the device 900 intercepts packets flowing in an up or downstream direction, processes them and determines a course of action based on the application that the device 900 is implementing. Such actions include, for example, releasing the packet to the network 100, modifying the packet and releasing it to the network 100, deleting the packet, substituting a different packet for the intercepted packet, forwarding the packet to additional internal or external processing resources (not shown), logging/storing information about the packet, or combinations thereof. Applications include content delivery application or security applications such as for preventing unauthorized network access or preventing denial of service attacks.

The network processor 906A, 906B, 906C, 906D used in the primary and secondary processing elements 904A, 904B, 912A, 912B is preferably a general purpose network processor which is suitable for a wide variety of network applications. In one embodiment, each primary and secondary processing element 904A, 904B, 912A, 912B includes two network processors 906A, 906B, 906C, 906D and supporting hardware (not shown), as described above. An exemplary network processor 906A, 906B, 906C, 906D is the Intel IXP1200 Network Processor Unit, manufactured by Intel Corporation, located in Santa Clara, Calif. or Netronome NFP-3200 network flow processor manufactured by Netronome Inc., located in Cranberry Twp, Pa. For more detailed information about the exemplary processor 906, please refer to Intel® IXP1200 Network Processor Datasheet part no. 278298-007 published by Intel Corporation, located in Santa Clara, Calif. This exemplary network processor 906A, 906B provides six micro-engines/path-processors for performing processing tasks as well as a StrongARM™ control processor. Each of the network processors 906A, 906B, 906C, 906D preferably operates a frequency of 233 MHz or faster, although slower clock speeds may be used. It will be appreciated that other network specific or general purpose processors may be used.

As with most general purpose processors, the network processor 906A, 906B, 906C, 906D is capable of being programmed to perform a wide variety of tasks. Unfortunately, this adaptability typically comes at the price of performance at any one given task. Therefore, to assist with the processing of packets, each network processor 906A, 906B on the primary processing element 904A, 904B and the inbound network processor 906C on the secondary processing element 912A, 912B is coupled with one or more co-processor 908 sets 922A, 922B, 922C. The co-processors 908 on each set 922A, 922B, 922C may be specialized processors which perform a more limited set of tasks, but perform them faster and more efficiently than the network processor 906A, 906B, 906C is capable of. In one embodiment, the co-processors 908 include one or more classification co-processors and one or more content addressable memories ("CAM").

The classification co-processors 908 are used to accelerate certain search and extraction rules for the network processor 906A, 906B, 906C. In one embodiment of device 900, the co-processor 908 set 922A, 922B of each primary processing element 904A, 904B includes two classification co-processors 908. The shared co-processor 908 set 922C also includes two classification co-processors shared by the secondary processing elements 912A, 912B. An exemplary classification co-processor is the PM2329 ClassiPI Network Classification Processor manufactured PMC-Sierra, Inc., located in Burnaby, BC Canada. This co-processor is capable of operating at a frequency of at least 100 MHz.

The CAM co-processors 908 are used to facilitate certain search and compare operations that would otherwise be computationally intensive and degrade the performance of the network processor 906A, 906B, 906C. It is preferable that the CAM co-processors 108 be capable of being cascaded together, from 2 to 8, or more devices, to increase the search range. It is further preferable that the CAM co-processors 108 have the capability of processing at least 100 million compares per second. In such a design, each CAM data bit has an associated local mask bit that is used during the compare operation. In contrast with global mask bits, the local mask bits are used only with the associated bit and only for compare operations. This provides masking on an individual bit basis for ternary operation. In one embodiment of the device 900, the co-processor 908 set 922A, 922B of each primary processing element 904A, 904B includes eight CAM co-processors 908. The shared co-processor 908 set 922C also includes eight CAM co-processors 908 shared by the secondary processing elements 912A, 912B. An exemplary CAM is the NetLogic NSE3128 Network Search Engine, formerly named IPCAM®-3, manufactured by NetLogic Microsystems, Inc., located in New York City, N.Y. For more detailed information about the exemplary CAM, refer to NSE3128 Network Search Engine product brief available at the web site netlogic.com/html/datasheets/nse3128.html, last accessed May 11, 2001.

An exemplary CAM device may have at least the following features:
  Organization options of any single device in cascade: 64K×72, 32K×144 or 16K×288;
  Local mask bit associated with each CAM;
  Clock rates: 50/66/100 MHz for 1 megabit devices or up to 200 MHz for a 9 megabit device;
  Eight global mask registers;
  16 bit instruction bus;
  32 bit result bus;
  36/72 bit comparand bi-directional bus or 72/144 bit comparand bus for a 9 megabit device;
  flags to indicate Match ("/M"), Multiple Match ("/MM") and Full Flag ("/FF"); and
  24 bit Next Free Address ("NFA") bus.

It will be appreciated that other classification processors and CAM's may be used and that additional task specific co-processors may also be used, such as cryptographic co-processors, to enhance the processing capability of the primary or secondary processing elements 904A, 904B, 912A, 912B.

As was discussed, the device 900 has to be able to operate at wire speed or faster so as not to degrade network throughput. In the case of an OC-48 class network, this means handling communications speeds of nearly 2.5 Gbps in both directions through the device 900 simultaneously to achieve full duplex functionality, for a total of nearly 5 Gbps throughput for the device 900. Ideally, to achieve this goal, the co-processors 908 should be directly connected to the network processors 906A, 906B, 906C. This would achieve the highest bandwidth of data exchange between these devices, maximizing their utilization and efficiency. Unfortunately, physical, electrical and device design limitations make this direct connection difficult to achieve.

With regard to the primary processing elements 904A, 904B, the physical limitations primarily include the limited amount of space/area available on a single circuit board. It is difficult and expensive to implement two network processors 906A, 906B, their supporting hardware and up to ten co-processors 908, or more, as well as all of the routing interconnections on a single circuit board. An alternative is to move some of the devices to daughter card circuit boards which plug into a main circuit board. This would increase the available area for part placement but introduces electrical concerns regarding the interfaces between the devices. In particular, a daughter card arrangement introduces a board-to-board connector between the daughter card and the main circuit board. This connector introduces undesirable electrical characteristics into the interface between devices mounted on the daughter card and devices mounted on the main circuit board. These undesirable characteristics include increased noise, lower limits on operating frequency, increased parasitic capacitance, increased resistance and increased inductance. These characteristics limit the speed with which these devices can communicate. In order to properly interface across the connector, careful modeling is required to predict the electrical behavior of the connector and how it will impact the interface.

Further, complexities related to interfacing the network processors 906A, 906B to the co-processors 908 also complicate the design and implementation of the device 900. In particular, both the network processor 906A, 906B and the co-processors 908 provide input/output busses for the purpose of interconnecting that device with other devices. However, the network processor 906A, 906B as well as the different types of co-processors 908, all have different interface requirements, such as different supported clock frequencies, bus widths and communications protocols. In addition, the interfaces are further complicated by the desire to connect more than one of each type of co-processor 908 with the network processor 906A, 906B. Even further complicating the interface requirements is the desire to allow each network processor 906A, 906B on the processing element 904 to share the same co-processors 908 and allow each inbound network processor 906C to share the same co-processor 908 set 922C. Sharing co-processor 908 sets 922A, 922B, 922C allows the network processors 906A, 906B, 906C to interoperate and share data, such as state information, in addition to saving costs by reducing the number of devices on the primary processing elements 904A, 904B. When one network processor 906A, 906B, 906C decides to store state information, that information is made available to the other network processor 906A, 906B, 906C. Further, when global updates to the data stored within the co-processors 908 are needed, such as updates to the CAM tables, these updates can be performed more efficiently since there are fewer co-processor sets 922A, 922B, 922C to update. For example, when the secondary processing elements 912A, 912B, due to the result of some stateful processing task, need to update the state information in the CAM data, such as the filtering block lists, the updates need to go to fewer devices resulting in a faster and more efficient distribution of those updates. Further, the sharing of state information among the network processors 906A, 906B on the primary processing elements 904A, 904B, allows the network processors 906A, 906B to operate in parallel and thereby reduces the traffic flow to each network processor 906A, 906B, achieving a longer number of clock cycles over which a packet may be processed.

For more detail on the operation of this co-processor 90 sharing and the interface between the primary and secondary network elements 904A, 904B, 912A, 912B and the co-processor sets 922A, 922B, 922C, refer to U.S. Patent Application entitled "APPARATUS AND METHOD FOR INTERCONNECTING A PROCESSOR TO CO-PROCESSORS USING SHARED MEMORY", captioned above.

In addition, the architecture of the device 900 allows for efficient processing of any portion of the packet regardless of whether it is in the header or payload. This allows for more flexible packet analysis which can adapt to changing network protocols. For example, packet changes such as Multi-protocol Label Switching ("MPLS") have made even the normal IP header look different in a packet since it is now preceded by the MPLS tag. Similarly, new network application are constantly being developed may have their own format and header/payload structure. The disclosed architecture does not treat the header any different from payload in its ability to analyze a given packet. This allows for maximum adaptability to evolving network technologies.

As can be see, the above description discloses a unique architecture capable of bridging the technology gap between existing network processing technology and next generation networking technology. The architecture of the device 900 leverages parallel processing for stateless tasks and serialized/staged processing for stateful tasks. It will be appreciated that the ability to process data statefully requires bi-directional visibility over the traffic stream of the network 102 and further requires deployment of the device 900 at a point, i.e. a choke point, within the network 102 where all traffic of interest is visible and through which it must flow. Alternatively, the device 900 can provide partial stateful and stateless operation in situations where complete bi-directional visibility cannot be guaranteed or is not available.

For stateless processing tasks, such as filtering, pre-processing and other tasks not requiring knowledge of historical packet activity or matching of bi-directional packet activity, multiple parallel network processors 906A, 906B are provided for each network 102A, 102B direction of the bi-directional traffic stream. The incoming packets are equally distributed among the parallel network processors 906A, 906B, which reduces the load on any one processor. As described above, the primary processing elements 904A, 904B provide two network processors 906A, 906B each, operating parallel. Further, the architecture is scalable, allowing for additional parallel network processors 906A, 906B to be added to provide additional processing capability, with only the cost of the additional hardware required. The architecture of the device 900 further allows for the parallel network processors 906A, 906B to share a common set 922A, 922B of co-processors 108. In addition to hardware savings, this configuration permits the processors 906A, 906B to share state information among themselves, further increasing efficiency of operation.

Where a particular application requires stateful processing tasks, such as a security application that needs to monitor bi-directional and/or historical packet activity, the architecture of the device 900 further provides serialized/staged processors for each direction of the packet flow. These serialized/staged processors divide up the required processing tasks, thereby reducing the load on any one processor. For each direction, a the packet data flows through an inbound processor 906C dedicated to receiving inbound traffic and performing inspection, analysis and other preliminary tasks. The inbound processor then passes the packet data to an outbound processor via a memory fabric, described above. The outbound processor then completes the processing, such as by modifying, deleting, or releasing the packet modified or unmodified and or logging/storing information about the packet for subsequent processing. It will be appreciated that the architecture is scalable and that additional network processors 906C, 906D may be added to further divide up the processing burden, reducing the load on individual network processors 906C, 906D. Additional network processors 906C, 906D may be connected using the described memory fabric or by coupling multiple secondary processing elements 912A, 912B in series via the IX bus and backplane described above. Further, the inbound processors of each direction of packet flow are coupled together via a common set 922C of co-processors similar to the parallel configured processors 906A, 906B. In addition to the hardware savings, this configuration permits the efficient sharing of bi-directional packet activity, thereby providing complete stateful processing capability of the bi-directional packet flow. Further, the network processors 906C, 906D performing the stateful processing can dynamically update state information to the stateless network processors 906A, 906B, thereby providing dynamic accommodation to changing network conditions.

The architecture of the device 900 bridges the network and packet processing technology gap by distributing the processing tasks and reducing the load and utilization of any one network processor 906A, 906B, 906C, 906D. For example, Network Processing Units (NPUs) such as the Intel® IXP 1200, described above, were originally designed to be "systems on a chip" that performed all of the required processing tasks. They provide data buses, memory buses (SDRAM and SRAM) as well as interface buses (general purpose IO and PCI). Additionally they have multiple fast path processors, often called micro-engines, and control processors often embedded or attached via a control processor interface. In the case of the Intel IXP1200 a StrongARM control processor is embedded. These chips expect that data flows in from the data bus, is processed immediately or stored in SDRAM or SRAM memory for further processing. At the time of forwarding of the data, the data is read from the memory and forwarded out on the data bus. This methodology infers that data must traverse the data and memory buses at least twice, once to store and once to forward a packet.

The architecture of the device 900 sends packets on a data bus only once and traverse the memory bus at most twice versus a possible three times in the prior design. With regards to the memory bus the packet is written and only the portions of the packet required for inspection which were not processed as they flow through the processor need be read. This results in a 1 to 2 times flow rate utilization of the memory bus. Forwarding is handled invisibly to the processor, via the memory fabric, and thus removes that third traditional movement of the data across the memory bus.

The single direction of traffic flow through the device 900 allows network processors 906A, 906B, 906C, 906D to be able to process data flows faster than originally intended. This is due to the fact that most processors are constrained by bus saturation. Take the IXP1200 for example, the SDRAM bus is a 6.6 Gbps bus with saturation around 5 Gbps. The IX Bus (data bus) is a 6 Gbps bus with saturation around 4.1 Gbps. To understand traffic levels that can be achieved one should take the worst case traffic flow, which is generally small packets at highest flow rate, to calculate what can be processed. The SDRAM would limit a traditional environment to 1.66 Gbps and the IX Bus would limit at 2 Gbps. These are maximums and headroom should be preserved. This estimate would suggest that Gigabit Ethernet would be the most an IXP1200 could attain. By using the network processor 906A, 906B, 906C, 906D uni-directionally, OC-48 requires only 2.5 Gbps on the data bus and no more that 5 Gbps on the memory bus. This allows existing devices to process faster than originally intended. Additionally, since the packets are moved around less, no processor is required to forward the packets which frees up more internal micro-engines for processing the packet.

This same approach can utilize the newer network processors 906A, 906B, 906C, 906D being developed to handle OC-48 and faster networks to be able to process packets at speeds up to OC-192 (10 Gbps) and faster. This can be done with external memory versus internal memory. This is a significant issue since internal memory requires a far more complex design of a network processor, increasing design time, reducing yields and increasing costs.

As can be seen, the preferred packet interception device implements scalable, transparent and non-invasive interception of packets for multiple devices. It is therefore intended that the foregoing detailed description be regarded as illustrative rather than limiting, and that it be understood that it is the following claims, including all equivalents, that are intended to define the spirit and scope of this invention.

We claim:

1. A method of transparently provisioning first and second services to a network, the first service being provided by a first application service provider to the network via a first application and the second service being provided by a second application service provider to the network via a second application, the network carrying a plurality of packets each being transmitted by a source to at least one intended destination intended by the source, each packet of the plurality of packets comprising routing data operative to cause the forwarding of the packet via the network towards the at least one intended destination, the method comprising:

interfacing between the first application and an interface to the network;

interfacing between the second application and the interface to the network;

intercepting, via the interface, each packet of the plurality of packets prior to a forwarding thereof toward the at least one intended destination;

evaluating each intercepted packet based on a first specification of a first subset of the plurality of packets with respect to which the first application is to perform the first service and a second specification of a second subset of the plurality of packets with respect to which the second application is to perform the second service, wherein at least the first specification specifies the first subset based on criteria other than only the routing data contained in the intercepted packet; and acting on the intercepted packet, based on the evaluating, to facilitate the performance of at least one of the first service, the second service or a combination thereof with respect to the intercepted packet when the intercepted packet is included in at least one of the specified first subset, second subset, or combination thereof; and receiving a result of the performance of at least one of the first service, the second service or a combination thereof from the first application, the second application, or a combination thereof, respectively, wherein the acting comprises at least one of providing at least a copy of at least a portion of the intercepted packet to at least one of the first and second applications, deleting the intercepted packet, modifying the intercepted packet, substituting a modified intercepted packet for the intercepted packet, substituting a new packet for the intercepted packet, allowing the intercepted packet to continue to the at least one intended destination, or combinations thereof.

2. The method of claim 1 wherein the acting comprises acting, responsive to the first application, the second application or a combination thereof, on the intercepted packet, based on the evaluating, to facilitate the performance of at least one of the first service, second service or a combination thereof with respect to the intercepted packet when the intercepted packet is included in at least one of the specified first subset, second subset, or combination thereof.

3. The method of claim 1 wherein the first service is the same as the second service, the first subset being different than the second subset.

4. The method of claim 1 wherein the first subset is different from the second subset.

5. The method of claim 1 wherein the acting further comprises providing the intercepted packet only to the first application when the intercepted packet is one of the first subset and one of the second subset.

6. The method of claim 1 wherein the interfacing further comprises interfacing between the first and second applications and the interface to the network without modifying layer 2 or layer 3 protocols of the interface to the network.

7. The method of claim 1 wherein the first service comprises one of a firewall service, content control service, malicious content detection service, anti-denial-of-service service, intrusion detection service, or combinations thereof.

8. The method of claim 1 wherein at least one of the source, at least one intended destination, or a combination thereof, are unaware of the interfacing, intercepting, evaluating and acting.

9. The method of claim 1 wherein the first application service provider is unaware of the interfacing, intercepting, and evaluating.

10. The method of claim 1 wherein the first application service provider is unaware of the interfacing, intercepting and evaluating.

11. A system for transparently provisioning first and second services to a network, the first service being provided by a first application service provider to the network via a first application and the second service being provided by a second application service provider to the network via a second application, the network carrying a plurality of packets each being transmitted by a source to at least one intended destination intended by the source, each packet of the plurality of packets comprising routing data operative to cause the forwarding of the packet via the network towards the at least one intended destination, the system comprising:

a packet processor coupled between the network and the first and second applications and operative to intercept at least one packet of the plurality of packets prior to a forwarding thereof toward the at least one intended destination, evaluate the at least one intercepted packet based on a first specification of a first subset of the plurality of packets with respect to which the first application is to perform the first service and a second specification of a second subset of the plurality of packets with respect to which the second application is to perform the second service, and act on the intercepted packet to facilitate the performance of at least one of the first service, the second service, or combination thereof with respect to the intercepted packet when the intercepted packet is included in at least one of the specified first subset, second subset, or combination thereof wherein at least the first specification specifies the first subset based on criteria other than only the routing data contained in the intercepted packet, wherein the packet processor is further operative to receive a result of the performance of at least one of the first service, the second service or a combination thereof from the first application, the second application, or a combination thereof, respectively, and wherein the act comprises at least one of provide at least a copy of at least a portion of the intercepted packet to at least one of the first and second applications, delete the intercepted packet, modify the intercepted packet, substitute a modified intercepted packet for the intercepted packet, substitute a new packet for the intercepted packet, allow the intercepted packet to continue to the at least one intended destination, or combinations thereof.

12. The system of claim 11 wherein the packet processor is further operative to act, responsive to the first application, the second application or a combination thereof, on the intercepted packet, based on the evaluation, to facilitate the performance of at least one of the first service, second service or a combination thereof with respect to the intercepted packet when the intercepted packet is included in at least one of the specified first subset, second subset, or combination thereof.

13. The system of claim 11 wherein the first service is the same as the second service, the first subset being different than the second subset.

14. The system of claim 11 wherein the first subset is different from the second subset.

15. The system of claim 11 wherein the packet processor is further operative to provide the intercepted packet only to the first application when the intercepted packet is one of the first subset and one of the second subset.

16. The system of claim 11 wherein the packet processor is operable to interact with the first and second applications with the network without modifying layer 2 or layer 3 protocols of the network.

17. The system of claim 11 wherein the first service comprises one of a firewall service, content control service, malicious content detection service, anti-denial-of-service service, intrusion detection service, or combinations thereof.

18. The system of claim 11 wherein at least one of the source, at least one intended destination, or a combination thereof, are unaware of the operations of the packet processor.

19. A system for transparently provisioning first and second services to a network, the first service being provided by a first application service provider to the network via a first application and the second service being provided by a second application service provider to the network via a second application, the network carrying a plurality of packets each being transmitted by a source to at least one intended destination intended by the source, each packet of the plurality of packets comprising routing data operative to cause the forwarding of the packet via the network towards the at least one intended destination, the system comprising:

means for interfacing between the first application and an interface to the network;

means for interfacing between the second application and the interface to the network;

means for intercepting, via the interface, each packet of the plurality of packets prior to a forwarding thereof toward the at least one intended destination;

means for evaluating each intercepted packet based on a first specification of a first subset of the plurality of packets with respect to which the first application is to perform the first service and a second specification of a second subset of the plurality of packets with respect to which the second application is to perform the second service, wherein at least the first specification specifies the first subset based on criteria other than only the routing data contained in the intercepted packet;

means for acting on the intercepted packet, based on the evaluating, to facilitate the performance of at least one of the first service, the second service, or combination thereof with respect to the intercepted packet when the intercepted packet is included in at least one of the specified first subset, second subset, or combination thereof, by providing at least a copy of at least a portion of the intercepted packet to at least one of the first and second applications, deleting the intercepted packet, modifying the intercepted packet, substituting a modified intercepted packet for the intercepted packet, substituting a new packet for the intercepted packet, allowing the intercepted packet to continue to the at least one intended destination, or combinations there; and means for receiving a result of the performance of at least one of the first service, the second service or a combination thereof from the first application, the second application, or a combination thereof, respectively.

20. A system for transparently provisioning first and second services to a network, the first service being provided by a first application service provider to the network via a first application and the second service being provided by a second application service provider to the network via a second application, the network carrying a plurality of packets each being transmitted by a source to at least one intended destination intended by the source, each packet of the plurality of packets comprising routing data operative to cause the forwarding of the packet via the network towards the at least one intended destination, the system comprising processor, a memory coupled with the processor, a network interface operative to couple the processor with the network, and an application interface operative to couple the processor with the first and second applications, the system further comprising:

first logic stored in the memory and executable by the processor cause the processor to intercept at least one packet of the plurality of packets prior to a forwarding thereof toward the at least one intended destination;

second logic, coupled with the first logic, stored in the memory and executable by the processor to cause the processor to evaluate the at least one intercepted packet based on a first specification of a first subset of the plurality of packets with respect to which the first application is to perform the first service and a second specification of a second subset of the plurality of packets with respect to which the second application is to perform the second service, wherein at least the first specification specifies the first subset based on criteria other than only the routing data contained in the intercepted packet;

third logic, coupled with the second logic, stored in the memory and executable by the processor to cause the processor to act on the intercepted packet to facilitate the performance of at least one of the first service, the second service, or combination thereof with respect to the intercepted packet when the intercepted packet is included in at least one of the specified first subset, second subset, or combination thereof; and fourth logic, coupled with the third logic, stored in the memory and executable by the processor to cause the processor to receive a result of the performance of at least one of the first service, the second service or a combination thereof from the first application, the second application, or a combination thereof, respectively, wherein the act comprises at least one of provide at least a copy of at least a portion of the intercepted packet to at least one of the first and second applications, delete the intercepted packet, modify the intercepted packet, substitute a modified intercepted packet for the intercepted packet, substitute a new packet for the intercepted packet, allow the intercepted packet to continue to the at least one intended destination, or combinations thereof.

\* \* \* \* \*